US012499857B1

(12) United States Patent
Toone

(10) Patent No.: US 12,499,857 B1
(45) Date of Patent: Dec. 16, 2025

(54) RELATIVE HARMONIC DYNAMIC PITCH CONTROL DEVICE AND SYSTEM

(71) Applicant: Richard Warren Toone, Columbus, NJ (US)

(72) Inventor: Richard Warren Toone, Columbus, NJ (US)

(*) Notice: Subject to any disclaimer, the term of this patent is extended or adjusted under 35 U.S.C. 154(b) by 333 days.

(21) Appl. No.: 18/199,394

(22) Filed: May 19, 2023

Related U.S. Application Data

(63) Continuation-in-part of application No. 29/881,993, filed on Jan. 9, 2023, which is a continuation-in-part (Continued)

(51) Int. Cl.

| | |
|---|---|
| ***G10D 3/153*** | (2020.01) |
| ***G10D 1/08*** | (2006.01) |
| ***G10D 3/12*** | (2020.01) |

(52) U.S. Cl.
CPC ............. *G10D 3/153* (2020.02); *G10D 1/085* (2013.01); *G10D 3/12* (2013.01)

(58) Field of Classification Search
CPC .......... G10D 3/153; G10D 1/085; G10D 3/12; G10D 3/00
See application file for complete search history.

(56) References Cited

U.S. PATENT DOCUMENTS 346,237 A 7/1886 Smith
1,839,395 A 1/1932 Kauffman (Continued)

FOREIGN PATENT DOCUMENTS

CN 212113192 U 12/2020
WO 1986002188 A1 4/1986

(Continued)

OTHER PUBLICATIONS

Amazon. https://www.amazon.ca/Floating-Stabilizer-Dual-Brass-Rod-Mounting Wilkinson/dp/B08T6KRCJQ. "Floating Tremolo Bridge Stabilizer, Dual-Brass-Rod Trem Stopper Device with (cont) Mounting Screws, Arming Adjuster Works with Fender Electric Guitar Wilkinson Kahlerand Ibanez." Jan. 2021 (Year: 2021)—One Page.

(Continued)

*Primary Examiner* — Kimberly R Lockett

(57) ABSTRACT

In some aspects, a tremolo for a stringed-instrument includes a tremolo frame and tremolo cams including a laterally spaced-apart curved string contact surfaces at positions and spacings corresponding to string positions of strings for a stringed instrument. The tremolo lever is rotatably mounted to the tremolo frame to rotate about an axis of rotation, an upper portion of the tremolo lever adjacent the tremolo frame and a lower portion extending downwardly from the upper portion, the lower portion including, at or near a distal portion thereof, one or more string retention structures configured to secure string end portions. The upper portion of the tremolo lever includes a first mechanical connector to receive a mating second mechanical connector at a first end portion of an outer lever arm so that forces applied to the outer lever arm by a user to rotate the tremolo lever about the axis of rotation in a first direction of rotation displace the distal portion of the tremolo lever in a first direction to increase a tension in, and a pitch of, strings secured at the distal portion of the tremolo lever and forces applied to the outer lever arm to rotate the tremolo lever about the axis of rotation in a second direction of rotation displace the distal portion of the tremolo lever in a second direction to decrease a tension in, and a pitch of, strings secured at the distal portion of the tremolo lever.

20 Claims, 81 Drawing Sheets

(a)

(b)

Related U.S. Application Data of application No. 29/881,747, filed on Jan. 5, 2023, now Pat. No. Des. 1,064,055, and a continuation-in-part of application No. 29/848,751, filed on Aug. 4, 2022, now abandoned, and a continuation-in-part of application No. 29/848,743, filed on Aug. 4, 2022, now abandoned, and a continuation-in-part of application No. 29/846,744, filed on Jul. 19, 2022, now Pat. No. Des. 1,075,896, and a continuation-in-part of application No. 29/846,747, filed on Jul. 19, 2022, now Pat. No. Des. 1,073,786.

(60) Provisional application No. 63/443,021, filed on Feb. 2, 2023, provisional application No. 63/397,342, filed on Aug. 11, 2022, provisional application No. 63/391,685, filed on Jul. 22, 2022, provisional application No. 63/344,632, filed on May 23, 2022.

(56) References Cited

U.S. PATENT DOCUMENTS

| | | | | |
|---|---|---|---|---|
| 2,741,146 | A | 4/1956 | Fender | |
| 2,972,923 | A | 2/1961 | Fender | |
| 3,124,991 | A | 3/1964 | Costen | |
| 3,248,991 | A | 5/1966 | Cole | |
| 3,443,467 | A | 5/1969 | Richards | |
| 4,031,799 | A | 6/1977 | Fender | |
| 4,100,832 | A | 7/1978 | Peterson | |
| D256,804 | S | 9/1980 | Fender | |
| D278,067 | S | 3/1985 | Bowen | |
| 4,512,232 | A | 4/1985 | Schaller | |
| D280,107 | S | 8/1985 | Tanaka | |
| 4,677,891 | A | 7/1987 | Gressett, Jr. | |
| 4,955,275 | A | 9/1990 | Gunn | |
| 4,960,027 | A | 10/1990 | Dunwoodie | |
| 5,088,375 | A | 2/1992 | Saijo | |
| 5,127,299 | A | 7/1992 | Stroh | |
| 5,747,713 | A | 5/1998 | Clement | |
| D496,385 | S | 9/2004 | Steinberger | |
| 7,521,616 | B2 | 4/2009 | Kahler | |
| 8,294,011 | B2 | 10/2012 | Toone | |
| 8,865,985 | B2 | 10/2014 | Maslarov | |
| 9,240,166 | B1 | 1/2016 | Dunwoodie | |
| 2006/0048627 | A1 | 3/2006 | Eshleman | |
| 2010/0236375 | A1 | 9/2010 | Dunwoodie | |
| 2013/0333545 | A1 | 12/2013 | Dunwoodie | |
| 2017/0061941 | A1 | 3/2017 | Cardozo | |
| 2021/0272540 | A1 | 9/2021 | Kebrle | |
| 2022/0020343 | A1 | 1/2022 | Dunwoodie | |
| 2022/0093066 | A1 * | 3/2022 | Savage | G10H 3/143 |

FOREIGN PATENT DOCUMENTS

| | | | |
|---|---|---|---|
| WO | WO-8602188 | A1 | 4/1986 |
| WO | 2011006232 | A1 | 1/2011 |

OTHER PUBLICATIONS

Hipshot. https://hipshotproducts.com/products/6-string-guitar-headless-tremolosystem. “6 String Guitar Headless Tremolo”. (Year: 2020).

* cited by examiner (a)

(b)

(b)

(a)

(c)

(d)

(e)

(f)

FIG. 11(d)
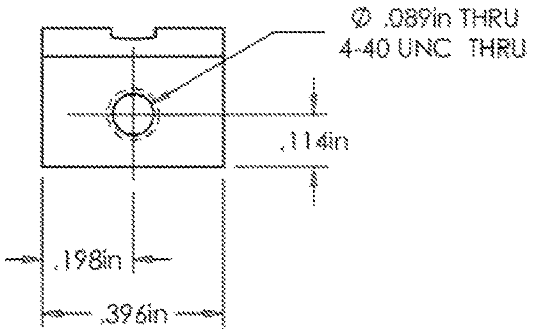
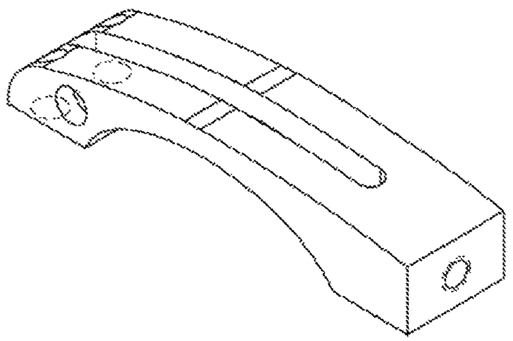
FIG. 11(a)
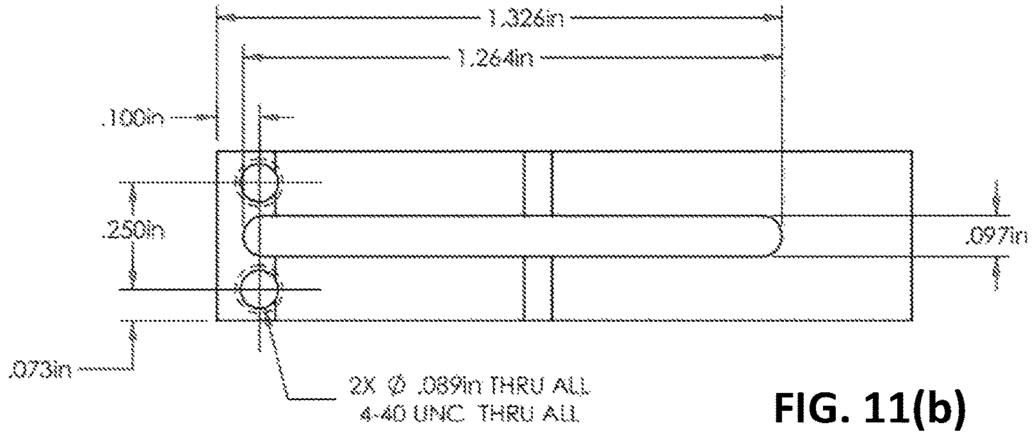
FIG. 11(b)
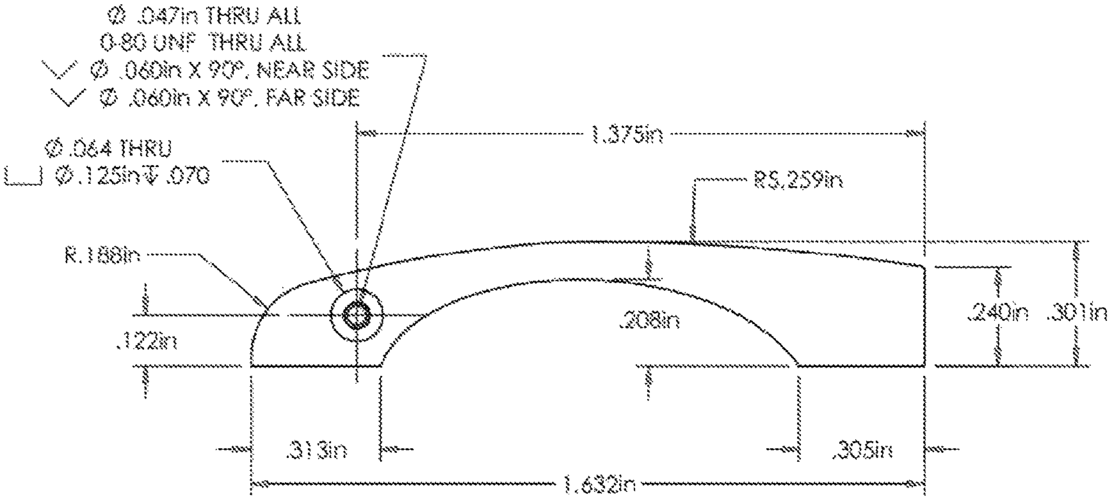
FIG. 11(c)

VIEW F-F

SECTION AP-AP

SECTION AV-AV

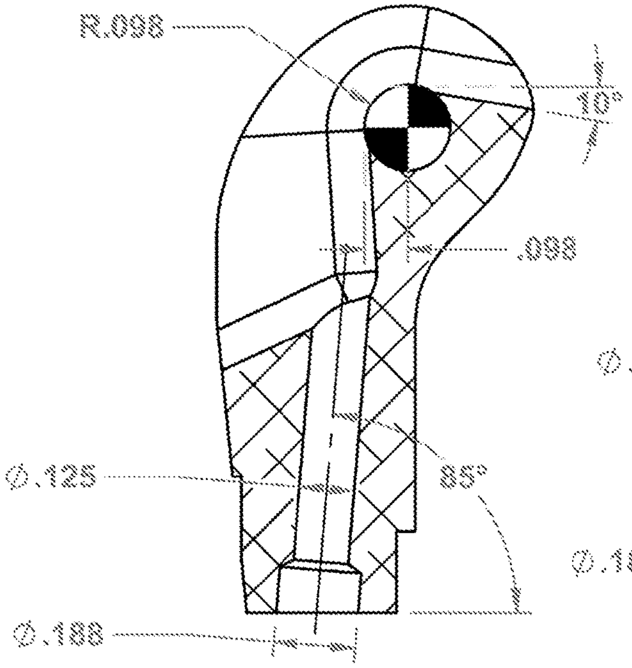
SECTION AY-AY
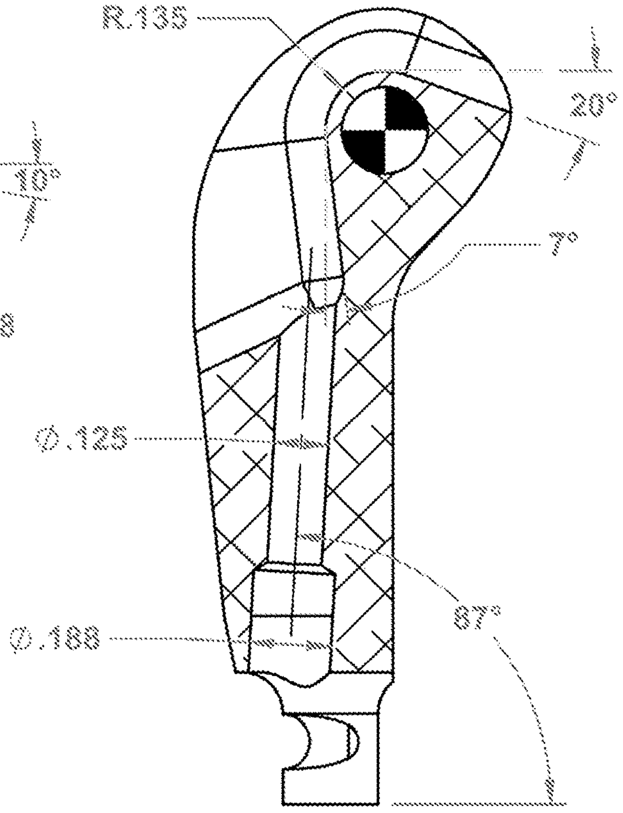
SECTION BA-BA
FIG. 24(d)
FIG. 24(e)

SECTION AN-AN

FIG. 28

| STRING | HIGH E | B | G | D | A | LOW E |
|---|---|---|---|---|---|---|
| RATIO | 1/12 | 1/22 | 1/33 | 1/24 | 1/29 | 1/42 |
| DIAMETER | 1.25″ | 0.6875″ | 0.46″ | 0.616″ | 0.51″ | 0.3537″ |
| DIAMETER | 1.125″ | 0.6187″ | 0.414″ | 0.554″ | 0.459″ | 0.3183″ |
| DIAMETER | 1″ | 0.55″ | 0.368″ | 0.493″ | 0.408″ | 0.283″ |
| DIAMETER | 0.875″ | 0.4812″ | 0.322″ | 0.4313″ | 0.357″ | 0.2476″ |
| DIAMETER | 0.75″ | 0.4125″ | 0.276″ | 0.3697″ | 0.306″ | 0.2122″ |
| DIAMETER | 0.625″ | 0.3437″ | 0.23″ | 0.308″ | 0.255″ | 0.1768″ |
| DIAMETER | 0.5″ | 0.275″ | 0.184″ | 0.2465″ | 0.204″ | 0.1415″ |

FIG. 29

| STRING | HIGH E | B | B-NASHVILLE |
|---|---|---|---|
| RATIO | 1/12 | 1/22 | 1/11 |
| DIAMETER | 1.25″ | 0.6875″ | 1.3625″ |
| DIAMETER | 1.125″ | 0.6187″ | 1.226″ |
| DIAMETER | 1″ | 0.55″ | 1.09″ |
| DIAMETER | 0.875″ | 0.4812″ | 0.9537″ |
| DIAMETER | 0.75″ | 0.4125″ | 0.8175″ |
| DIAMETER | 0.625″ | 0.3437″ | 0.68125″ |
| DIAMETER | 0.5″ | 0.275″ | 0.545″ |

RELATIVE HARMONIC DYNAMIC PITCH CONTROL DEVICE AND SYSTEM

The present application claims priority to U.S. Design patent application Ser. No. 29/846,743, filed on Jul. 19, 2022, titled "Guitar and Tremolo," U.S. Design patent application Ser. No. 29/846,747, filed on Jul. 19, 2022, titled "Tremolo," U.S. Design patent application Ser. No. 29/846,744, filed on Jul. 19, 2022, titled "Guitar and Tremolo," U.S. Design patent application Ser. No. 29/846,751, filed on Jul. 19, 2022, titled "Tremolo," U.S. Design patent application Ser. No. 29/881,993, filed on Jan. 9, 2023, titled "Guitar Tremolo," U.S. Design patent application Ser. No. 29/881,747, filed on Jan. 5, 2023, titled "Tremolo," U.S. Provisional Application Ser. No. 63/344,632, filed on May 23, 2022, U.S. Provisional Application Ser. No. 63/391,685, filed on Jul. 22, 2022, U.S. Provisional Application Ser. No. 63/397,342, titled "Relative Harmonic Dynamic Pitch Control," filed on Aug. 11, 2022, and U.S. Provisional Application Ser. No. 63/443,021, titled "Relative Harmonic Dynamic Pitch Control," filed on Feb. 2, 2023, and the present application incorporates by reference herein in its entirety each of (all of) the aforementioned applications.

FIELD OF THE INVENTION

The present concepts relate to musical instruments and more particularly to stringed instruments. More specifically, the present concepts relate to a pitch control device and system for stringed instruments.

BACKGROUND INFORMATION

Conventionally, a string is placed under longitudinal tension until it vibrates at a predetermined pitch when plucked, bowed, picked, or otherwise induced to vibrate. Strings are coupled to a structure known as a bridge.

Musicians often seek to manipulate the pitch of a string or strings for artistic effect through the use of mechanical or electrical devices. Conventionally, a mechanical artistic string pitch bridge manipulator is known as a: tremolo, vibrato, or "whammy bar" device.

That there has never been a universally loved tremolo in the entire history of the electric guitar is an indication of the difficulty of the engineering challenge. Conventional technologies include at least a subset and often the entirety of the design limitations below listed, including:

a. Loss of string sustain, dynamics, and tone due to inefficient coupling between the string and the bridge. More specifically, inefficient coupling between the bridge and the body of the instrument. Various forms of "floating" conventional designs are in use, where the string intonation point is suspended above the body of the instrument, with only an indirect coupling to the soundboard.

b. String pitch changes affect string action, meaning string spacing, height above the fretboard, and intonation. Changes in string action are physically and mentally disorienting to the musician, forcing the player to instantaneously adapt to chaotic string feel, location, and movement.

c. Changes in string action compromise the structural integrity and performance of the instrument as a whole, exerting randomly unpredictable stresses on the neck and neck joint of the guitar as longitudinal forces are unevenly distributed across multiple axes.

d. Constant changes in string action destabilize the instrument, causing ongoing deterioration, so much so that the same guitar can feel and perform quite differently from session to session.

e. Changes and adjustments to individual string height, action, or intonation affect other strings, as well as the overall performance of the tremolo. Performance of the entire device is compromised.

f. Breakage of a string results in severely compromised performance of the device, including: loss of tuning, inability to operate the tremolo, often inability to play the instrument.

g. Replacing a broken string, or changing strings, requires specialized tools or a tool kit that must be transported with the guitar at all times in preparation for such eventualities.

h. Specialized strings are required—for example double ball end—which must be sourced from designated suppliers. Or the string must be modified, for example the end clipped with wire cutters.

i. Significant limits apply to specific gauge (diameter) strings that can be used successfully.

j. String attachment mechanisms are small, easily dislodged or lost, and degrade over time.

k. Restringing the unit can require elaborate preparation, tools, workspace, lighting, plus a period of settling in and adjustments to optimize performance. Breaking a string, or a string slipping within the attachment configuration, results in a repeat of this same process. Most professional musicians require a dedicated back stage technician plus additional backup guitars to prepare for inevitable string breaks and loss of the guitar during performance.

l. Sharp, sometimes acute, string bends are utilized during attachment to the unit, resulting in premature string failure. This design flaw necessitates more frequent string changes—a task often postponed due to the elaborate preparations required.

m. Removing and re-installing the unit results in loss of string action and intonation settings.

n. Knife-edge pivot designs wear and degrade with use, requiring replacement and technical setup.

o. Designs which "float" above the surface of the guitar are vulnerable to impact and damage during normal use, and especially when a guitar accidentally falls.

p. Mechanical protrusions are subject to catching on clothing and are capable of damaging the human hand during performance.

q. Reliance upon fragile fasteners to attach the unit to the guitar, increasing likelihood of attachment failure, damage to the guitar, subject to loosening, and maladjustment.

r. Greater ranges of pitch change during use drastically increase the vulnerability of the unit to accidental damage in addition to damage to the unit itself. Especially prevalent with "floating" tremolo designs.

s. Complex and expensive to manufacture due to proliferation of small fragile components. One often employed compromise solution is to use inferior quality die-cast or stamped materials, resulting in premature failure and imprecise operation during use.

t. Lag or delay during use, resulting in imprecise pitch changes and feel of actuation.

u. All of the above listed significant design problems are exacerbated with multi-scale designs.

v. Tendency for tuning to drift sharp during palm mute playing techniques.

w. Restricted range of pitch changes, especially regarding ascending pitches.

x. Increasing user-input force required, especially during ascending pitches, causing playing technique to become more difficult.

y. String pitch oscillations as the unit returns to equilibrium after user actuation.

z. Non-configurable relationships between string pitches during pitch change.

aa. Imprecise harmonic relationships between string pitches during pitch change.

SUMMARY OF THE INVENTION

The present concepts relate to a relative harmonic dynamic pitch control, as well as the anchoring, tuning, and pitch control for one or more strings of a musical instrument. In various aspects, the disclosed relative harmonic dynamic control system provides pitch control (i.e., tremolo, vibrato, etc.) and intonation control (i.e., dimensional orientation of a string contact point relative to an appropriate intonation harmonic).

An objective of the present concepts is to provide a relative harmonic dynamic pitch control system for controlling pitch of a string where pitch changes do not affect string action, or intonation. Additionally, in some aspects of the present concepts, adjustments to string action or intonation do not affect any other strings of the instrument (e.g., adjacent string(s)).

Another object of the present concepts is to provide secure attachment to the body of the instrument, resistant to potential damage due to accidents, providing ease of adjustment, removal and installation, and providing greater—in comparison to conventional technologies-string coupling to the bridge, soundboard or body of the instrument.

Another object of the present concepts is to provide simple user interface, including use of commercial readily available off-the-shelf strings, string changes that do not require tools or specialized equipment, ease of adjustment for variables including "feel" actuation.

Another object of the present concepts is to provide musical and predictable pitch changes, relative harmonic relationships between strings during pitch bends, and greater, relative to conventional technologies, retained musical pitch accuracy during catastrophic string failure.

BRIEF DESCRIPTION OF THE DRAWINGS

Exemplary drawings are included for reference showing example features of and/or example embodiments of the relative harmonic dynamic pitch control system, or components or subparts thereof, in accord with aspects of the present concepts.

FIGS. 11(*a*)-11(*d*) are views of an example slider (tremolo slider or bridge slider) in accord with at least some aspects of the present concepts where FIG. 11(*a*) is a perspective view, FIG. 11(*b*) is a top view, FIG. 11(*c*) is a side view and FIG. 11(*d*) is a front view.

FIG. 12(*b*) is an exploded view of the example relative harmonic dynamic pitch control device of FIG. 12(*a*).

FIGS. 28-29 are example tables of example dimensions and ratios in accord with aspects of the present concepts.

DETAILED DESCRIPTION

Figure 1:
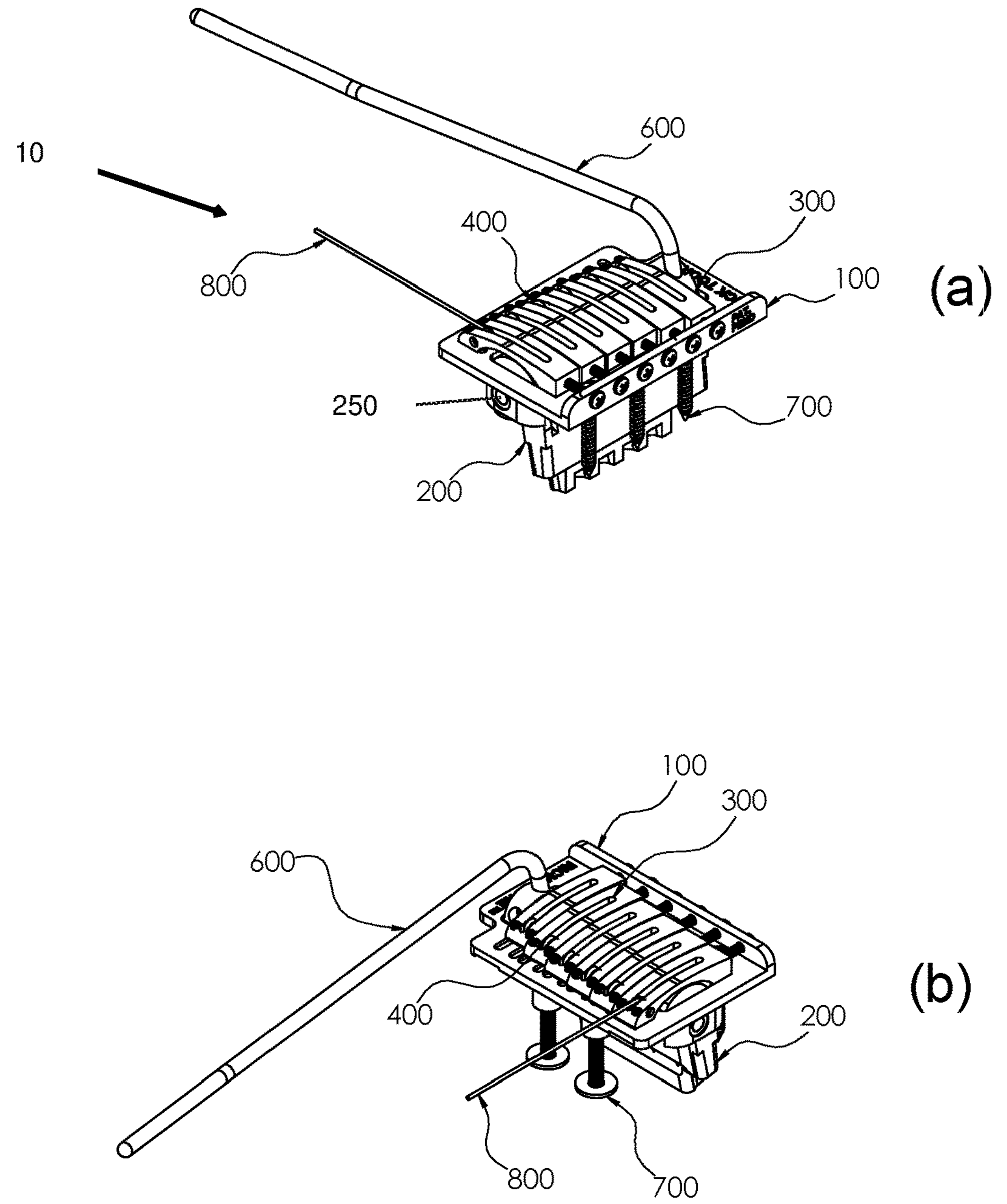
FIGS. 1(*a*)-1(*b*) is a perspective view of an example relative harmonic dynamic pitch control device in accord with aspects of the present concepts.
Figure 2:
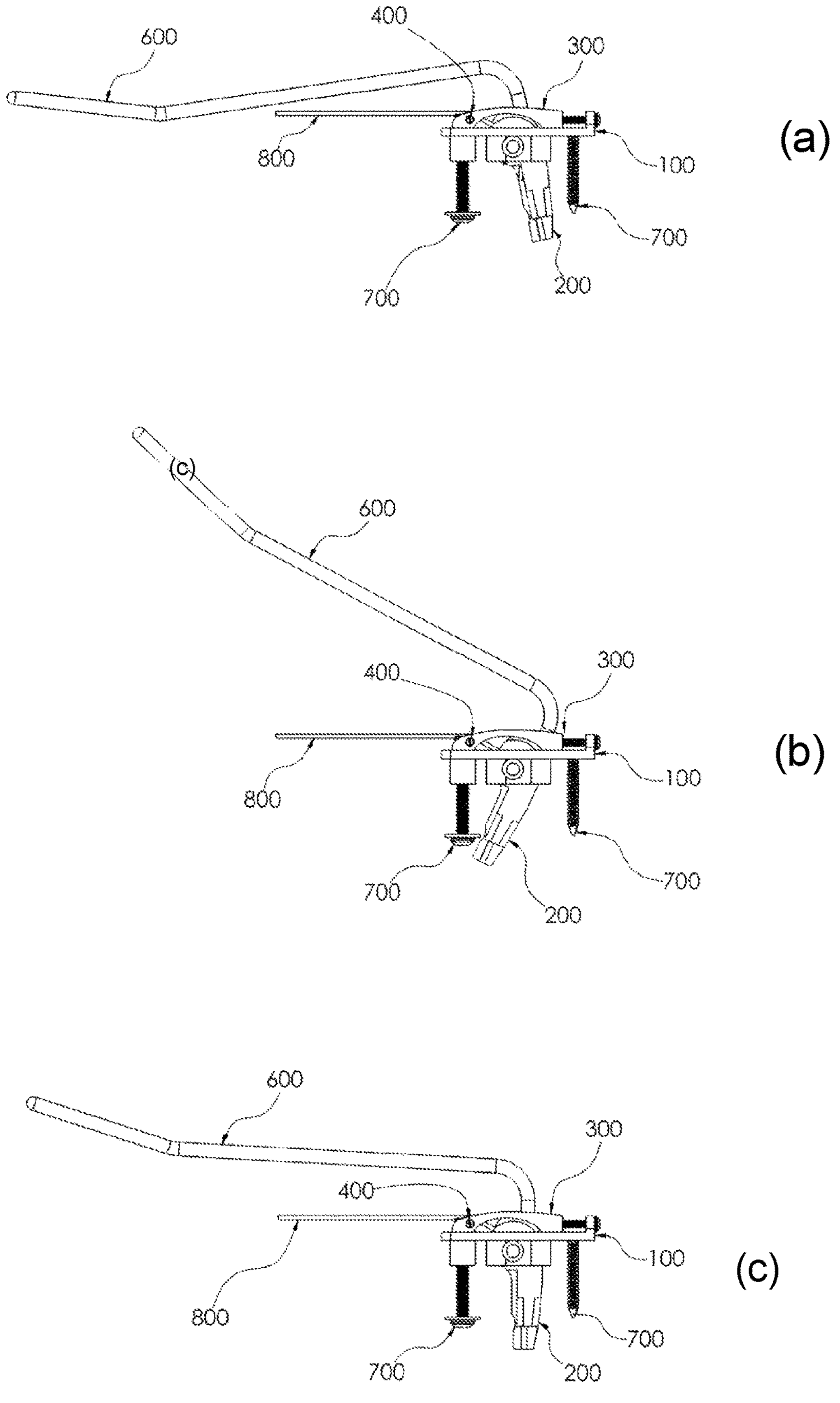
FIGS. 2(*a*)-2(*c*) are side views of the example relative harmonic dynamic pitch control system of FIGS. 1(*a*)-1(*b*).
Figure 3:
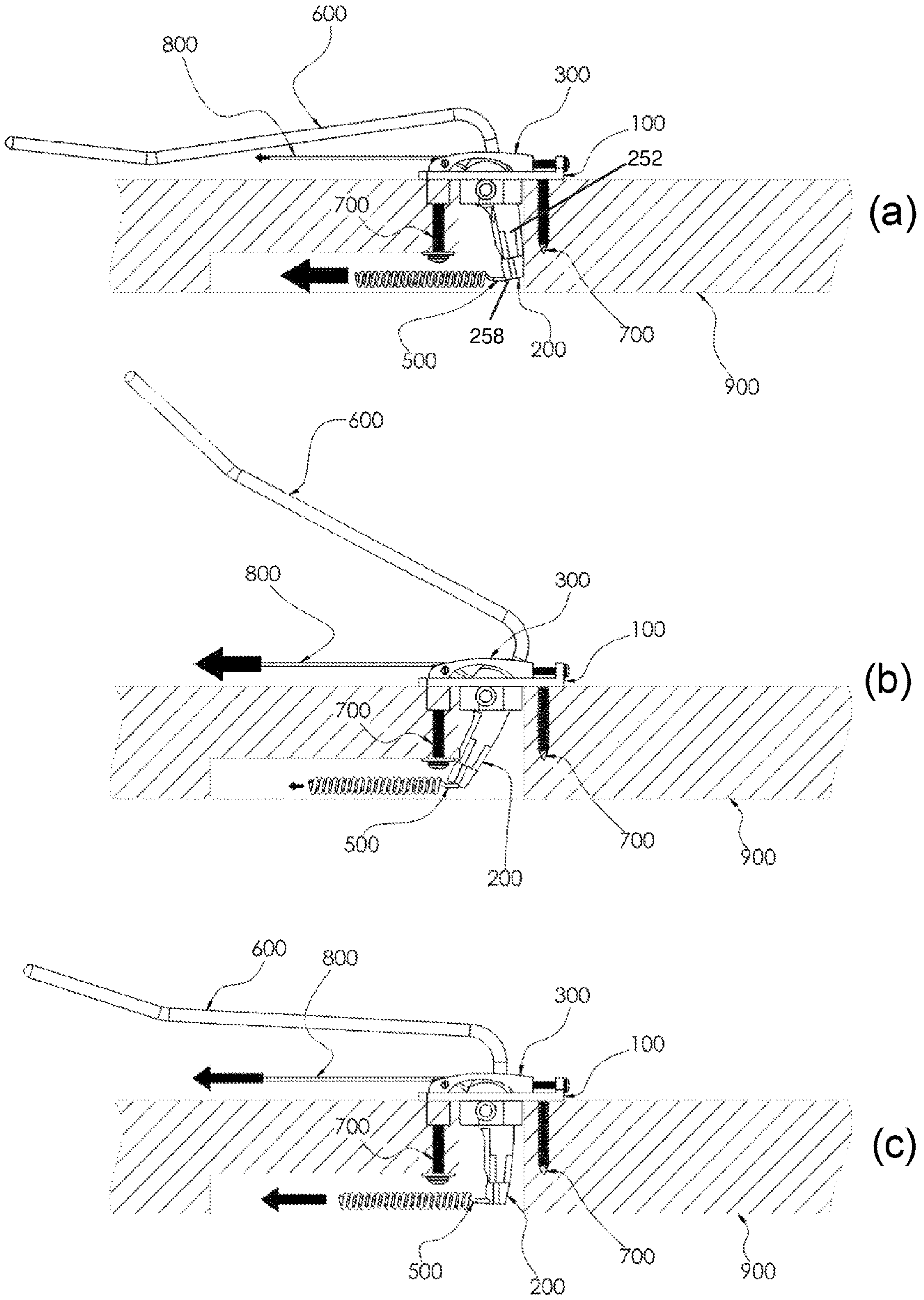
FIGS. 3(*a*)-3(*c*) are partial cut-away side views of the example relative harmonic dynamic pitch control device of FIGS. 1(*a*)-1(*b*) with the example tremolo lever position being represented at different angles reflecting different string tensions and pitch.
Figure 4:
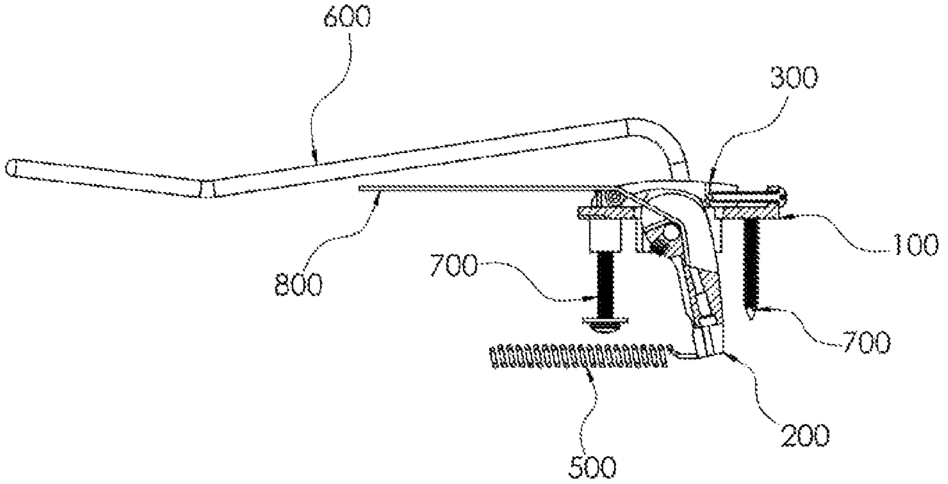
FIGS. 4(*a*)-4(*b*) are partial cut-away and partial-cross-sectional side view and a partial cut-away side view, respectively, of an example relative harmonic dynamic pitch control device in accord with aspects of the present concepts.
Figure 4:
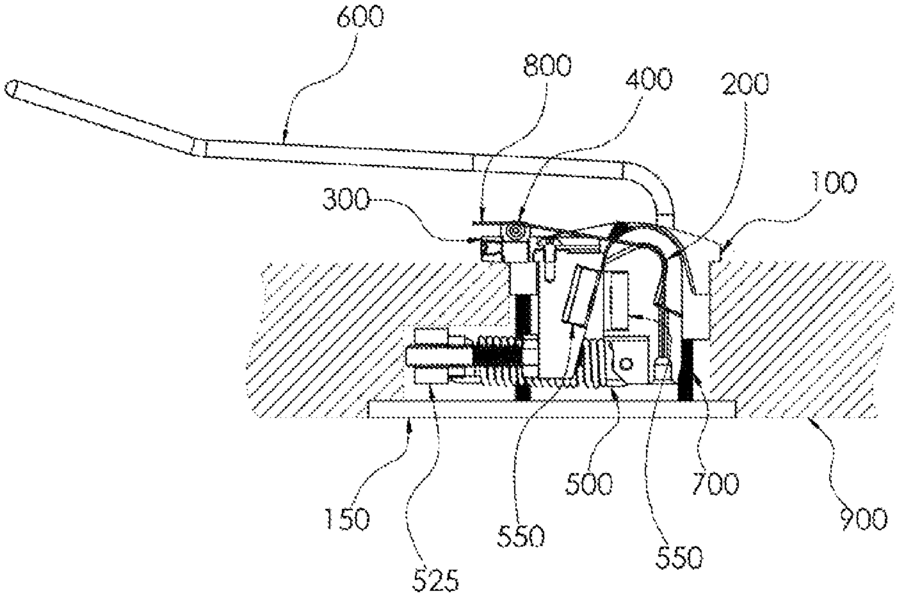
Figure 5:
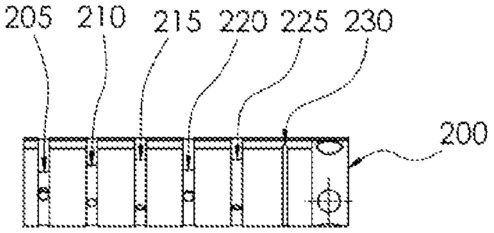
FIGS. 5(*a*)-5(*f*) are views of an example integrated tremolo cam and tremolo lever for an example relative harmonic dynamic pitch control device in accord with at least some aspects of the present concepts where FIG. 5(*a*) is a perspective view, FIG. 5(*b*) is a top view, FIG. 5(*c*) is a rear view, FIG. 5(*d*) is a side view, FIG. 5(*e*) is a front view, and FIG. 5(*f*) is a bottom view.
Figure 5:
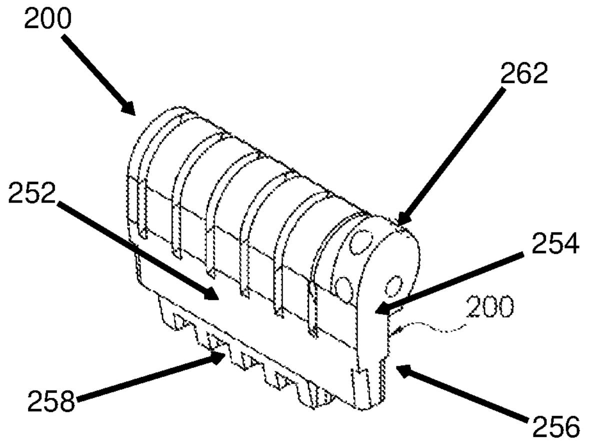
Figure 5:
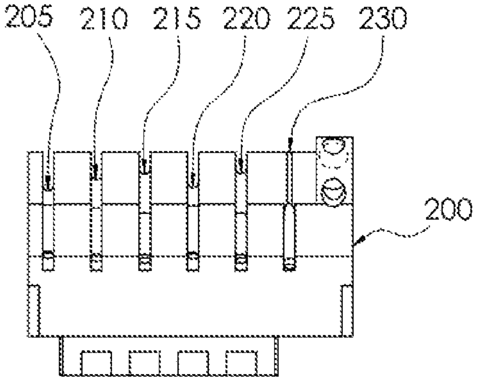
Figure 5:
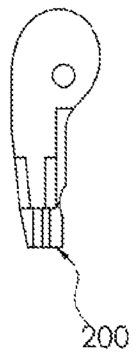
Figure 5:
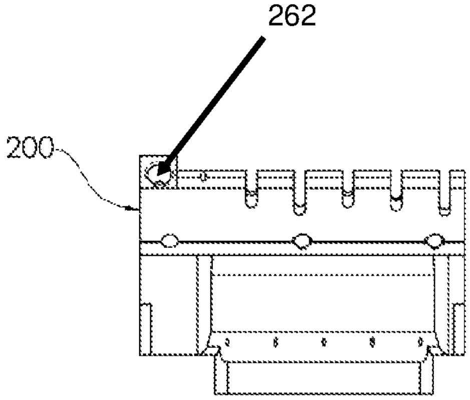
Figure 5:
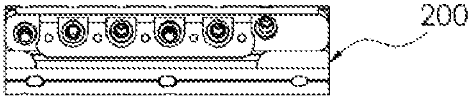
Figure 6:
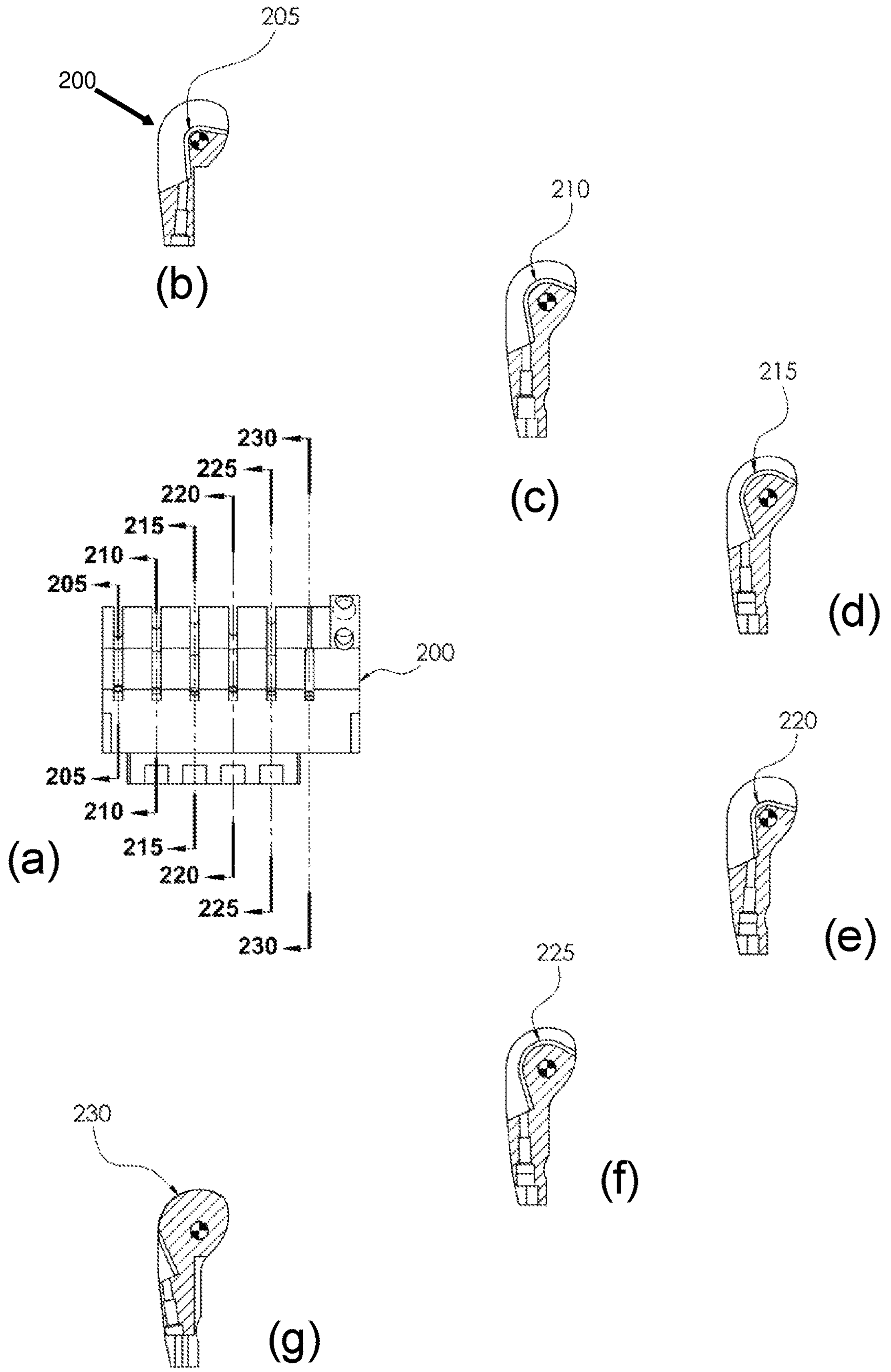
FIGS. 6(*a*)-6(*a*) of the example integrated tremolo cam and tremolo lever of FIGS. 5(*a*)-5(*f*) wherein FIG. 6(*a*) is a rear view and FIGS. 6(*b*)-6(*f*) are cross-section views taken along cross-sections or planes passing through example rotatable string contact surfaces 205, 210, 215, 220, 225 and 230, respectively.

FIGS. 1(*a*)-4(*b*) show a variety of views and features of an example relative harmonic dynamic pitch control system 10 for a stringed-instrument, also referred to herein as a tremolo 10, according to at least some aspects of the present concepts. FIGS. 2(*a*)-2(*c*) is a side view of the relative harmonic dynamic pitch control (tremolo) 10 of FIGS. 1(*a*)-1(*b*). FIGS. 3(*a*)-3(*c*) is a side view of the relative harmonic dynamic pitch control (tremolo) 10 of FIGS. 1(*a*)-1(*b*) with the position of the tremolo lever of the integrated tremolo cam and tremolo lever being represented at different angles. FIGS. 4(*a*)-4(*b*) are cross-sectional side views of example relative harmonic dynamic pitch control devices in accord with aspects of the present concepts. FIGS. 5(*a*)-5(*f*) are views of an example integrated tremolo cam and tremolo lever for a relative harmonic dynamic pitch control device in accord with at least some aspects of the present concepts where FIG. 5(*a*) is a perspective view, FIG. 5(*b*) is a top view, FIG. 5(*c*) is a back view, FIG. 5(*d*) is a side view, FIG. 5(*e*) is a front view, and FIG. 5(*f*) is a bottom view. FIGS. 6(*a*)-6(*a*) of the example integrated tremolo cam and tremolo lever of FIGS. 5(*a*)-5(*f*) wherein FIG. 6(*a*) is a rear view and FIGS. 6(*b*)-6(*f*) are cross-section views taken along planes passing through the rotatable string contact surfaces 205, 210, 215, 220, 225 and 230, respectively.

FIGS. 1-4(*b*), for example, show an example string 800 contacting an example intonation harmonic point 400 (alternatively referred to herein as a “string height adjustment system” or SHAS) then contacting an example string contact surface (e.g., 205, 210, 215, 220, 225 and 230 of FIGS. 5(*a*)-5(*f*)) of an example rotatable integrated tremolo cam and tremolo lever 200 (see, e.g., FIGS. 5(*a*)-5(*f*) and FIG. 6). The rotatable integrated tremolo cam and tremolo lever 200 is rotatably attached to, or relative to, an example mount or tremolo frame 100 that is itself fixed to a frame of the musical instrument (e.g., guitar, bass, etc.). In some examples, the tremolo frame 100 comprises one or more, and desirably a plurality of, openings 102 or through holes at a rear portion of the tremolo frame 100 to receive mechanical connectors (e.g., fasteners, screws, bolts, etc.) to affix the tremolo frame 100 to an exterior of a face of body of the stringed-instrument.

The rotatable integrated tremolo cam and tremolo lever 200 is rotatably attached to the tremolo frame 100 via, for example, a shaft 250 (e.g., a single shaft, a first lateral shaft portion and a second lateral shaft portion, a first lateral male member, portion and a second lateral male member, a first lateral shaft portion, a first lateral male member, etc.) and/or lateral recess(es) to receive corresponding frame-borne shaft(s) (e.g., the integrated tremolo cam and tremolo lever 200 could bear a shaft on one lateral side and a recess on the opposite lateral side to receive a shaft from the tremolo frame 100), the shaft(s), recess(es), or combination thereof that facilitate rotation of the integrated tremolo cam and tremolo lever 200 relative to the tremolo frame 100.

As shown in FIGS. 1-4(*b*), the example tremolo 10 includes an example tremolo frame 100 and an example integrated tremolo cam and tremolo lever 200 comprising an example tremolo cam 202 and an example tremolo lever 252. The example tremolo cam 202, at the upper portion of the example integrated tremolo cam and tremolo lever 200, comprises a plurality of laterally spaced-apart curved string contact surfaces (e.g., 205, 210, 215, 220, 225 and 230 of FIGS. 5(*a*)-5(*f*)) at positions and at a spacing corresponding to a string positions of a plurality of strings for a stringed instrument, such as string positions for a guitar (i.e., HIGH E, B, G, D, A and LOW E) in the depicted example. In some examples, the tremolo cam 202 is disposed at a central portion of a body of the stringed instrument (e.g., a guitar, etc.) and each of the example string contact surfaces has a lateral width greater than a width of a corresponding stringed instrument string (e.g., HIGH E, B, G, D, A and LOW E).

The example integrated tremolo cam and tremolo lever 200 comprises, at a lower portion thereof, an example tremolo lever 252. The example tremolo lever 252 is rotatably mounted to the example tremolo frame 100 to rotate about an axis of rotation. The example tremolo lever 252 has an upper portion 254 and a lower portion 256, the upper portion 254 being adjacent the tremolo frame 100 and being rotatably connected thereto by direct or indirect (e.g., gears, cables, links, etc.) connection to the tremolo frame 100, the lower portion 256 extending downwardly away from the upper portion 254 and away from the tremolo frame 100 in a direction corresponding to an interior cavity of a body of a stringed instrument. The lower portion 256 of the tremolo lever 252 comprises, at or near a distal portion 258 of the lower portion 256, one or more string retention structures 260 (e.g., connector, clamp, diametral restriction, post, anchor, etc.) configured to secure end portions of stringed instrument strings. The upper portion 254 of the tremolo lever comprises a first mechanical connector 262 to receive, or to removably receive, a mating second mechanical connector at a first end portion of an outer lever arm 600 (e.g., a lever arm on an outside of the stringed instrument where it can be manipulated by a user, such as the whammy bar 600 in FIGS. 1(*a*)-1(*b*)).

Forces applied to the outer lever arm 600 by a user in one direction (e.g., toward a face of a stringed instrument) causes rotation of the tremolo lever 252, or the example integrated tremolo cam and tremolo lever 200 as shown, about the axis of rotation (e.g., about shaft 250) in a first direction of rotation (e.g., clockwise) and displacement of the distal portion 258 of the tremolo lever 252 in a tremolo first direction (e.g., in a direction toward a neck of the stringed instrument) to increase a tension in, and a pitch of, strings secured at the distal portion 258 of the tremolo lever 252 via the one or more string retention structures 260. Forces applied to the outer lever arm 600 by a user in another direction opposite to the one direction (e.g., away from a face of a stringed instrument) causes rotation of the tremolo lever 252, or the example integrated tremolo cam and tremolo lever 200 as shown, about the axis of rotation in a second direction of rotation (e.g., counter-clockwise) and displacement of the distal portion 258 of the tremolo lever 252 in a second direction opposite the first direction (e.g., in a direction away from a neck of the stringed instrument) to decrease a tension in, and a pitch of, strings secured at the distal portion 258 of the tremolo lever 252 via the one or more string retention structures 260. In some examples, the tremolo lever 252 or the example integrated tremolo cam and tremolo lever 200 is configured to rotate about the axis of rotation in the first direction of rotation by an angle of about 20° or less (e.g., about 19° or less, about 18° or less, about 17° or less, etc.) relative to a default neutral position of the tremolo lever under string tension, and wherein the tremolo lever is configured to rotate about the axis of rotation in the second direction of rotation by an angle of about 20° or less (e.g., about 19° or less, about 18° or less, about 17° or less, etc.) relative to a default neutral position of the tremolo lever under string tension. In some examples, angular or linear movement of the tremolo lever 252 or the example integrated tremolo cam and tremolo lever 200 is restricted by a linear or rotational limiter. In some examples, angular movement of the tremolo lever 252 or the example integrated tremolo cam and tremolo lever 200 in the first direction and/or the second direction is able to be set to a selectable value within a range of selectable values via one or more linear or rotational limiters. In some examples, angular movement of the tremolo lever 252 or the example integrated tremolo cam and tremolo lever 200 in the first direction is a different than that in the second direction.

In some aspects, the tension of the strings 800 is advantageously balanced using one or more example magnets 550 (e.g., rare earth magnets, neodymium, etc.). As noted, the integrated tremolo cam and tremolo lever 200 is disposed to rotate relative to the tremolo frame 100 and the forces acting on the integrated tremolo cam and tremolo lever 200 include a tension force creating a first moment about an axis of rotation of the integrated tremolo cam and tremolo lever 200 (i.e., the tensioned string is attached to a distal or lower portion of the integrated tremolo cam and tremolo lever 200). In some examples, an adjustment in a magnetic force of the magnet is achieved by inserting one or more spacers (e.g., washers) to increase a spacing between the magnet(s) 550 or ferromagnetic element(s) of the integrated tremolo cam and tremolo lever 200 and tremolo frame 100 to increase the distance therebetween. In some examples, a user is provided with a plurality of magnets 550 that may be selectively inserted into the integrated tremolo cam and tremolo lever 200 and/or tremolo frame 100 to permit incremental adjustments to be made in the magnetic forces acting between the integrated tremolo cam and tremolo lever 200 and the tremolo frame 100. In one non-limiting example, a magnet in accord with aspects of the present concepts comprises a nickel-plated neodymium magnet having a thickness of ¼", and an outside diameter (OD) of 0.75", generating a maximum pull of about 18 pounds.

Example springs 500 are also attached, at a first end, to the integrated tremolo cam and tremolo lever 200 and are attached, at a second end, to a fixed member (e.g., a guitar body, a structure attached to a guitar body, etc.). In the example shown in example FIGS. 1-4(*b*), the second end of the springs 500 is attached to an example tensioner block 525 (see, e.g., FIG. 4(*b*), FIGS. 17(*a*)-17(*c*)) that is fixed relative to the tremolo frame 100. In other aspects, the tensioner block could be fixed relative to the musical instrument body 900 or intermediary component fixed relative to the musical instrument body 900. In still additional examples, one spring could be used, or a plurality of springs (e.g., 2, 3, 4, etc.). As to the above-noted force balancing, the magnet(s) 550 are, by way of example, disposed in the tremolo frame 100, disposed in the integrated tremolo cam and tremolo lever 200, or disposed in both the tremolo frame 100 and the integrated tremolo cam and tremolo lever 200. In other aspects, the magnet(s) 550 are disposed in one of the tremolo frame 100 or the integrated tremolo cam and tremolo lever 200, and the other of the tremolo frame 100 or the integrated tremolo cam and tremolo lever 200 comprises a corresponding mating ferrous structure (not shown) (e.g., an insert received within a corresponding recess formed in the cam or the frame) upon which the magnet(s) 550 act. The magnet(s) 550 and/or any operatively associated ferrous structure(s) are positioned and sized to create a second moment about an axis of rotation of the integrated tremolo cam and tremolo lever 200 that is configured to, or adjustable to, counter the first moment about an axis of rotation of the integrated tremolo cam and tremolo lever 200. During use of the example relative harmonic dynamic pitch control system 10, a user (e.g., a musician, etc.) controls the string pitch by moving the example tremolo arm 600, also known as a "whammy bar," relative to the musical instrument body, the tremolo arm 600 being directly or indirectly mounted to the integrated tremolo cam and tremolo lever 200, such as via a threaded connection or a male/female connector. The user thus introduces a third moment in a desired direction, via the tremolo arm 600, temporarily altering the equilibrium established between the first moment (strings) and the second moment (springs) to selectively increase tension in the strings (increased pitch) or to decrease tension in the strings (decreased pitch).

In at least some aspects of the present concepts, one or more magnets are added to the tensioner, or the tensioner itself made from or comprising rare earth magnetic material, to provide an additional source of system oscillation dampening.

Figure 7:
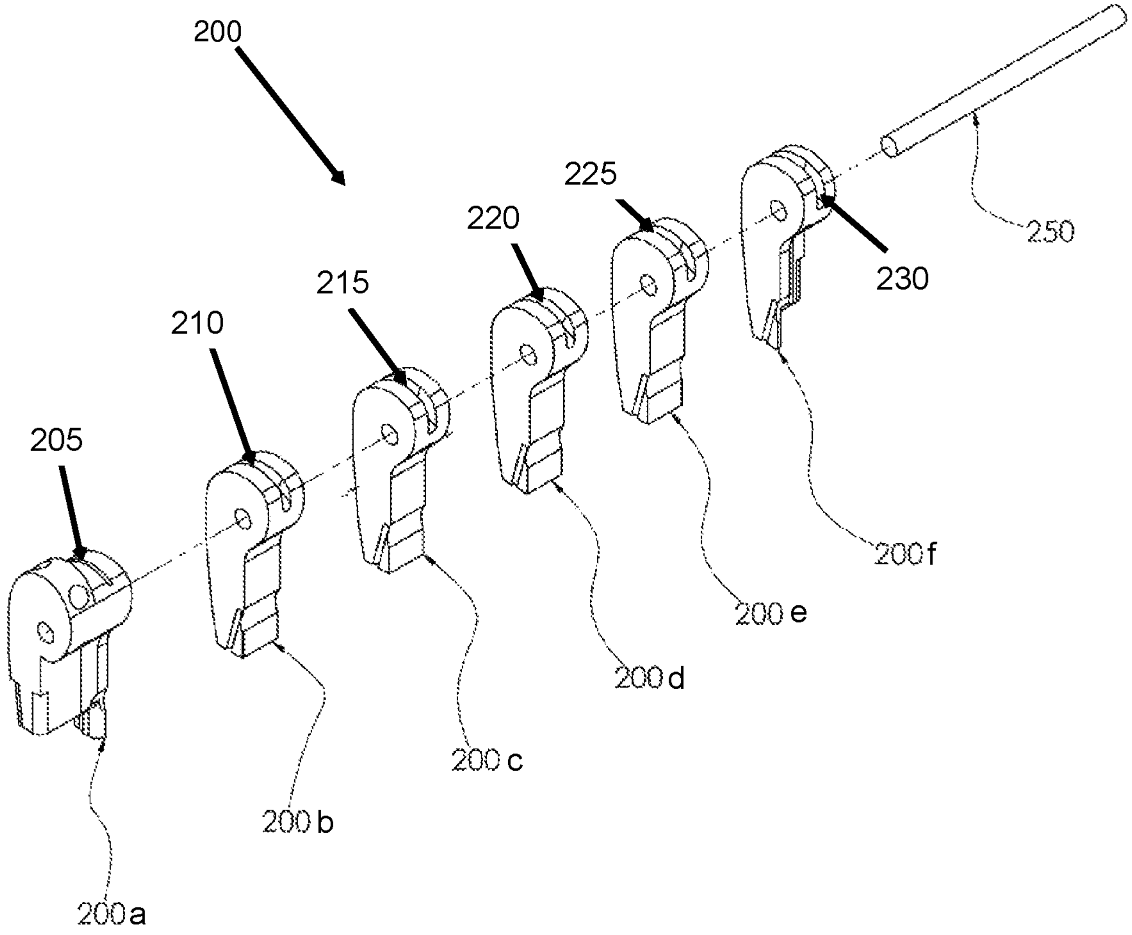
FIG. 7 is an exploded perspective view of an example integrated tremolo cam and tremolo lever for an example relative harmonic dynamic pitch control device in accord with at least some aspects of the present concepts.
Figure 8A:
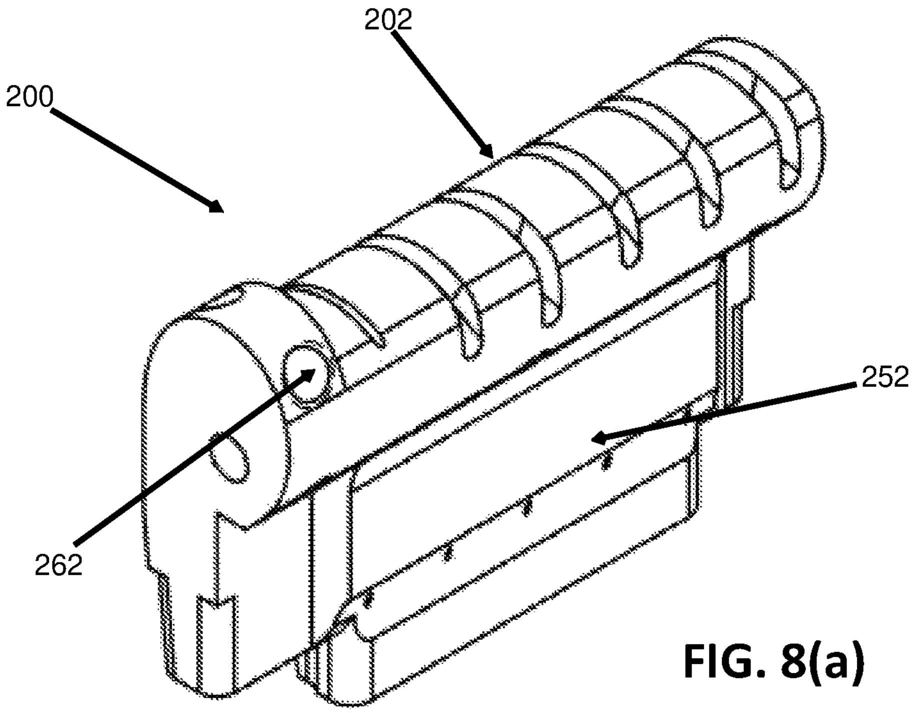
FIGS. 8(*a*)-8(*j*) are views of an example integrated tremolo cam and tremolo lever for an example relative harmonic dynamic pitch control device in accord with at least some aspects of the present concepts where FIG. 8(*a*) is a perspective view, FIG. 8(*b*) is a rear view, FIG. 8(*c*) is a top view, FIG. 8(*d*) is a front view, FIG. 8(*e*) is a bottom view, FIG. 8(*f*) is a side view, FIG. 8(*g*) is a cross-sectional view taken along cross-section A-A, FIG. 8(*h*) is another cross-sectional view, FIG. 8(*i*) is another front view, and FIG. 8(*j*) is a front perspective view.
Figure 8B:
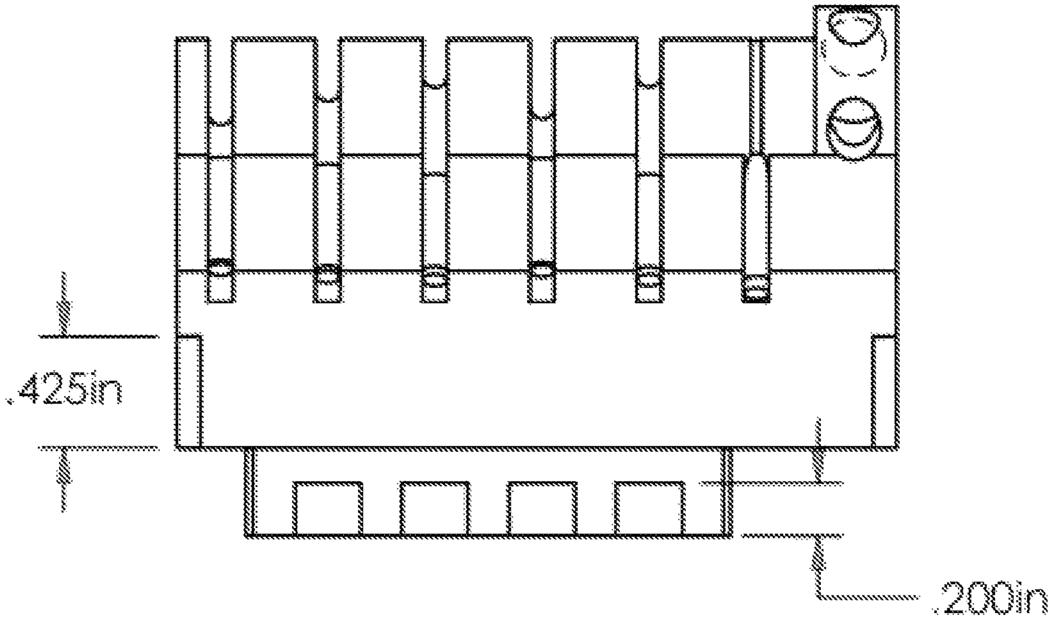
Figure 8C:
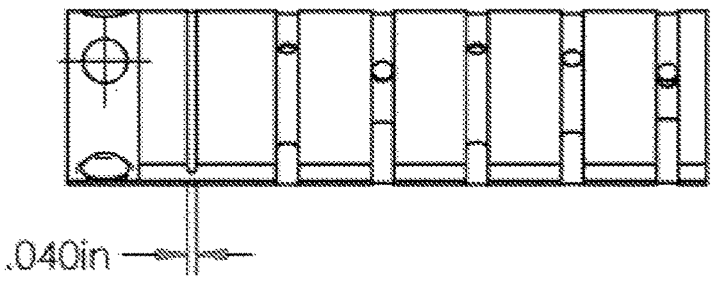
Figure 8D:
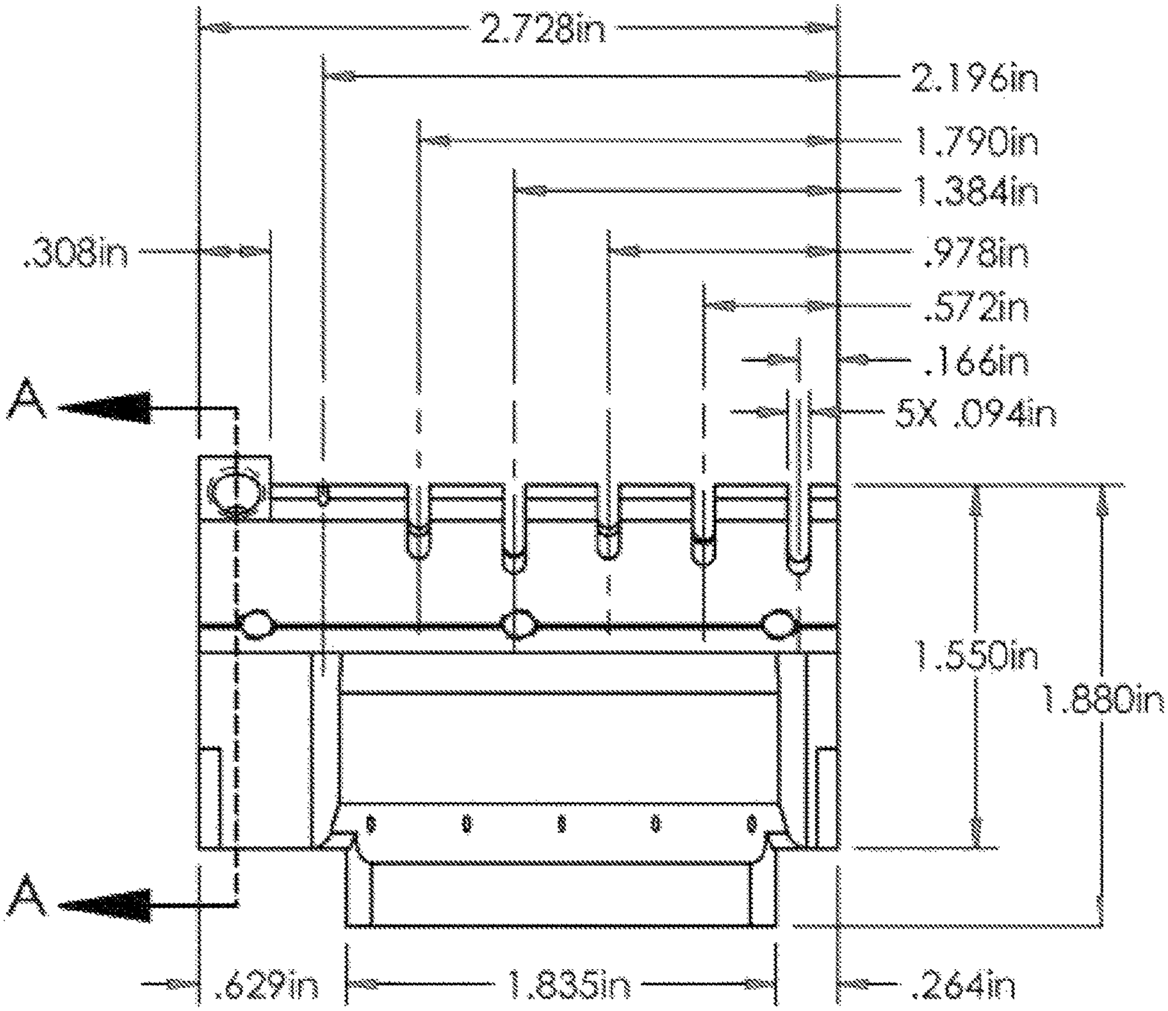
Figure 8E:
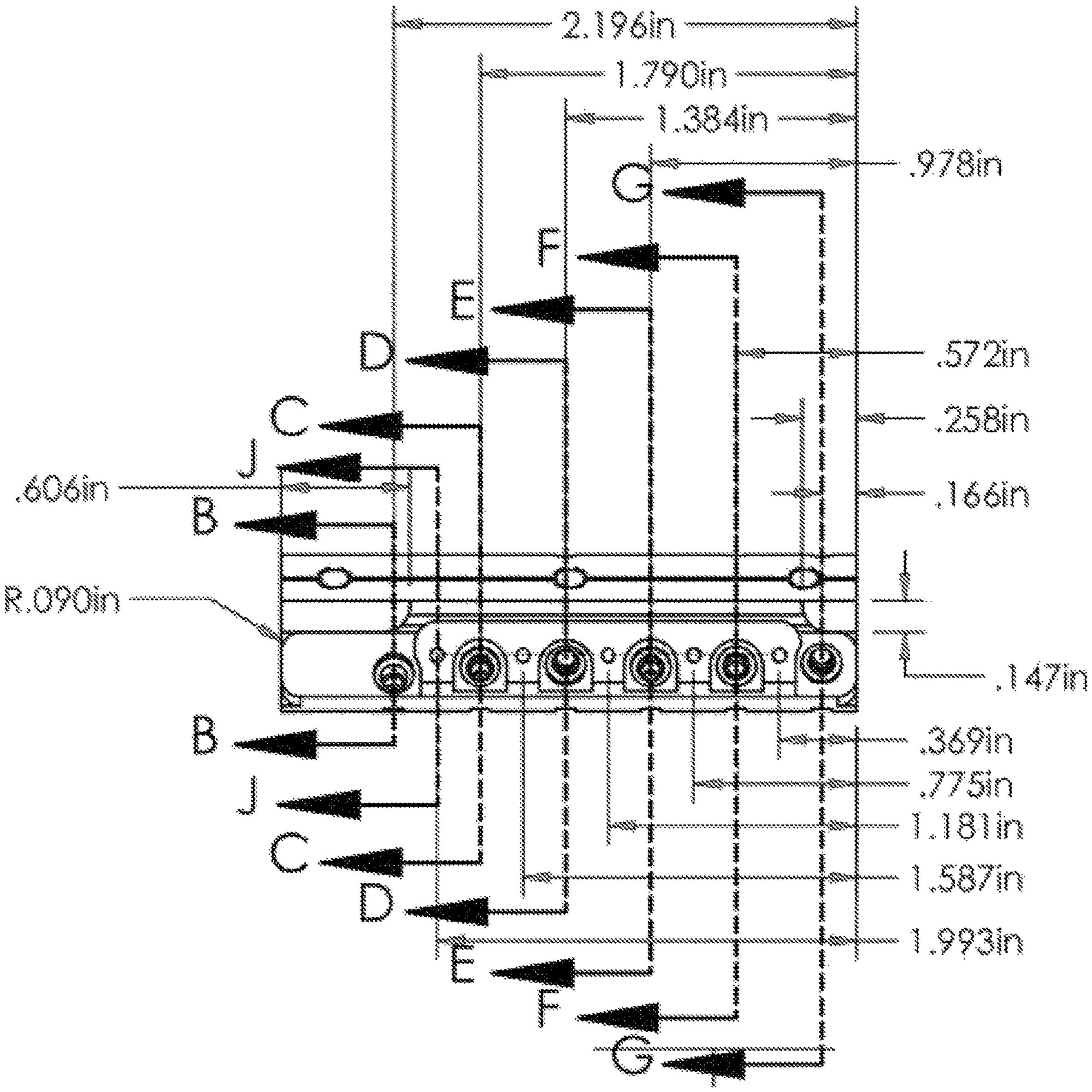
Figure 8F:
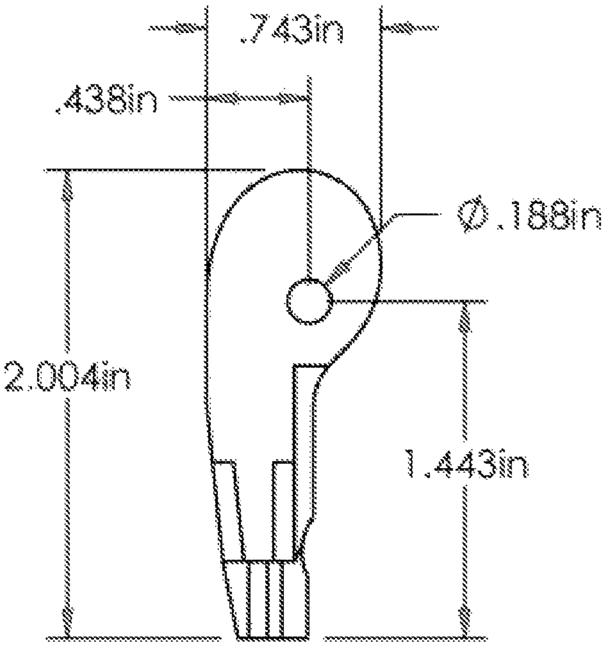
Figure 8G:
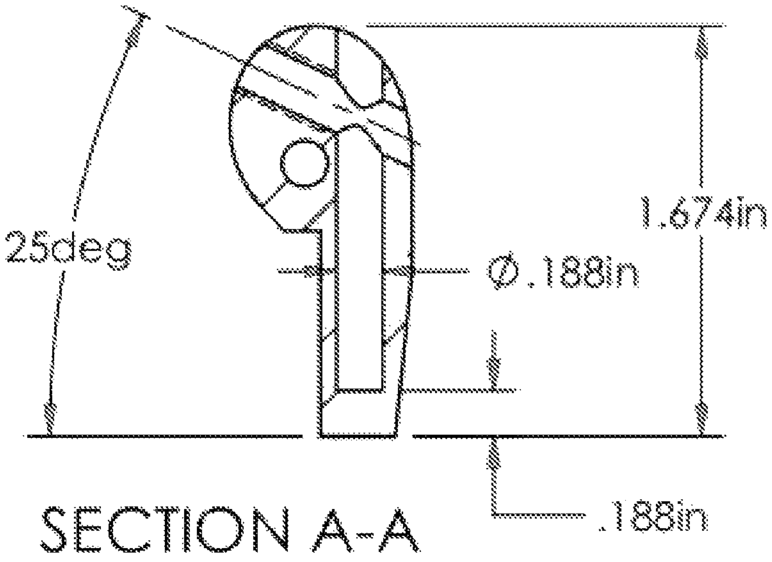
Figure 8H:
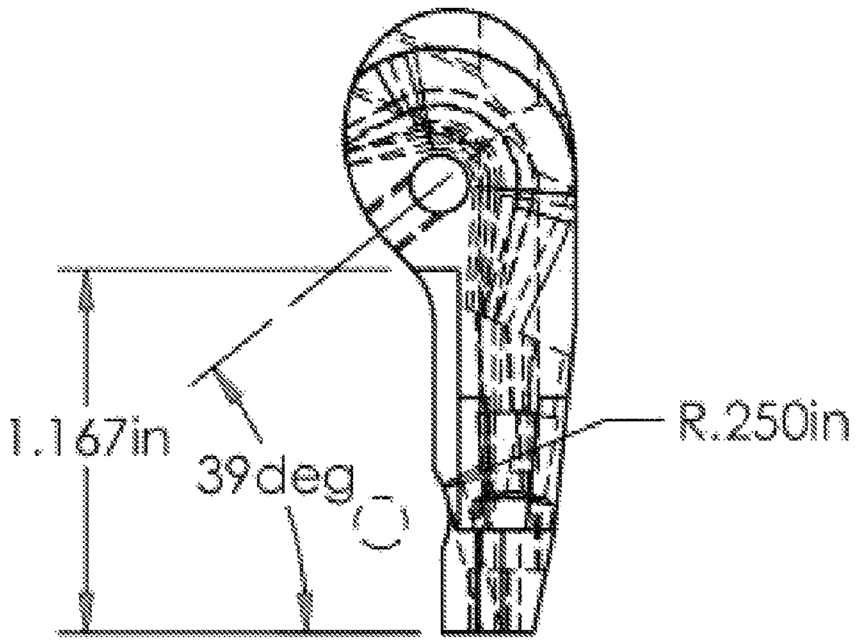
Figure 8I:
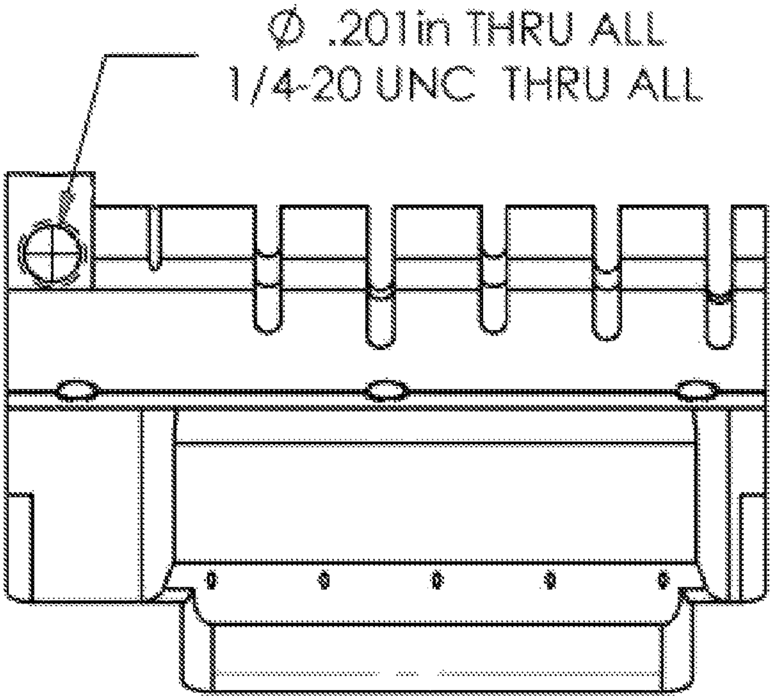
Figure 8J:
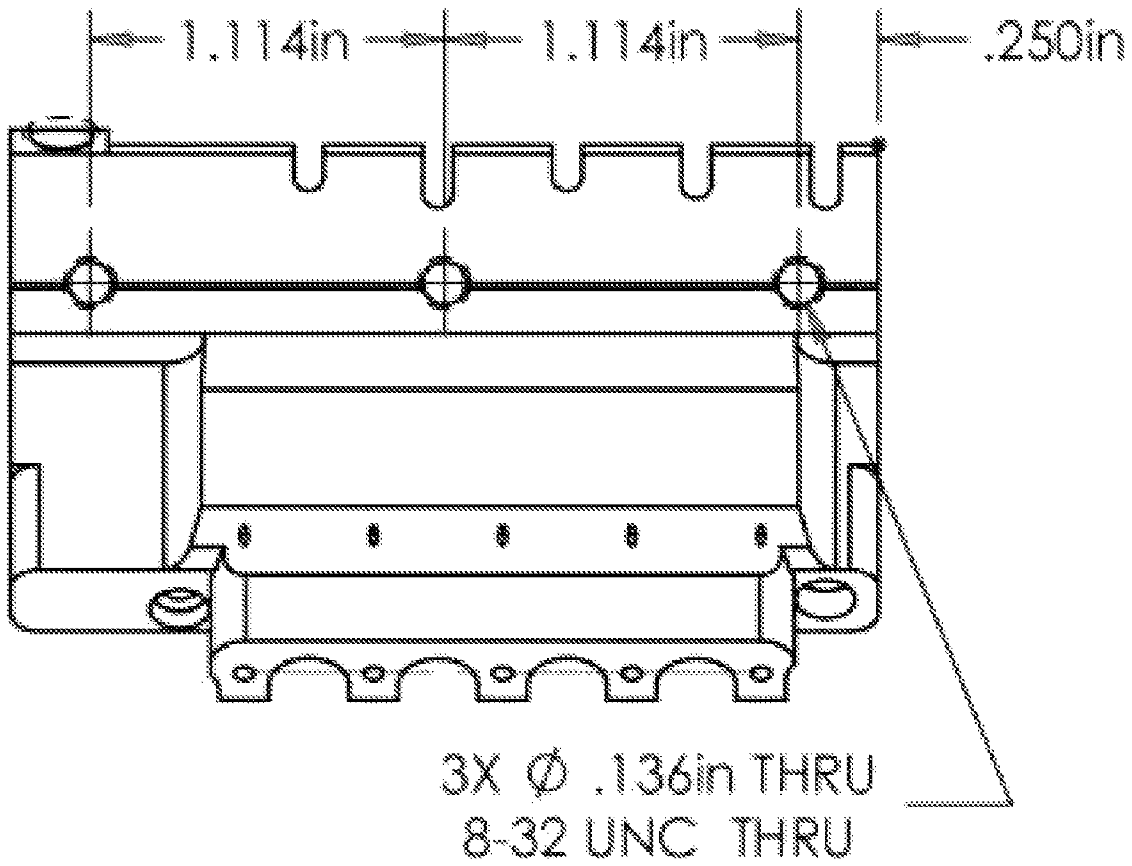
Figure 9A:
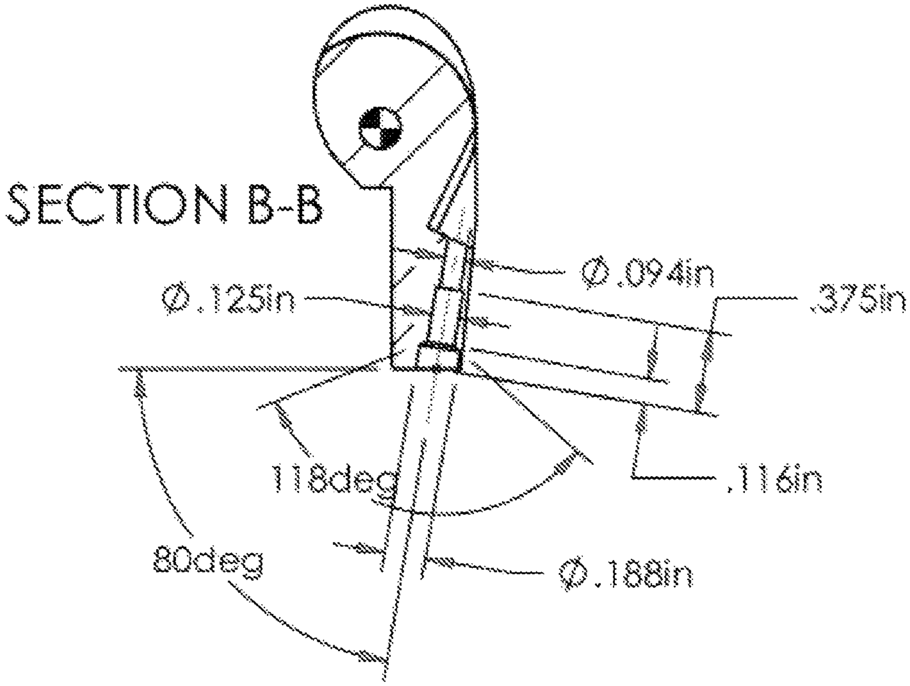
FIGS. 9(*a*)-9(*g*) are cross-sectional views of the example integrated tremolo cam and tremolo lever of FIGS. 8(*a*)-8(*j*) taken along the cross-sections B-B, C-C, D-D, E-E, F-F and G-G of FIG. 8(*e*).
Figure 9B:
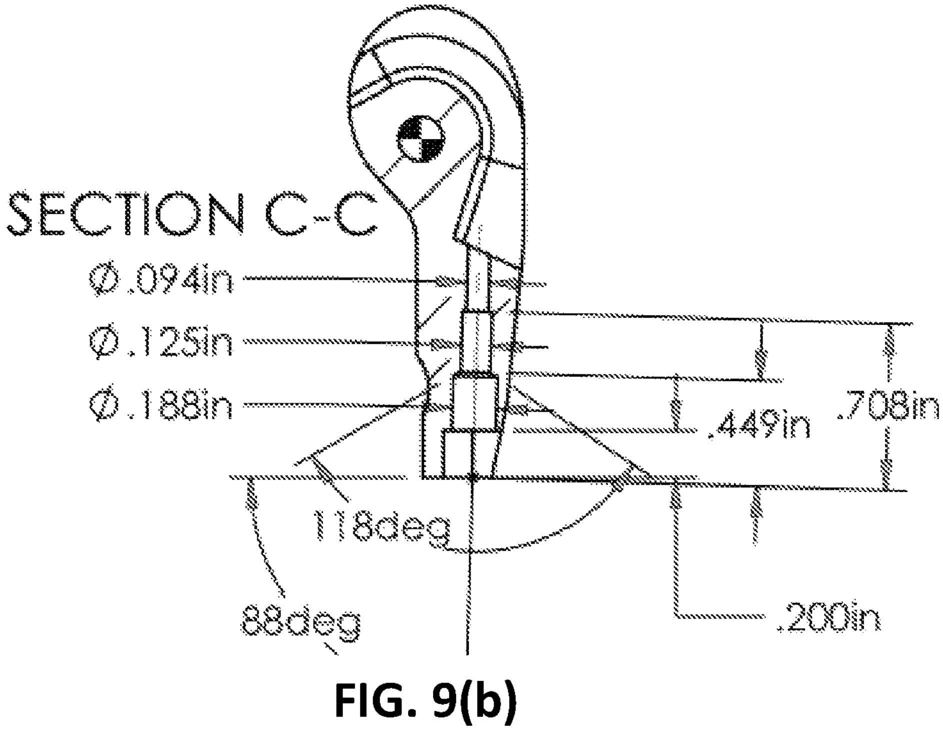
Figure 9C:
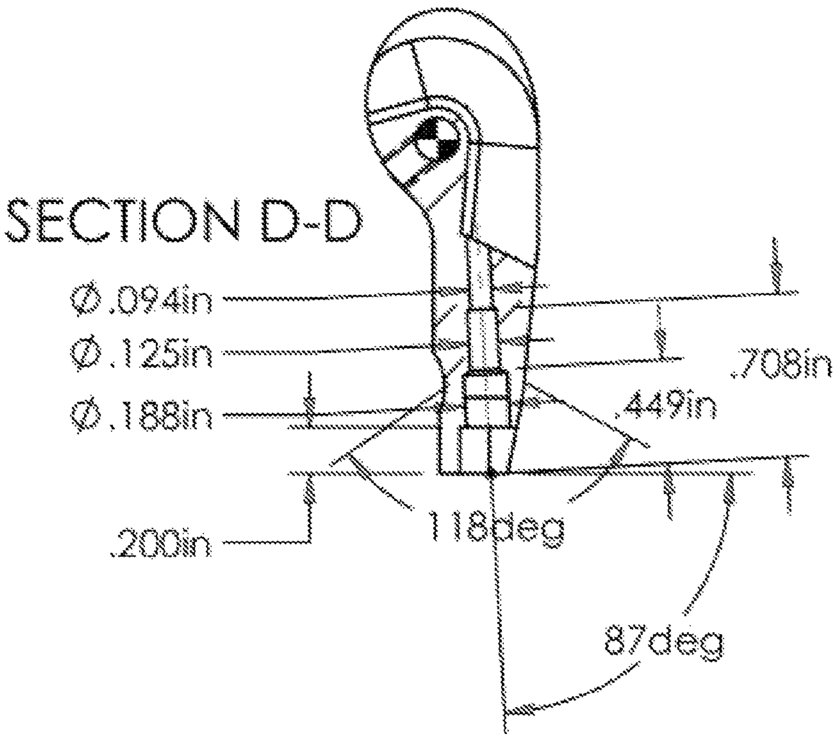
Figure 9D:
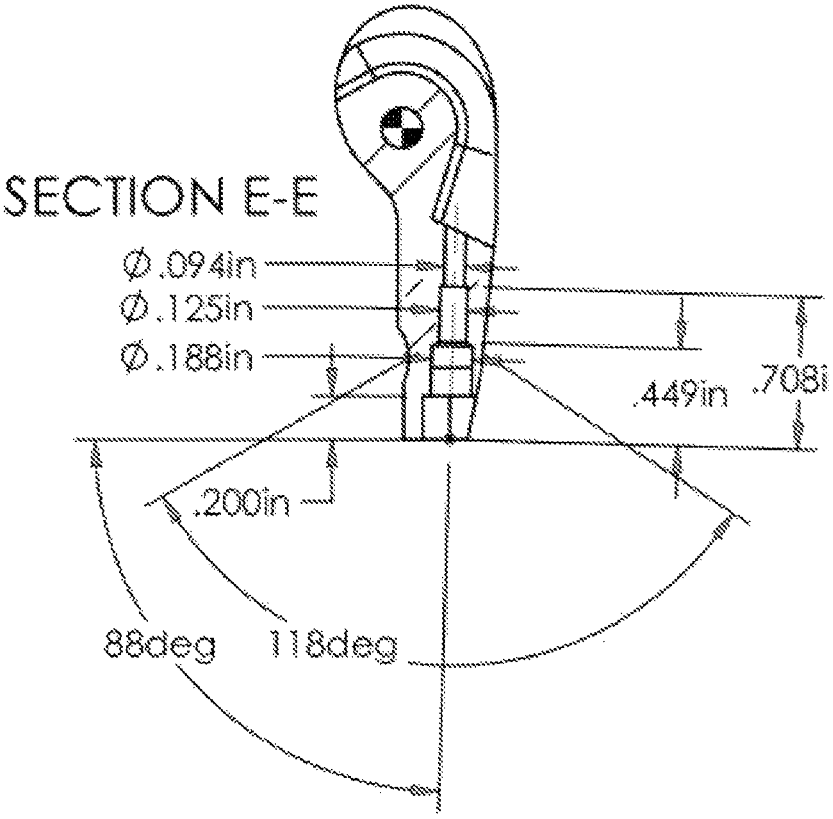
Figure 9E:
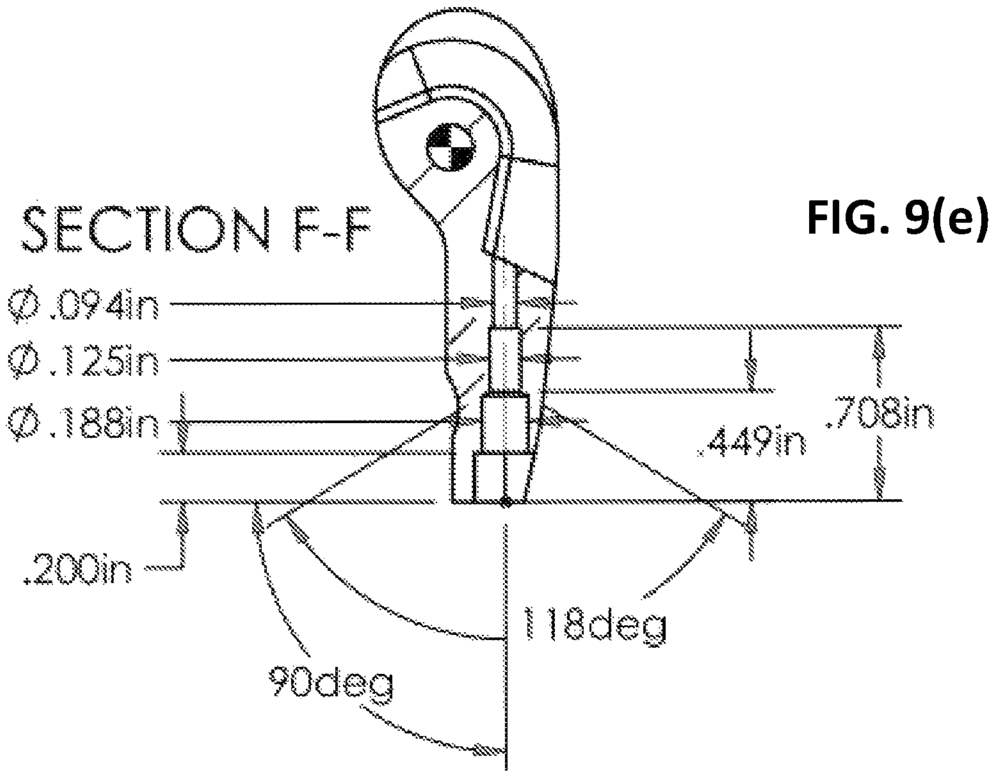
Figure 9F:
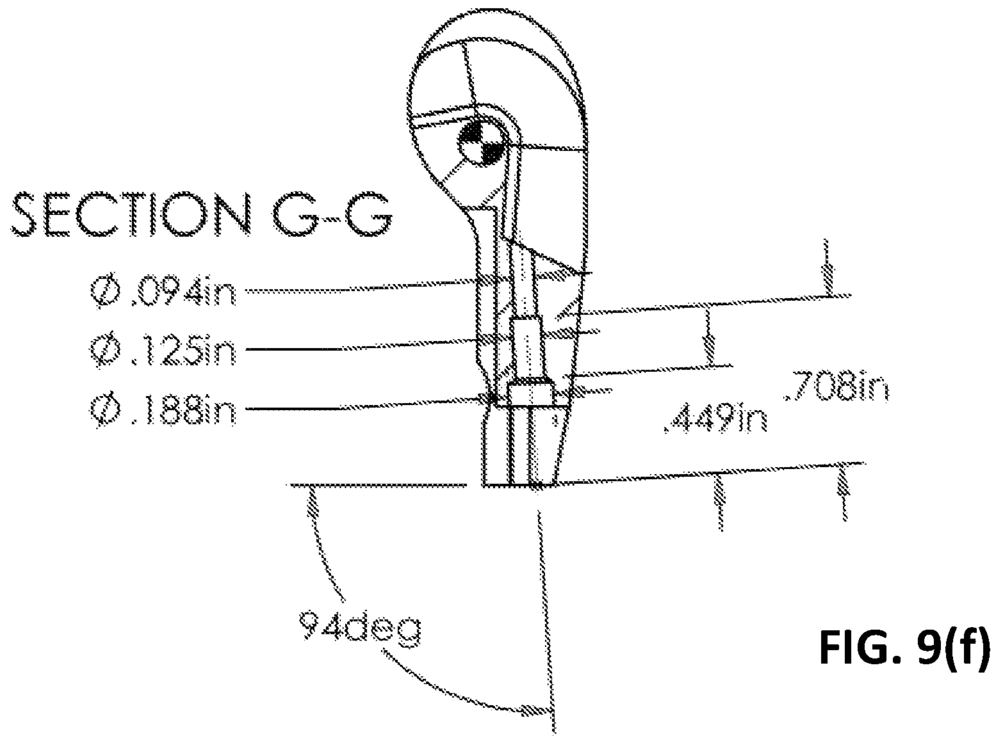
Figure 9G:
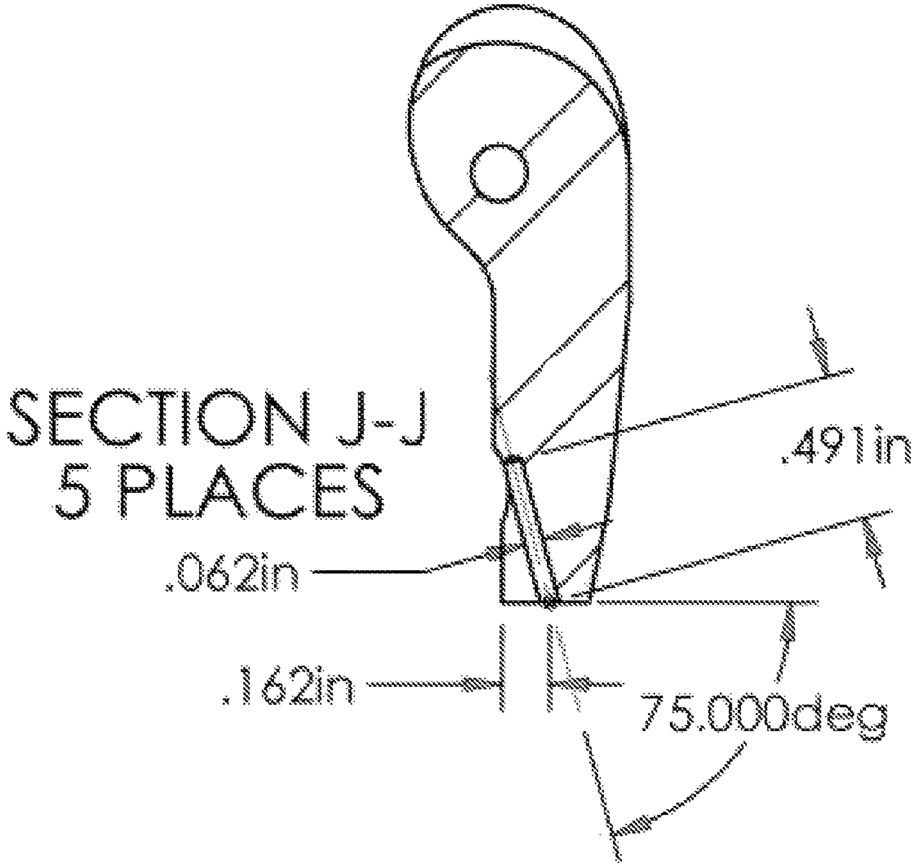
Figure 10A:
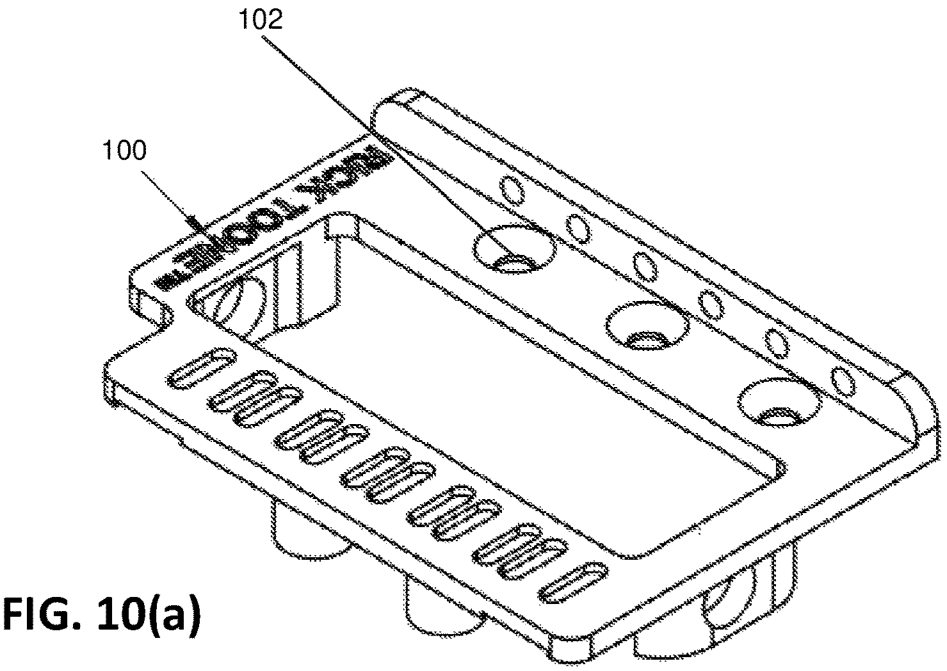
FIGS. 10(*a*)-10(*g*) are views of an example tremolo frame or mount for a tremolo cam, tremolo lever, or integrated tremolo cam and tremolo lever in accord with at least some aspects of the present concepts where FIG. 10(*a*) is a perspective view, FIG. 10(*b*) is a top view, FIG. 10(*c*) is a front view, FIG. 10(*d*) is a bottom view, FIG. 10(*e*) is a partial-sectional rear view taken along section A-A, FIG. 10(*f*) is a side view and FIG. 10(*g*) is a rear view.
Figure 10B:
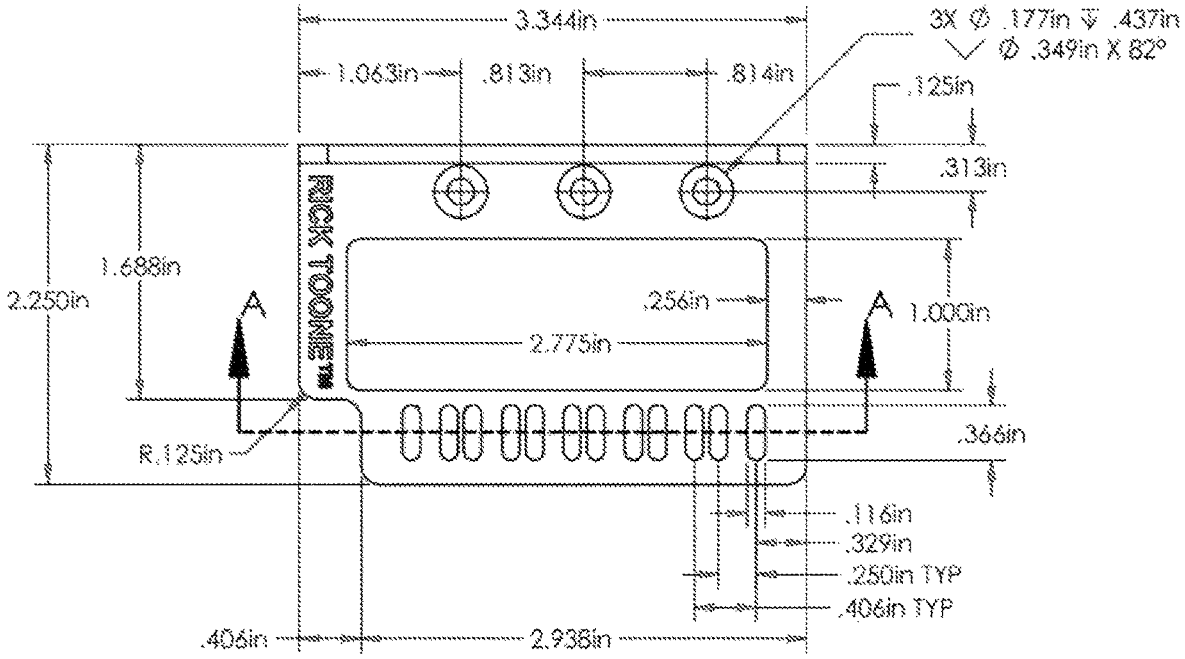
Figure 10C:
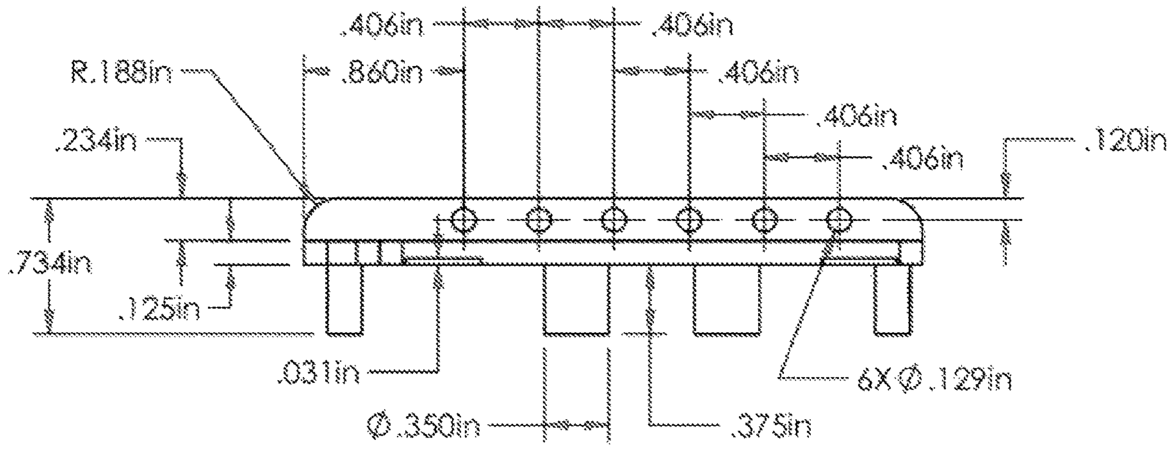
Figure 10D:
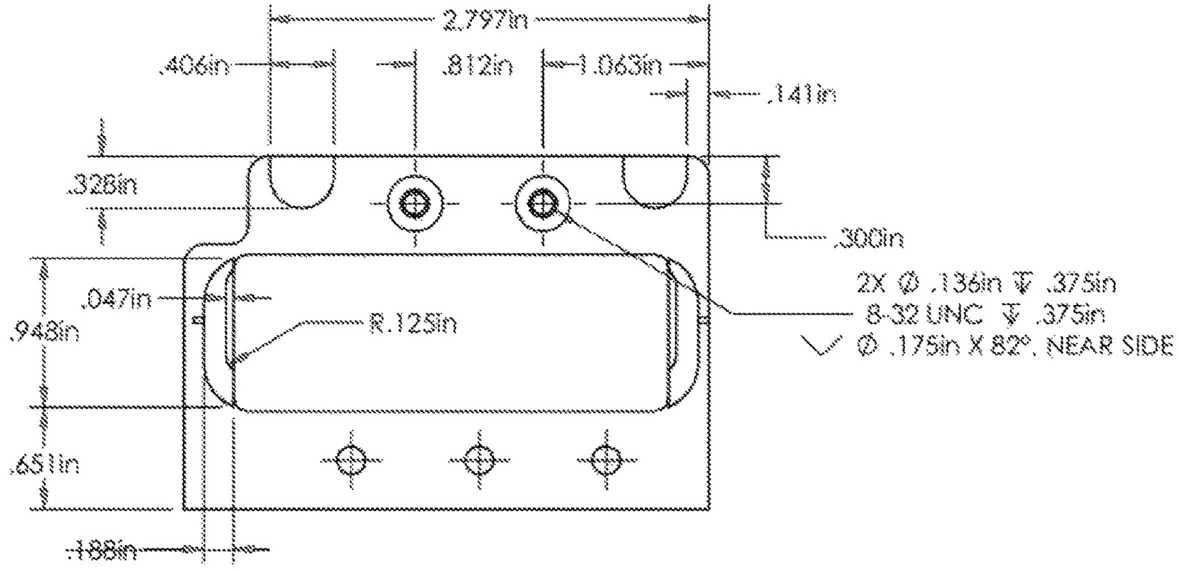
Figure 10E:
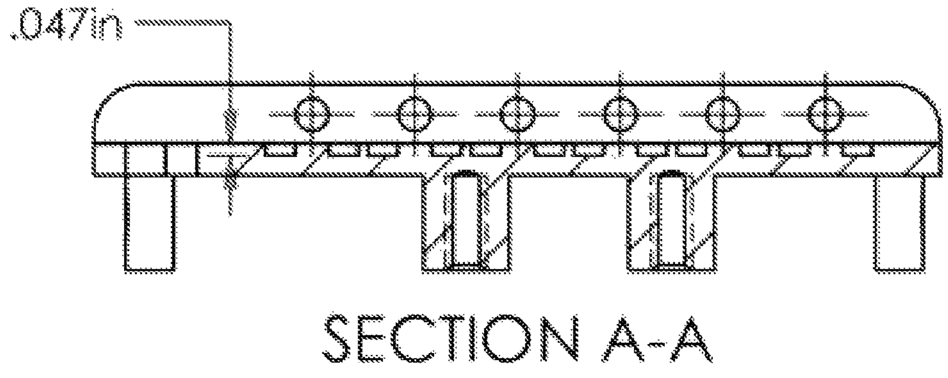
Figure 10F:
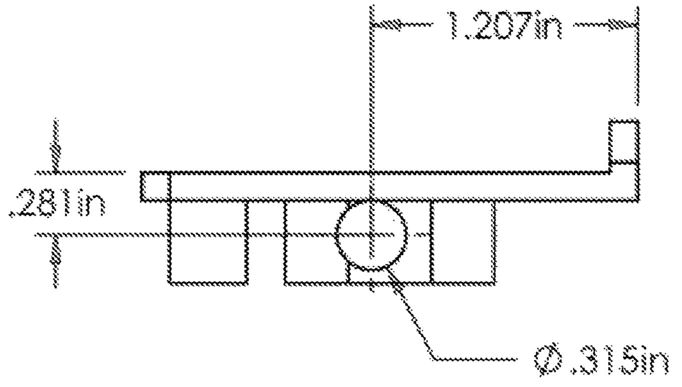
Figure 10G:
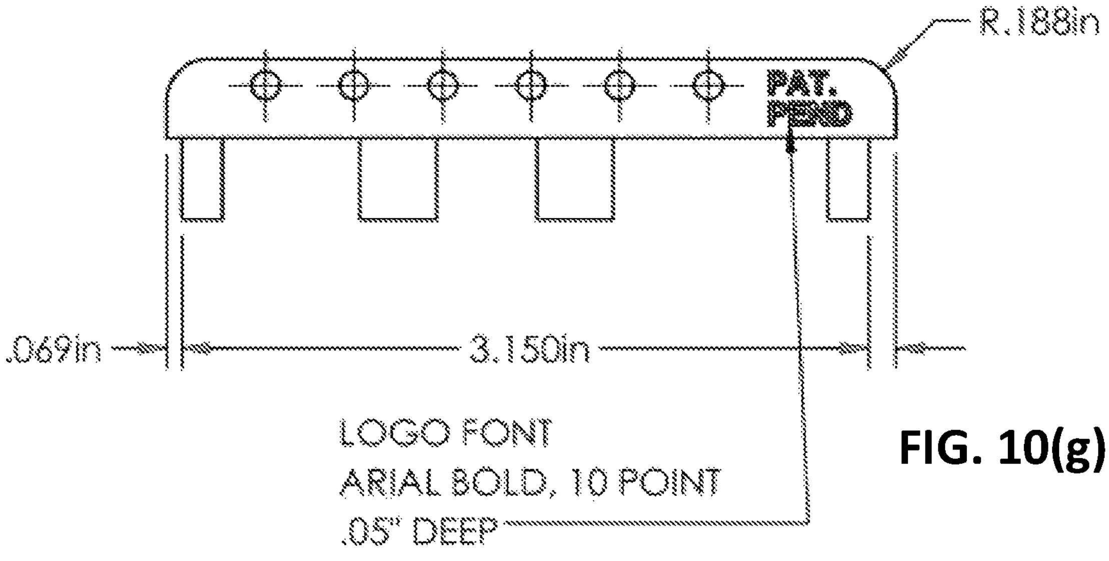

In the example shown in FIGS. 5(*a*)-5(*f*), a plurality of rotatable string contact surfaces (205, 210, 215, 220, 225 and 230) are shown. It is be emphasized the present concepts include a single cam or cam element comprising a single rotatable string contact surfaces as well as a cam or cam element comprising a plurality of rotatable string contact surfaces. For instance, while some embodiments of the present concepts comprise a single tremolo cam 202, whether or not integrated with the tremolo lever 252, comprising a plurality of rotatable string contact surfaces, such as shown by way of example in FIGS. 5(*a*)-5(*f*), other embodiments of the present concepts comprise a plurality of (e.g., two or more) cams 200*a*-200*f*, each having one or more rotatable string contact surface(s) (e.g., 205, 210, 215, 220, 225, 230), such as is shown in the example of FIG. 7 wherein the integrated tremolo cam and tremolo lever 200 comprises a plurality of removably attachable interlocking segments that each include a tremolo cam portion bearing a rotatable string contact surface and a tremolo lever portion.

In some aspects of the present concepts, the cam(s) 200 bearing the rotatable string contact surface(s) is/are attached to the tremolo frame 100 via an axle 250 (e.g., a dowel pin, shaft, etc.) that facilitates rotation of the integrated tremolo cam and tremolo lever 200 relative to the tremolo frame 100.

Figure 14A:
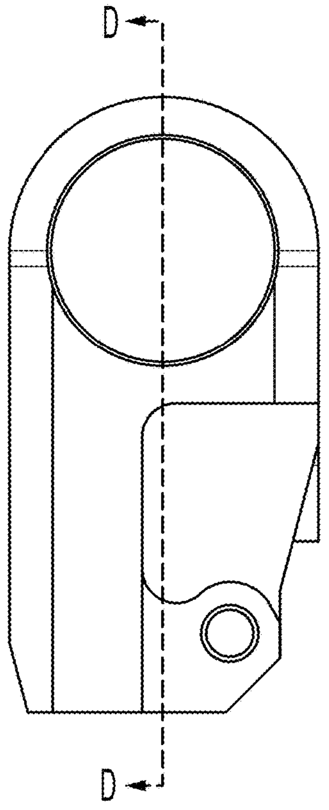
FIGS. 14(*a*)-14(*c*) are views of the example integrated tremolo cam and tremolo lever of FIGS. 13(*a*)-13(*g*), where FIG. 14(*a*) is a side view, FIG. 14(*b*) is a cross-sectional view of FIG. 14(*a*) taken along cross-section D-D, and FIG. 14(*c*) is a bottom view.
Figure 14C:
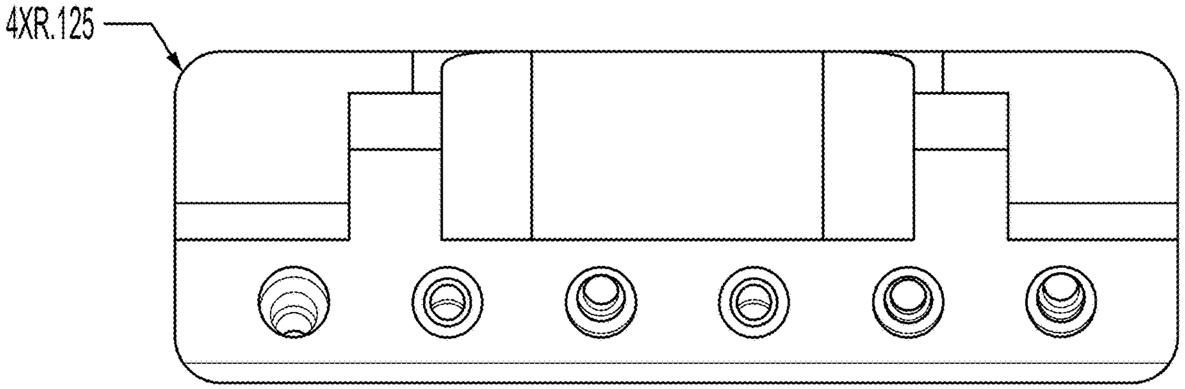
Figure 14B:
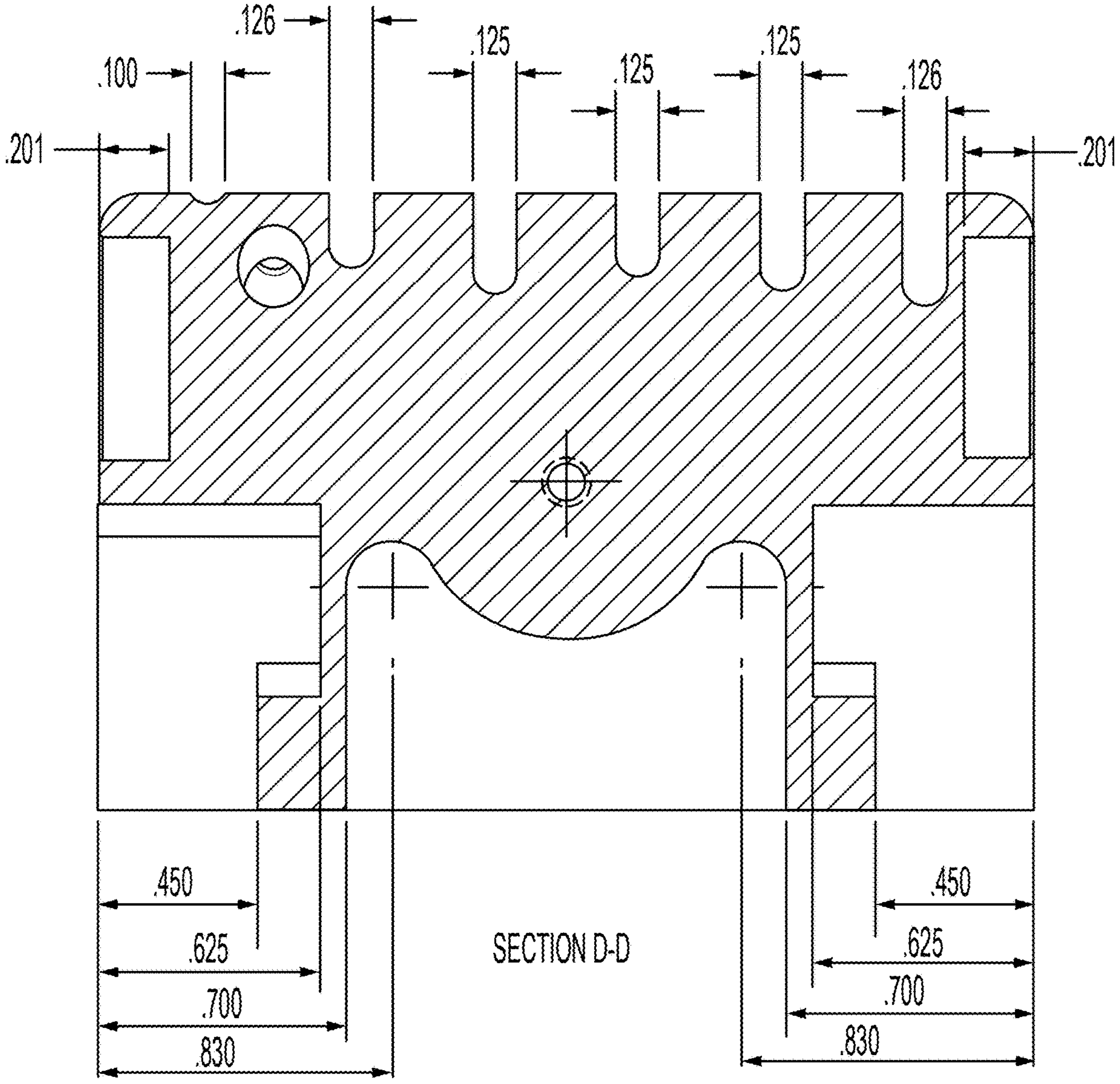
Figure 15A:
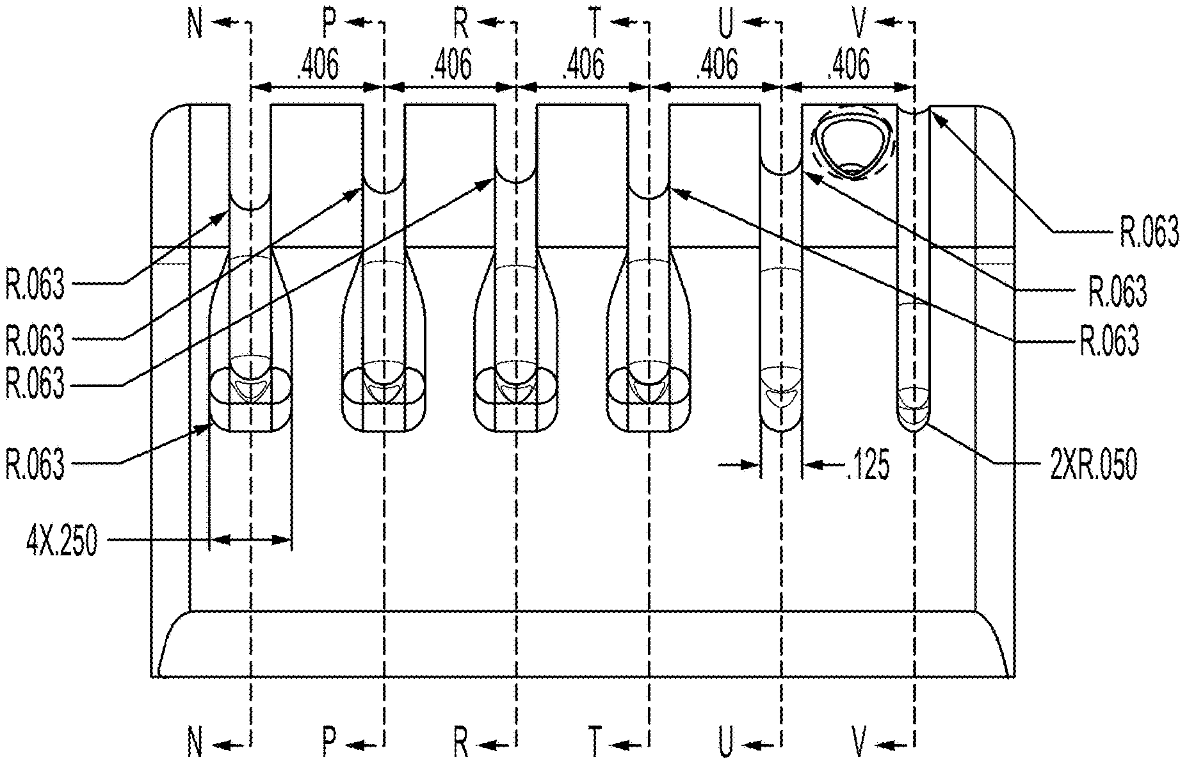
FIGS. 15(*a*)-15(*g*) are views of the example integrated tremolo cam and tremolo lever of FIGS. 13(*a*)-13(*g*), wherein FIG. 15(*a*) is a partial rear view and FIGS. 15(*b*)-15(*g*) are cross-sections taken along the cross-sections R-R, T-T, N-N, P-P, U-U and V-V of FIG. 15(*a*).
Figure 15B:
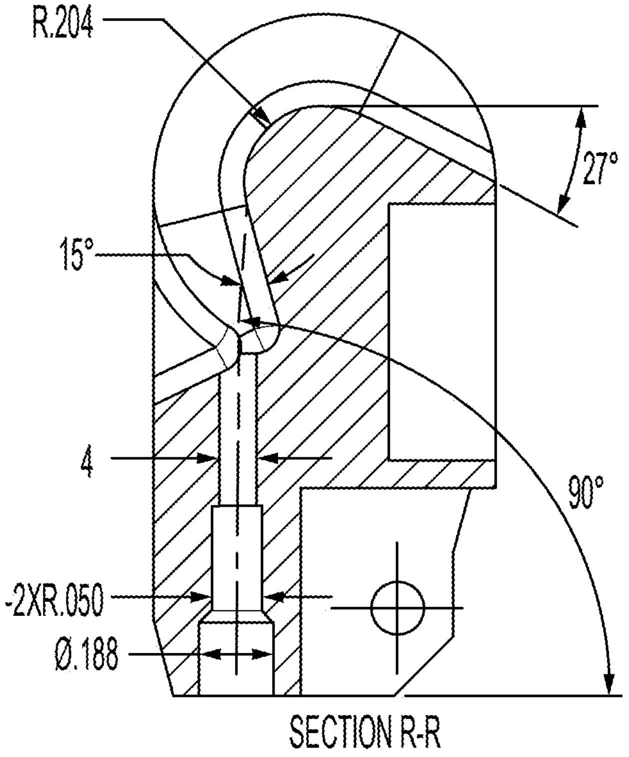
Figure 15C:
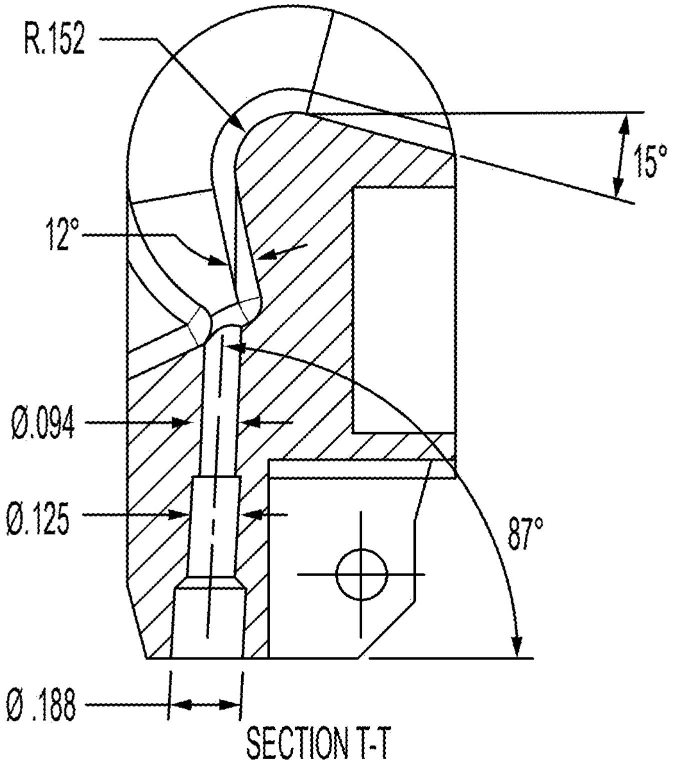
Figure 15D:
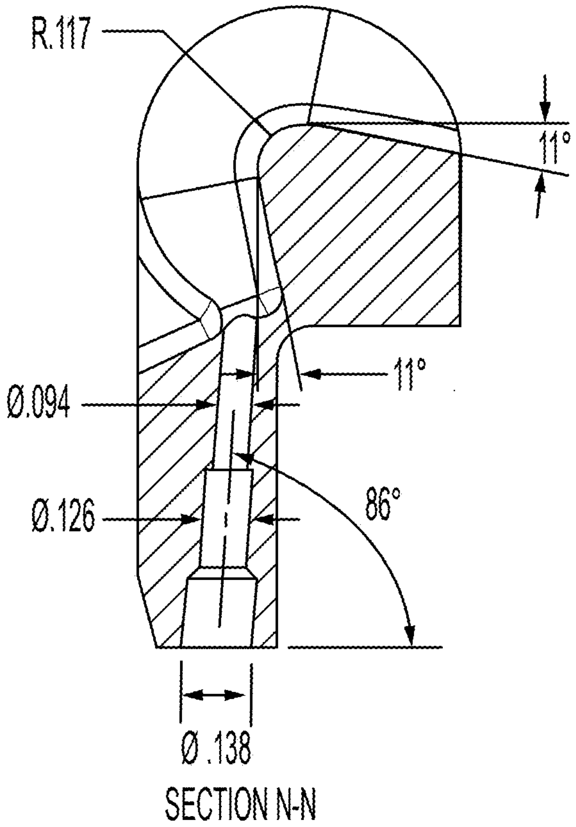
Figure 15E:
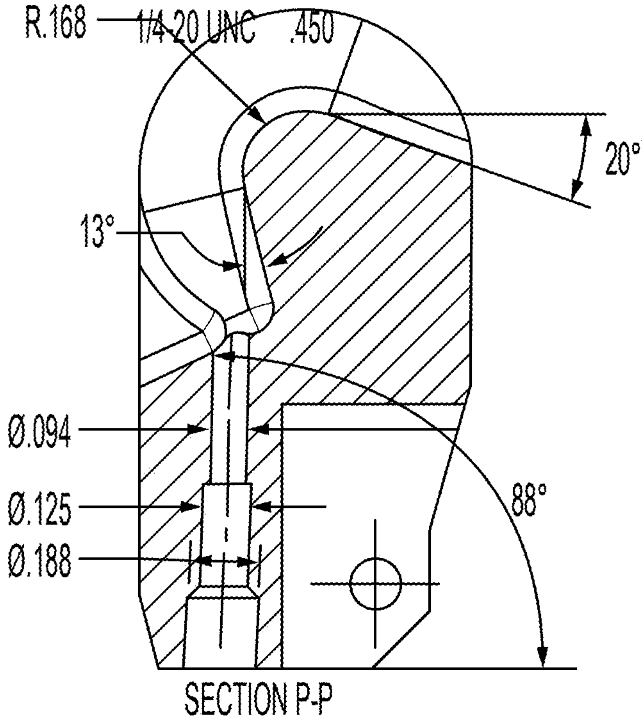
Figure 15F:
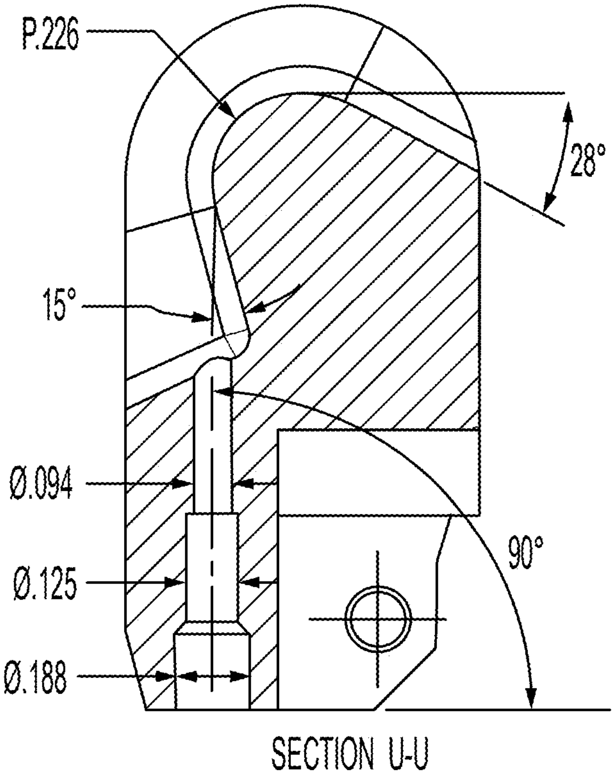
Figure 15G:
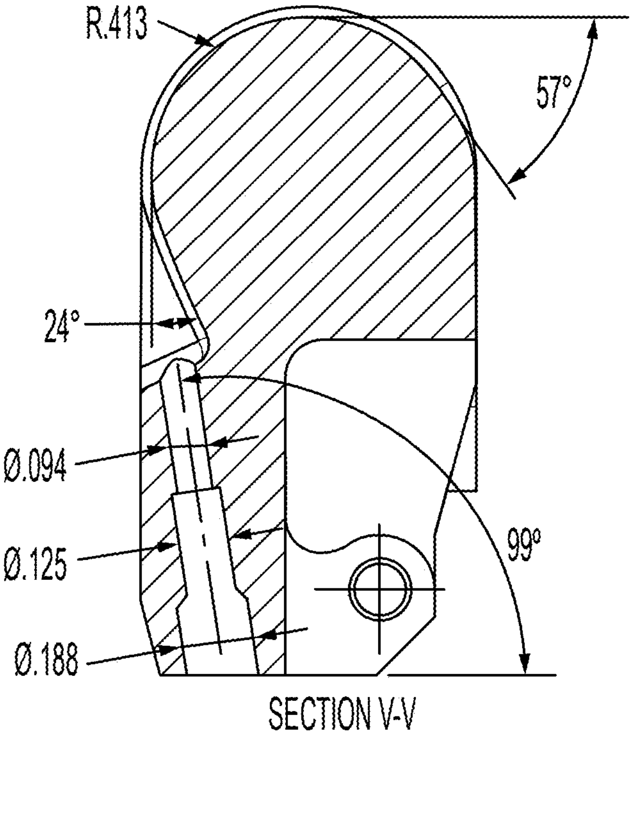
Figure 16A:
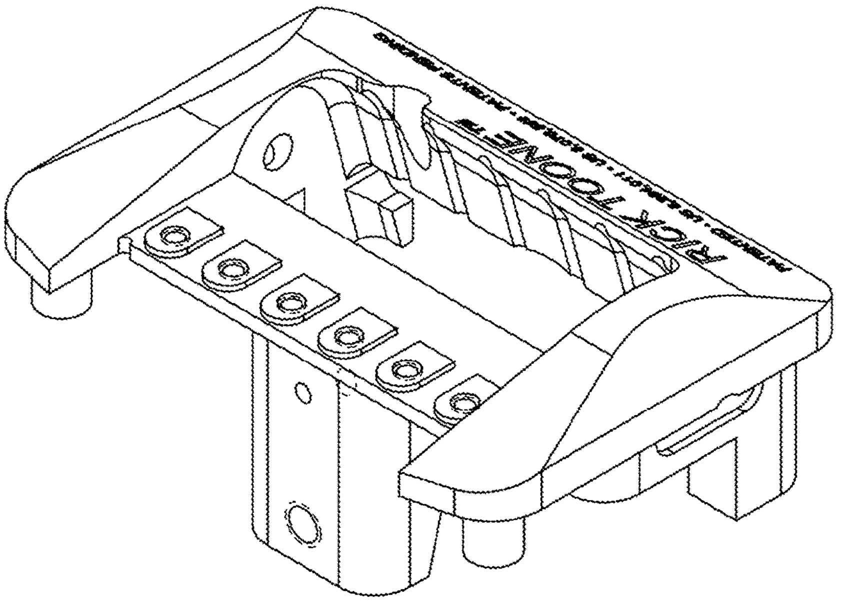
FIGS. 16(*a*)-16(*k*) are views of an example tremolo frame or mount for a tremolo cam, tremolo lever, or integrated tremolo cam and tremolo lever in accord with at least some aspects of the present concepts where FIG. 16(*a*) is a perspective view, FIG. 16(*b*) is a first top view, FIG. 16(*c*) is a second top view, FIG. 16(*d*) is a rear view, FIG. 16(*e*) is a front view, FIG. 16(*f*) is a bottom view, FIG. 16(*g*) is a side view, FIG. 16(*h*) is a cross-sectional view taken along cross-section AE-AE of FIG. 16(*g*), FIG. 16(*i*) is a cross-sectional view taken along cross-section AA-AA of FIG. 16(*e*), FIG. 16(*j*) is a detailed view of feature AC from FIG. 16(*b*), and FIG. 16(*k*) is a detailed view of feature AF from FIG. 16(*g*).
Figure 16B:
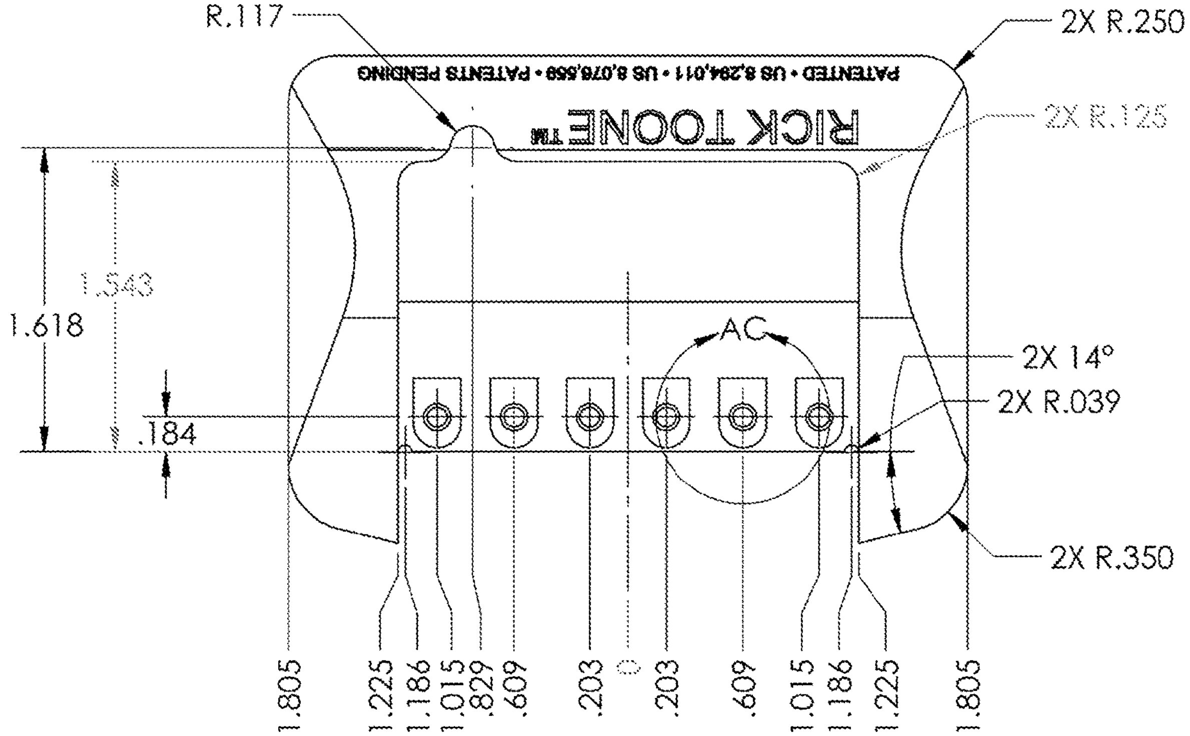
Figure 16C:
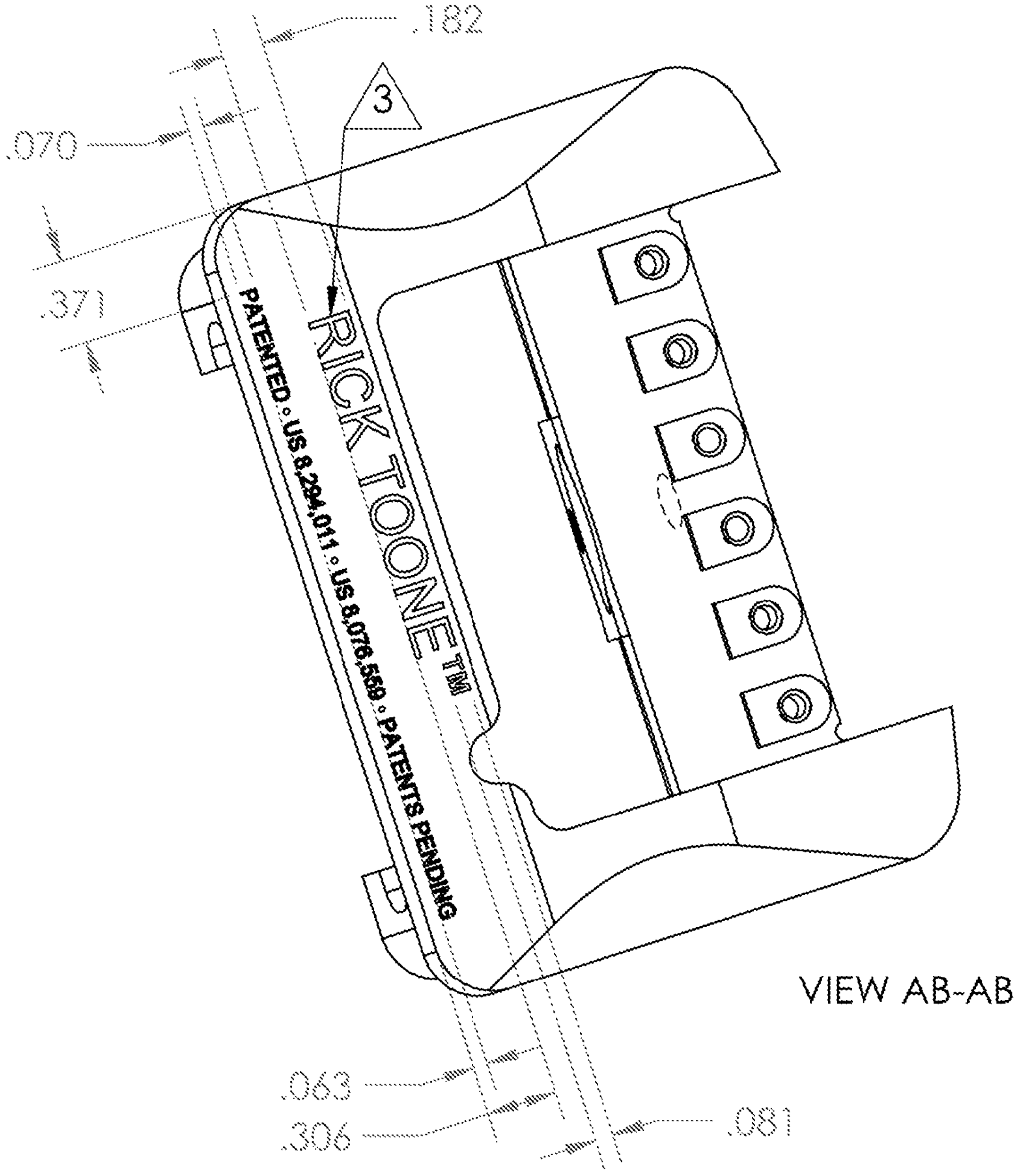
Figure 16D:
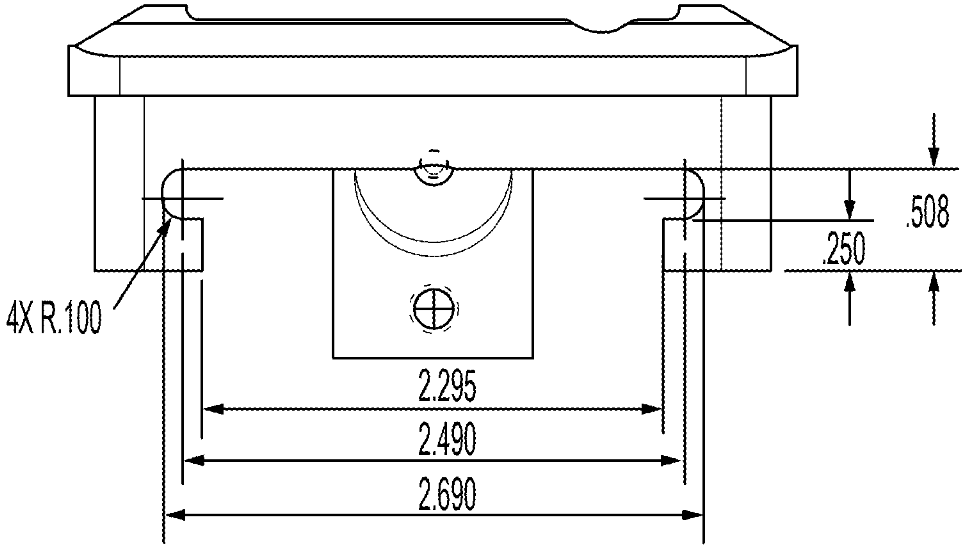
Figure 16E:
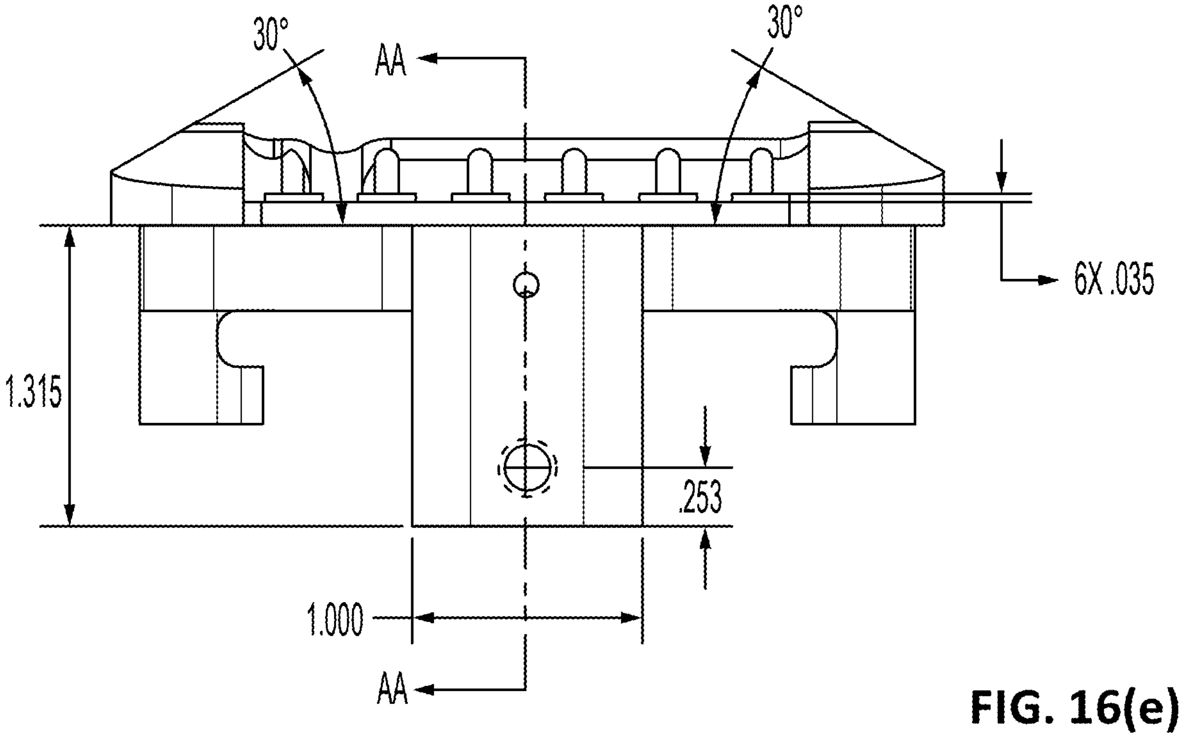
Figure 16F:
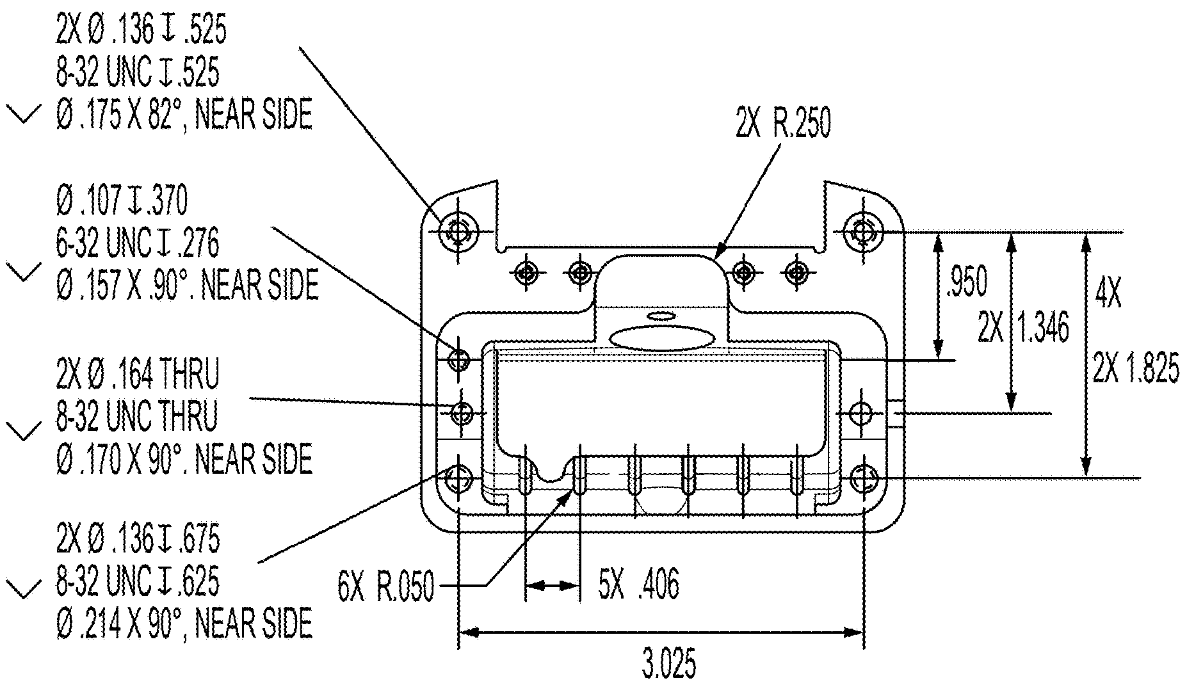
Figure 16G:
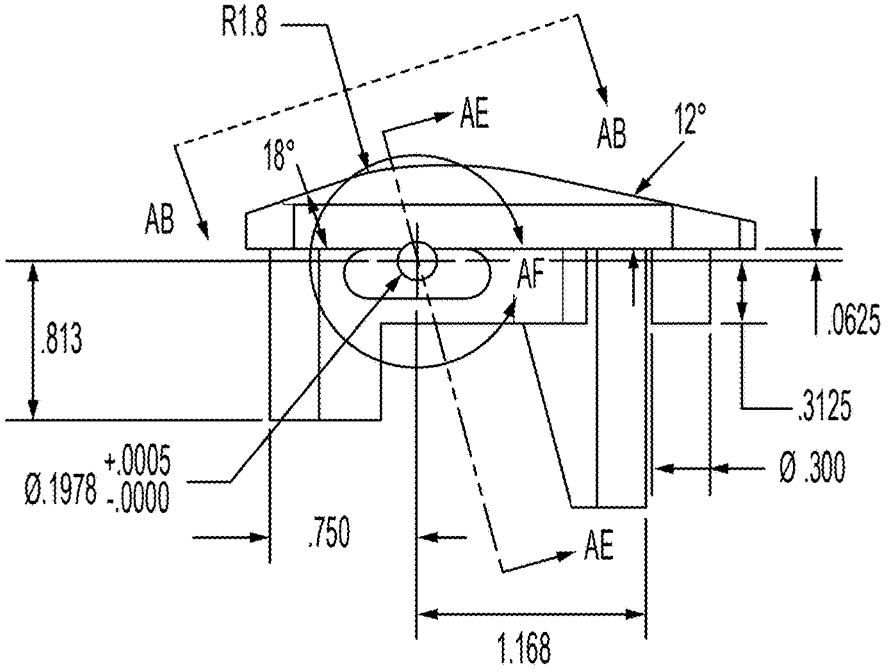
Figure 16H:
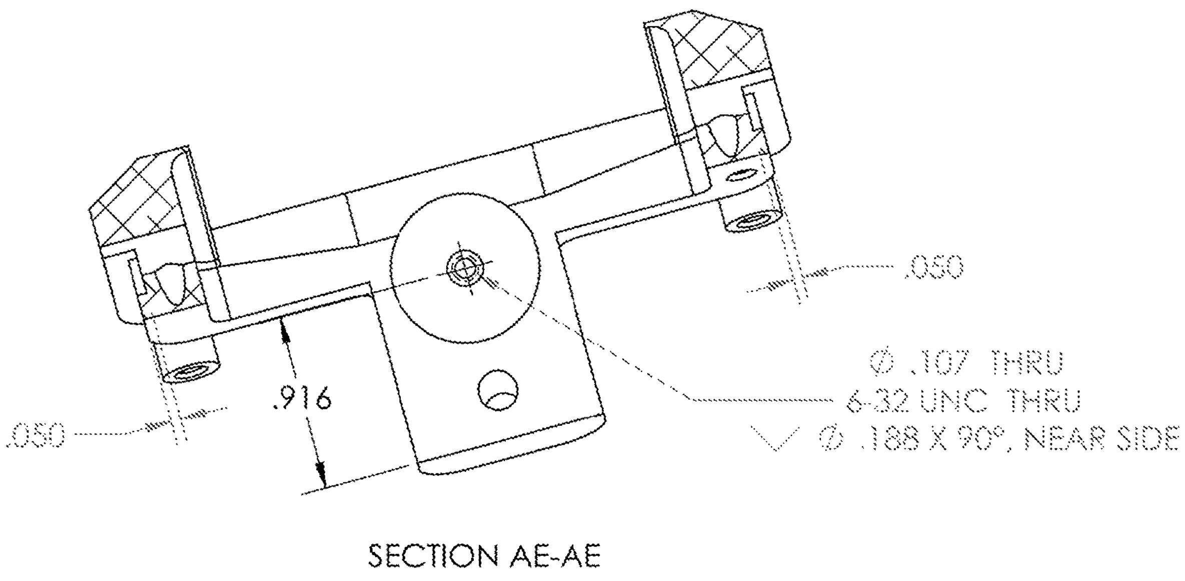
Figure 16I:
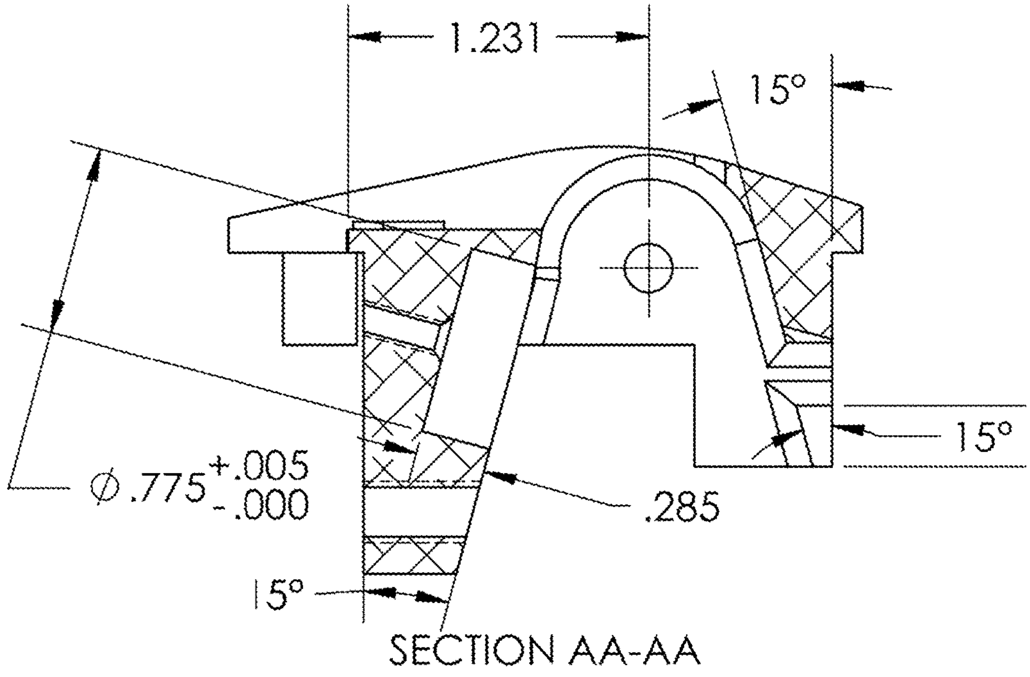
Figure 16J:
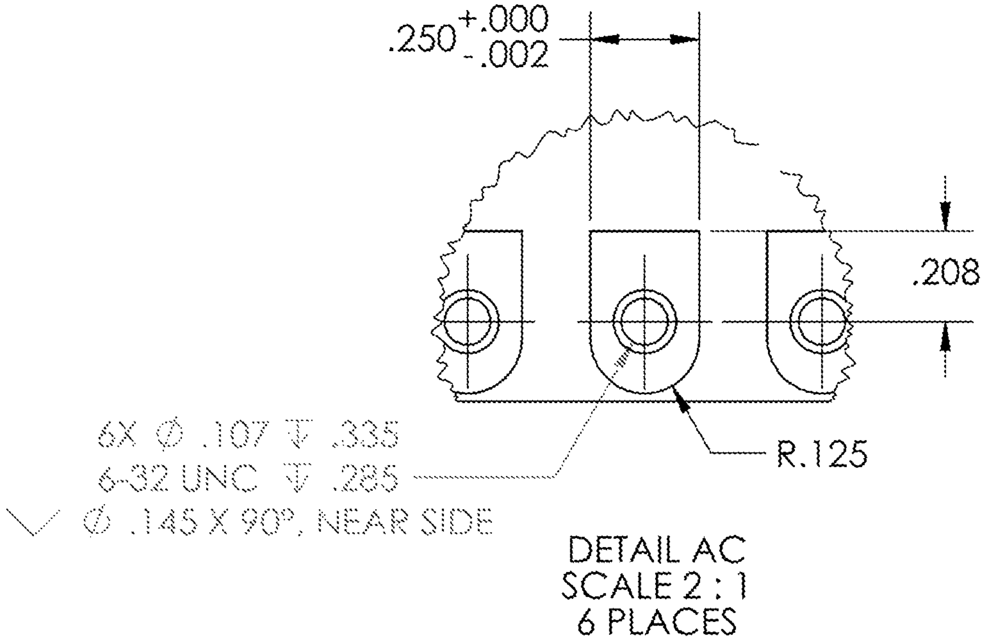
Figure 16K:
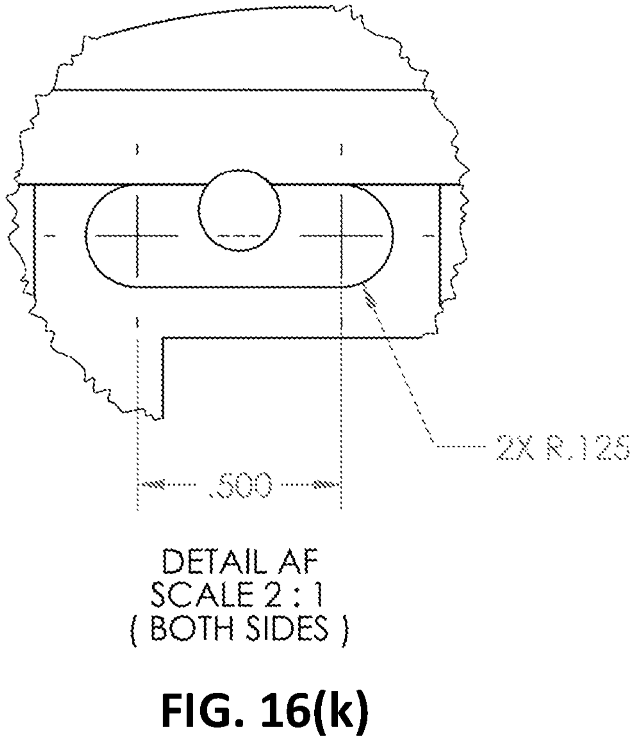
Figure 17A:
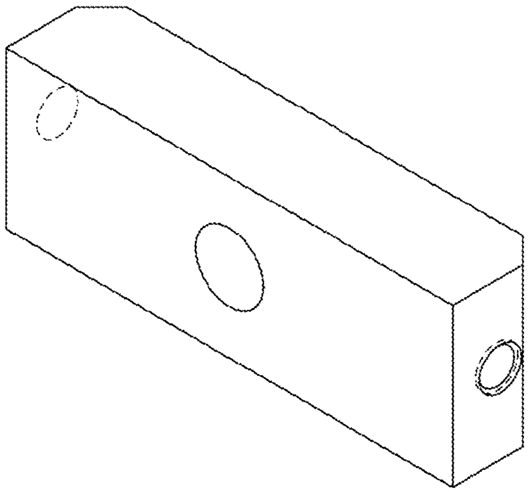
FIGS. 17(*a*)-17(*e*) are views of an example tensioner for an example relative harmonic dynamic pitch control device in accord with at least some aspects of the present concepts where FIG. 17(*a*) is a perspective view, FIG. 17(*b*) is a top view, FIG. 17(*c*) is a front view, FIG. 17(*d*) is a first side view and FIG. 17(*e*) is a second side view.
Figure 17B:
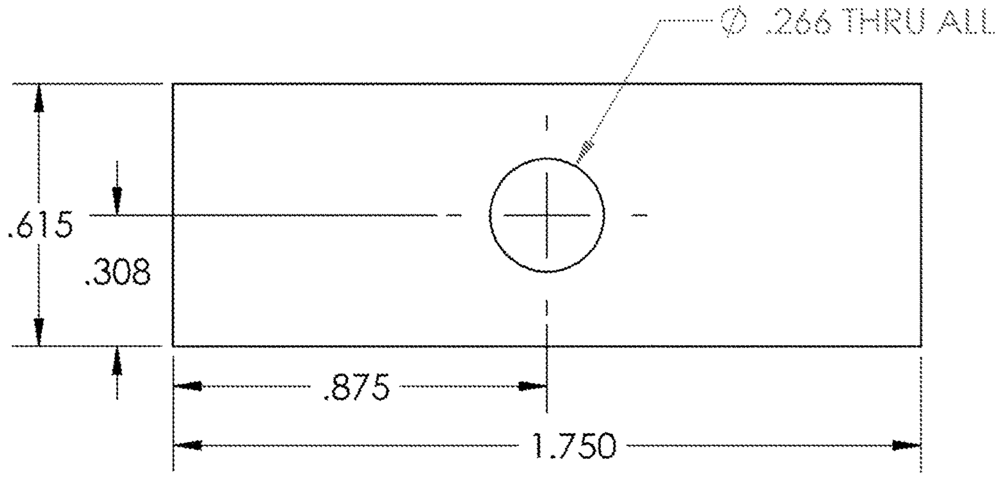
Figure 17C:
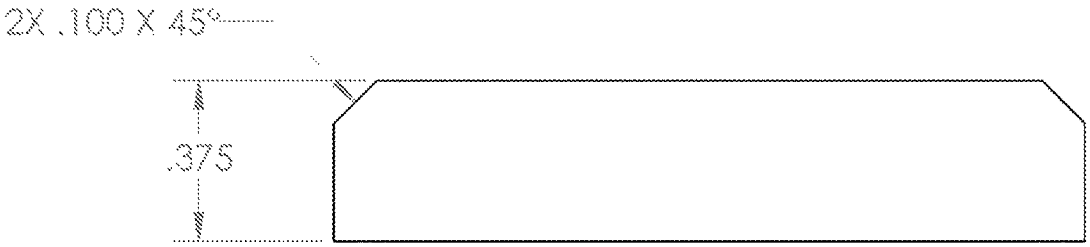
Figure 17D:
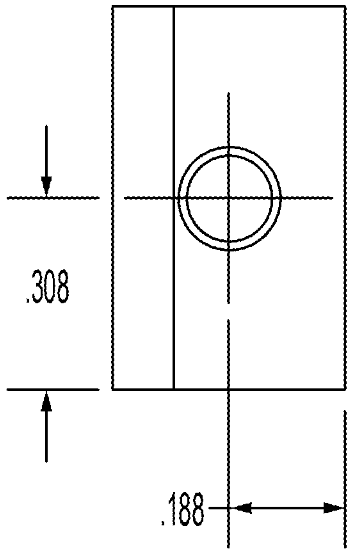
Figure 17E:
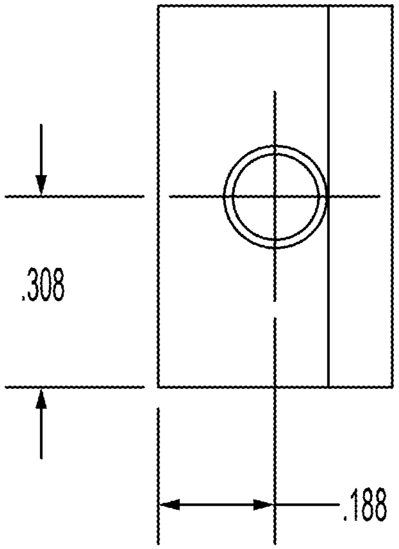

FIGS. 14(*a*)-14(*c*) are views of the example cam of FIGS. 13(*a*)-13(*g*), where FIG. 14(*a*) is a side view, FIG. 14(*b*) is a cross-sectional view of FIG. 14(*a*) taken along cross-section D-D, and FIG. 14(*c*) is a bottom view. In the illustrated embodiment, the rotatable string contact surface (205, 210, 215, 220, 225, 230) are shown to have a lateral widths of 0.10" for the "high e" string and 0.125" for the B, G, D, A and "low E" strings. In some examples, the rotatable string contact surface (205, 210, 215, 220, 225, 230) have uniform lateral widths, such as, but not limited to, a uniform width of between 0.094"-0.10" or between 0.094"-0.125" for the "high e," B, G, D, A and "low E" strings.

In the tremolo embodiments shown by way of example in FIGS. 1-4(*b*), the example integrated tremolo cam and tremolo lever 200 is shrouded within the example tremolo frame 100 and is further disposed beneath a plurality of arched sliders 300 to protect the integrated tremolo cam and tremolo lever 200 and to enhance safety for the user. In other aspects of the present concepts, the arched sliders 300 could be optionally omitted to thereby fully expose the integrated tremolo cam and tremolo lever 200 to, for example, enhance functionality in some respects and/or to alter aesthetics. In yet other aspects of the present concepts, additional example intonation harmonic points may be optionally provided (e.g., a 6×2 array intonation harmonic points 400, either in combination with the arched sliders 300 (e.g., integrated therein) or in aspects wherein the arched sliders 300 are omitted, such as a first set of intonation harmonic points 400 configured to enable rough adjustments and a second set of intonation harmonic points 400 configured to enable fine adjustments) to guide the strings 800 to the respective rotatable string contact surface 205, 210, 215, 220, 225, 230.

FIGS. 28-29 show example tables showing example dimensions and ratios in accord with aspects of the present concepts showing determined relative rate of string pitch tension change between sample strings, ratios realized by the presently disclosed concepts. Guitar strings are sized in different diameters (gauges) and also tuned to different musical pitches. As one non-limiting example, the high E string on a conventionally tuned guitar is typically sized between 0.008" to 0.014" in diameter. As a second non-limiting example, the low E string on a conventionally tuned guitar is typically sized between 0.042" to 0.058" in diameter. Those diameter differences, and the octave pitch spacing of those high E and low E strings, require individuated ratios of string movement to maintain relative harmonic relationship as pitch tension increases or decreases. In the sample image the high E string will change by a ratio of 1/12 in comparison to the low E string which will change by a ratio of 1/42—these example numbers derived to maintain relative pitch accuracy between commercially available conventionally tuned strings as the present concepts alters the tremolo and vibrato effects.

Using the high E string as the baseline, the non-limiting 1/12 ratio can be multiplied by twelve to derive a rotatable surface 200 diameter of 1". Multiplying the non-limiting 1/42 low E string ratio derives a rotatable surface diameter of 0.212".

As a point of consideration, it can be imagined that for a string having a radius "a" wound around a diameter of a rotatable string contact surface (where r=rotatable surface radius) used to control tuning pitch, the greater the distance traveled by the string (distance traveled=(r+a) (theta)), the greater the change in string pitch. Non-limiting calculated example rotatable surface diameters for commercially available conventionally tuned guitar strings, as shown in the example of FIGS. 24(*a*)-24(*g*), yield radii of 0.332" (high E-string), 0.181" (B-string), 0.164" (G-string), 0.135" (D-string), 0.122" (A-string), and 0.098" (low E-string). When a rotatable string contact surface (see, e.g., rotatable string contact surfaces 205, 210, 215, 220, 225 and 230 in FIGS. 5(*a*)-5(*f*)) is concentric to an axis of rotation, the larger the radius of the rotatable string contact surface, the greater the change in pitch per given angular rotation of the integrated tremolo cam and tremolo lever 200.

The greater the change in string tension pitch, the greater the forces acting upon the instrument's neck and neck joint. Increasing string tension pitch places very significant force upon the neck and neck joint, approaching or exceeding twice normal string tension as pitch rises. Conventional technology neck and neck joint designs therefore have practical limits beyond which the lifespan of the guitar is diminished. From those conventional neck technology practical limits, a useful range of practical integrated tremolo cam and tremolo lever 200 (see, e.g., FIGS. 1-6) diameters and shapes for rotatable string contact surfaces 205, 210, 215, 220, 225 and 230 are derivable. In these examples, the highest tuned string determines the largest tremolo cam diameter, and the lowest tuned string determines the smallest tremolo cam diameter.

Another practical useful limit is material failure of a string due to fatigue. Smaller diameter rotatable string contact surfaces cause string failure more rapidly, as evidenced by frequent string breaks at the headstock tuning keys of conventional technology instruments. From those conventional string technology practical limits, a useful range of practical integrated tremolo cam and tremolo lever 200 diameters may be derived. The highest tuned string determines the largest cam diameter, and the lowest tuned string determines the smallest cam diameter, in these non-limiting examples.

With reference to FIGS. 28-29, for example, and in view of the above, calculations for guitar strings in accord with the present concepts are shown using, as a starting point, a selected variety of rotatable string contact surface diameters for a high E string having a ratio of 1/12. With that selected starting point, the example diameters of the remaining strings may then be determined. Thus, where the high E string rotatable string contact surface diameter is set to be 1.25," the correspondingly calculated rotatable string contact surface diameters for the B string, G string, D string, A string and low E string are, respectively, 0.6875", 0.46", 0.616", 0.51" and 0.3537". Where the high E string rotatable string contact surface diameter is set to be 1.125," the correspondingly calculated rotatable string contact surface diameters for the B string, G string, D string, A string and low E string are, respectively, 0.6187", 0.414", 0.554", 0.459" and 0.3183". Where the high E string rotatable string contact surface diameter is set to be 1.00," the correspondingly calculated rotatable string contact surface diameters for the B string, G string, D string, A string and low E string are, respectively, 0.55", 0.368", 0.493", 0.408" and 0.283". Where the high E string rotatable string contact surface diameter is set to be 0.875," the correspondingly calculated rotatable string contact surface diameters for the B string, G string, D string, A string and low E string are, respectively, 0.4812", 0.322", 0.4313", 0.357" and 0.2476". Where the high E string rotatable string contact surface diameter is set to be 0.75," the correspondingly calculated rotatable string contact surface diameters for the B string, G string, D string, A string and low E string are, respectively, 0.4125", 0.276", 0.3697", 0.306" and 0.2122". Where the high E string rotatable string contact surface diameter is set to be 0.625," the correspondingly calculated rotatable string contact surface diameters for the B string, G string, D string, A string and low E string are, respectively, 0.3437", 0.23", 0.308", 0.255" and 0.1768". Where the high E string rotatable string contact surface diameter is set to be 0.5," the correspondingly calculated rotatable string contact surface diameters for the B string, G string, D string, A string and low E string are, respectively, 0.275", 0.184", 0.2465", 0.204" and 0.1415". However, at the low E string rotatable string contact surface diameter of 0.1415", the diameter was determined to cause binding with a tight string bend, so that particular combination is provided as an example of a practical lower limit for the low E string rotatable string contact surface diameter. It bears noting that, although the high E string was used as a starting point by which other rotatable string contact surface diameters were determined, any of the other rotatable string contact surface diameters could have been set as a starting point.

It is noted that practical limits for the embodiments of the integrated tremolo cam and tremolo lever, as to conventional electric guitar body constructions, are reached at a HIGH E diameter of about 1.25" (e.g., it is large in the body of the guitar) at one end and are reached at a LOW E diameter of about 0.14" (e.g., the rotatable surface diameter causes a tight string bend). However, particularly as to the disclosed upper value of the HIGH E diameter, larger diameters could be used with changes to the tremolo frame and/or body of the stringed instrument, to provide additional depth.

It is noted that some styles of music repeatedly employ specific artistic effects, as one non-limiting example Nashville-based music frequently accentuates pitch changes of the B-string on a conventionally tuned guitar. Correspondingly, B-string Nashville variations are shown in FIG. 29, where the high E string rotatable string contact surface diameter is variously set to be 1.250," 1.125", 1.00", 0.875", 0.75", 0.625" and 0.50," the correspondingly calculated rotatable string contact surface diameters for the B-Nashville string (ratio 1/11 as opposed to the ratio of 1/22 in FIG. 28) are, respectively, 1.3625", 1.226", 1.09", 0.9537", 0.8175", 0.68125" and 0.545".

The ratio of string elongation under tension can be applied to an individual string and/or to groups of strings in order to achieve control of musical pitch relative to one another. In the example embodiments of the relative harmonic dynamic pitch control present concepts, each string experiences a simultaneous predetermined increase or decrease in tension, causing groups of strings to rise and fall in relative harmonic pitch relationship.

Alternate embodiments could be configured to achieve string pitches which include but are not limited to: a) rise and fall in discord, b) rise only, c) fall only, d) experience no change, meaning a string or strings is excluded from change within a group arrangement, e) rise or fall by random amounts, f) rise or fall by user-configurable amounts, g) rise or fall by non-linear amounts, for example logarithmic, exponential.

In some examples, the present concepts include a system that controls string pitches by repositioning the string anchor point relative to the bridge string intonation point.

In some examples, the present concepts include a string contact system that controls string pitches by repositioning the string anchor point relative to the bridge string intonation point 400.

In at least some aspects, the rotatable string contact surface(s) (e.g., 205, 210, 215, 220, 225, 230) can be selectively applied to change the pitch of only one string, or of a plurality of selected strings. For example, as shown in the example of FIG. 8, each of a plurality of rotatable string contact surfaces (e.g., 205, 210, 215, 220, 225, 230) can be modularly provided to enable tailoring of each string individually to enable a method of selectively configuring pitch characteristics for a stringed instrument by selectively adding to or subtracting from a rotatable string contact surface to thereby change the pitch of the selected string (e.g., selecting from one of a plurality of tremolo cam portions (or integrated tremolo cam and tremolo lever portions) bearing a variety of different low E string rotatable string contact surfaces, etc.) to enable, for instance, user-controlled effects. In various examples, rotatable string contact surfaces could be selectable on an individual string basis (e.g., only the high E string, only the B string, etc.) or may be selectable for a plurality of strings (e.g., only the high E and the B string, only the B string and G string, the high E, the B string, and the G string, etc.) that are adjacent or non-adjacent.

It is noted that, while FIGS. 28-29 provide example ratios and example dimensions in accord with aspects of the present concepts, the present concepts include variations thereof. For instance, in some aspects, the D ratio may be 1/25 and/or the LOW E ratio may be 1/43 and/or the A ratio may be 1/25 and/or the G ratio may be 1/32. Moreover, the example ratios provided particularly relate to examples corresponding to an integrated tremolo cam and tremolo lever for a 6-string stringed instrument (e.g., guitar) and greater variability of dimensions and ratios are achievable when a lesser number of strings, particularly adjacent strings, are selected for dynamic pitch control.

In additional aspects, the curvilinear surface of one or more of the rotatable string contact surface(s) can vary over the arc of the rotatable string contact surface allowing greater relative pitch change either in a selected rotation direction or for a selected angle of rotation.

Additionally or alternatively to the above-described examples, the example integrated tremolo cam and tremolo lever portions (see, e.g., FIG. 8) bearing one or more of the rotatable string contact surface(s) (e.g., 205, 210, 215, 220, 225, 230) are optionally configurable (e.g., by a user) to adjust a position of the individual rotatable string contact surface(s) and/or the entire integrated tremolo cam and tremolo lever 200 along one or more axes (e.g., laterally and/or vertically), such as by including adjustment devices to incrementally displace the example integrated tremolo cam and tremolo lever 200 shaft upwardly, downwardly, fore and/or aft.

The pivot point for the integrated tremolo cam and tremolo lever 200, or the example integrated tremolo cam and tremolo lever portions, about which the rotatable string contact surface rotate, may comprise, for instance, a) an axle, b) multiple axles, c) a thru-axle, d) a pivot point or points such as a knife edge, e) a round axle, or f) an asymmetrical axle. The location of the pivot point may be advantageously adjustable, providing user-configurable pivot or rotation effects. The relative locations of the pivot points may be in alignment with each other, or not in alignment with each other, both of which configurations have unique effects. A combination of rotation pivot designs may be used.

In some aspects, the shaft or axle 250 supporting or guiding the rotation of the integrated tremolo cam and tremolo lever 200, or the example integrated tremolo cam and tremolo lever portions, can be cammed (e.g., via curvilinear slots) to cause the rotatable string contact surfaces to collectively rotate at differing rates relative to the starting rate of rotation.

Building upon at least some of the concepts above, multiple different rotatable string contact surface(s) (e.g., 205, 210, 215, 220, 225, 230) pivot locations could be employed. For example, the shaft or axle 250 supporting or guiding the rotation of the integrated tremolo cam and tremolo lever 200, or the example integrated tremolo cam and tremolo lever portions, can comprise one or more features (e.g., a semi-circular slot) causing one or more of the rotatable string contact surface(s) to rotate at differing rates relative to the starting rate of rotation.

In accord with aspects of the present concepts, the rotatable string contact surface(s) (e.g., 205, 210, 215, 220, 225, 230) may be selectively included, or selectively excluded, to respectively include or exclude one or more strings from the effects of the integrated tremolo cam and tremolo lever 200, or the example integrated tremolo cam and tremolo lever portions. For instance, a unit may be configured to only pitch bend selected strings, while other strings are bypassed and thus maintain constant pitch.

In accord with aspects of the present concepts, rotatable string contact surface(s) comprise an additive or subtractive series of rotational effects. For example, a stackable series of rotatable string contact surface(s) of differing diameters or radiuses, each of which is calibrated to impart an effect on the pitch of a string.

In accord with aspects of the present concepts, rotatable string contact surface(s) comprise a rotation pivot 250 location that is adjustable relative to the frame of the musical instrument, providing options for selectively adjusting the location of the rotatable string contact surface(s). Doing so can, for example, lower a profile of the tremolo so as to protrude less from the instrument.

In accord with aspects of the present concepts, the integrated tremolo cam and tremolo lever 200, or the example integrated tremolo cam and tremolo lever portions, rotation pivot 250 comprises a stepped axle, allowing additional string-to-string calculated example diameters for the rotatable string contact surface(s).

In the examples herein, magnets 550 are disposed within a (shielded) structure (e.g., recess) to modify force countering string pitch tension. The magnets supplement the spring forces, reducing user input force required, and additionally serve to dampen string and spring oscillations, causing string musical pitches to perform with controllable and precise response. In at least some alternate embodiments, the magnets may be omitted.

Building on concepts above, an alternate embodiment could use magnets in lieu of one or more springs.

Figure 12A:
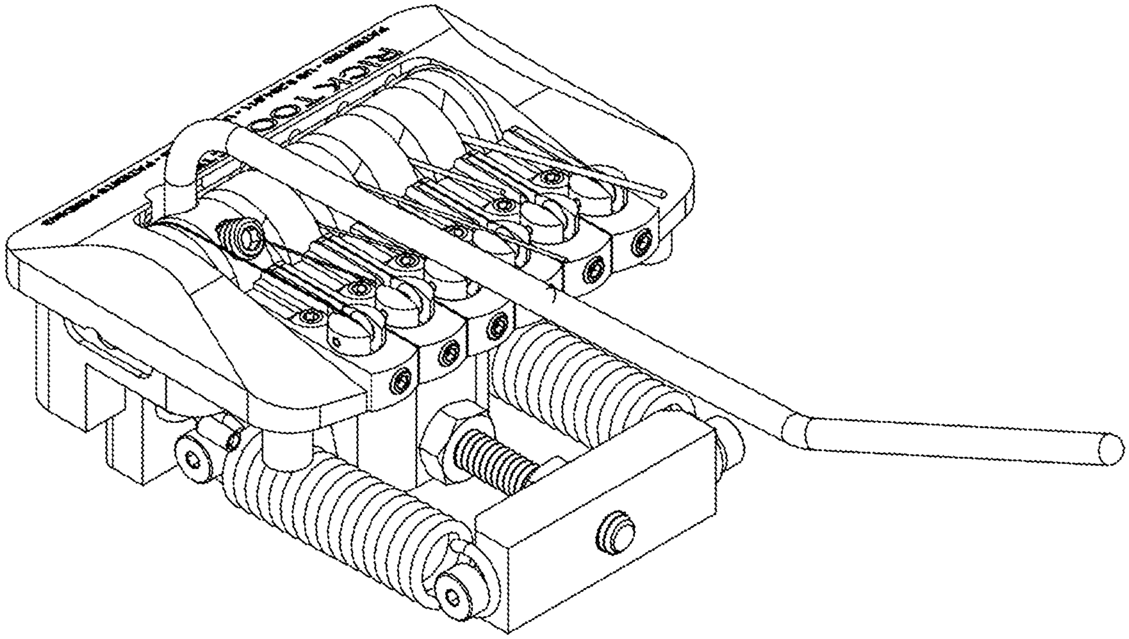
FIG. 12(*a*) is an assembled view of an example relative harmonic dynamic pitch control device, wherein the stringed instrument is omitted for clarity, in accord with at least some aspects of the present concepts.
Figure 12B:
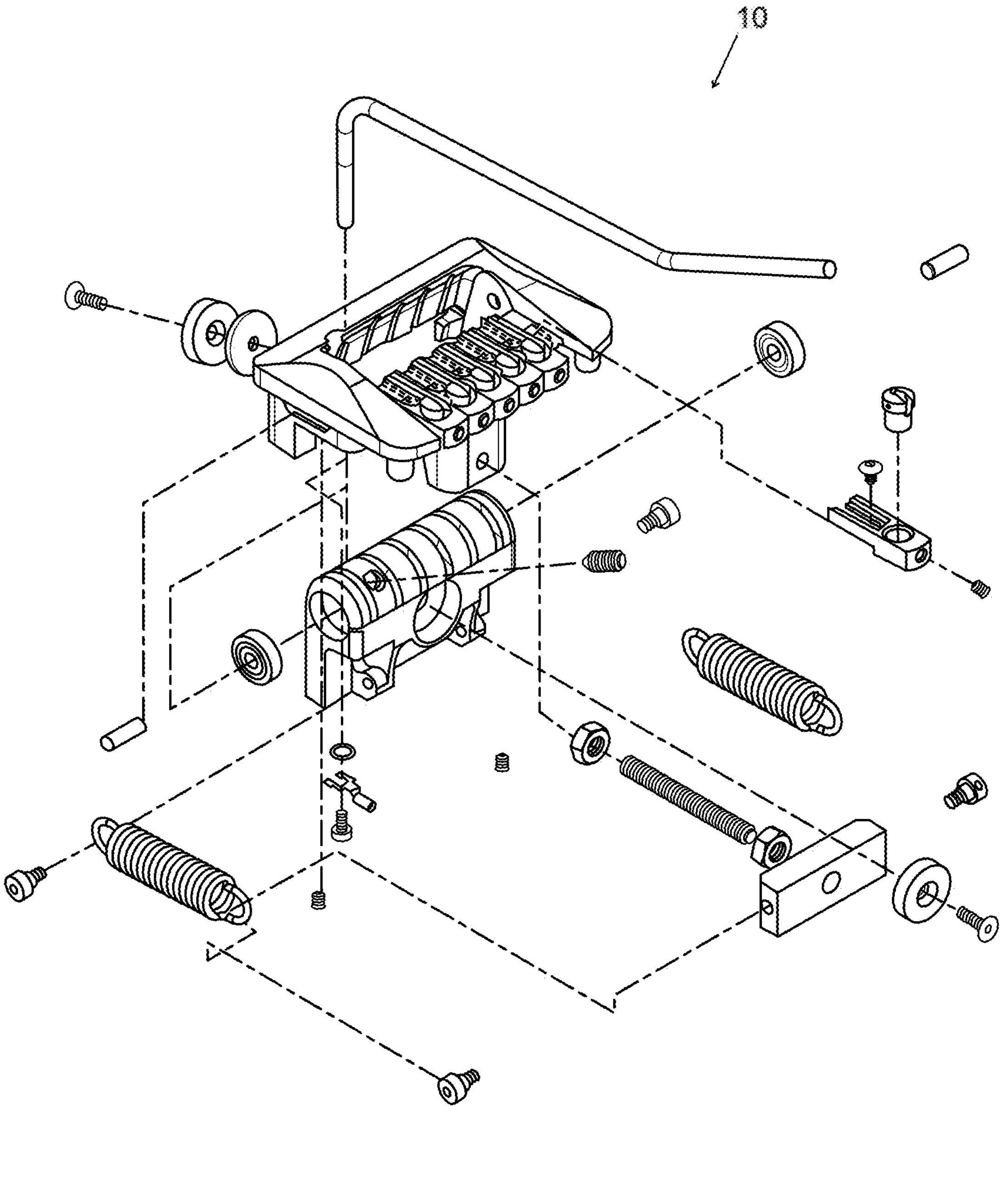
Figure 13A:
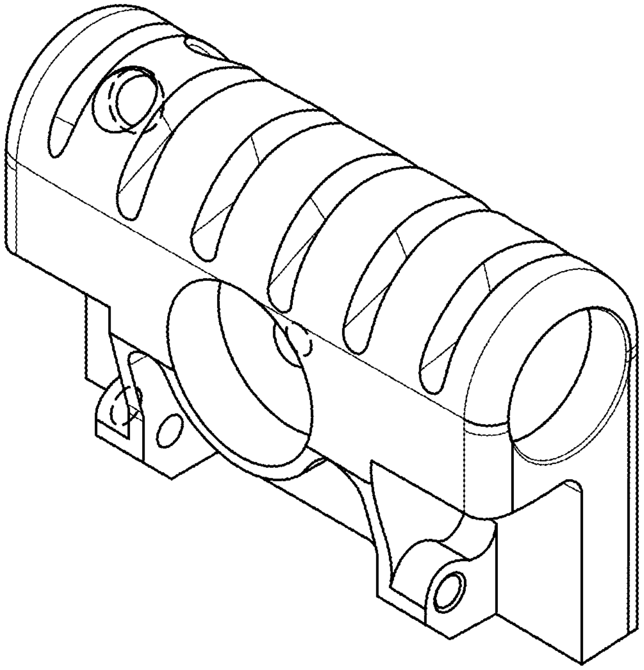
FIGS. 13(*a*)-13(*g*) are views of an example integrated tremolo cam and tremolo lever for an example relative harmonic dynamic pitch control device in accord with at least some aspects of the present concepts where FIG. 13(*a*) is a first perspective front view, FIG. 13(*b*) is a second perspective front view from view F-F of FIG. 13(*d*), FIG. 13(*c*) is a front view, FIG. 13(*d*) is a first side view, FIG. 13(*e*) is a second side view, FIG. 13(*f*) is a cross-sectional view taken along cross-section G-G of FIG. 13(*c*), and FIG. 13(*g*) is a detail view of feature H shown in FIG. 13(*e*).
Figure 13B:
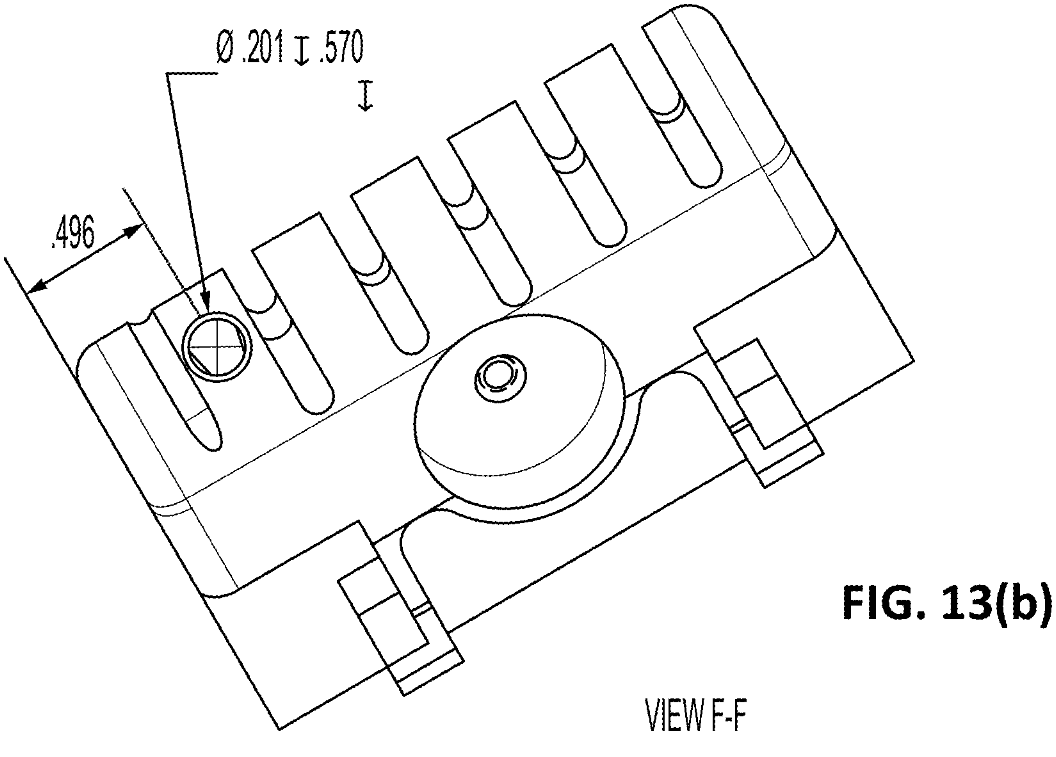
Figure 13C:
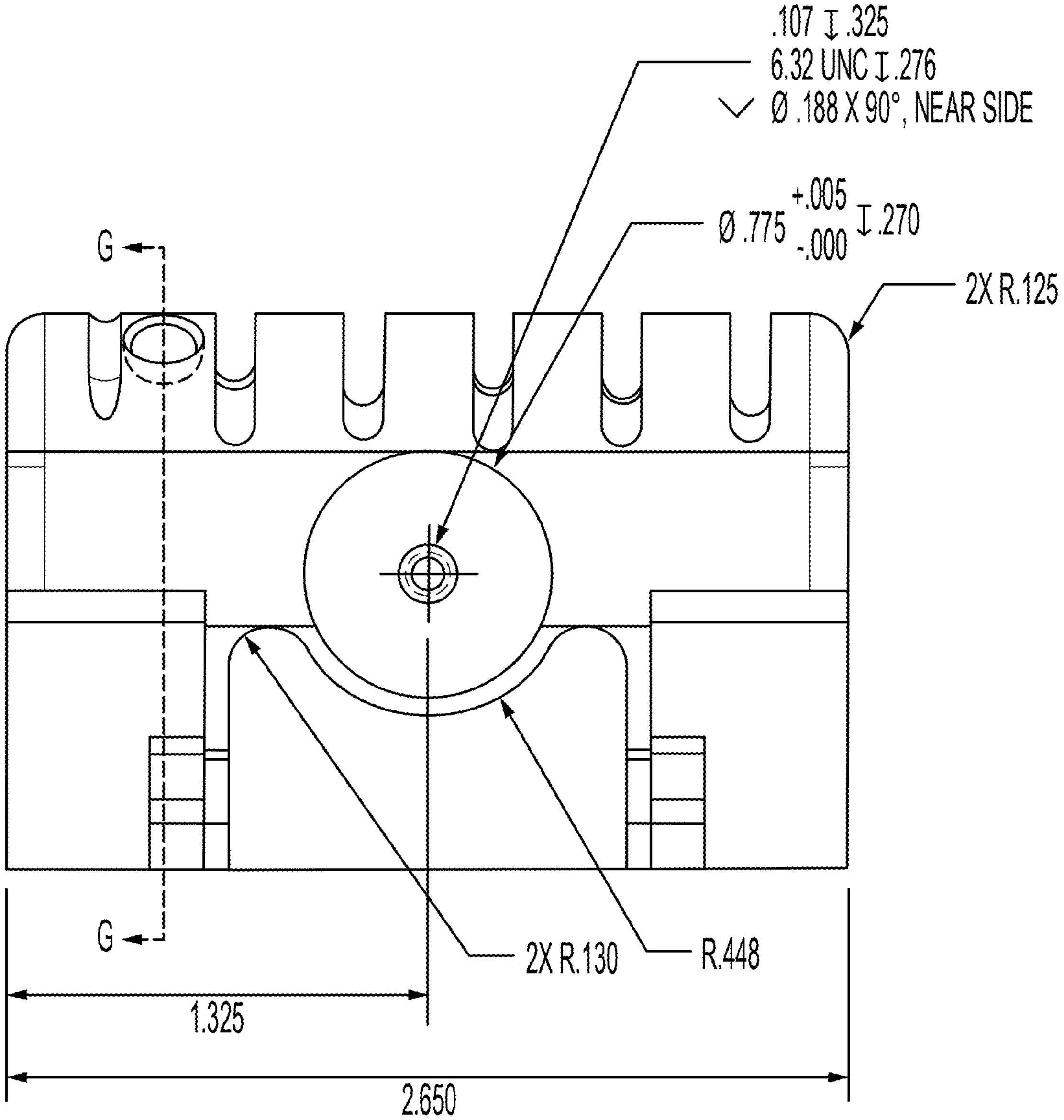
Figure 13D:
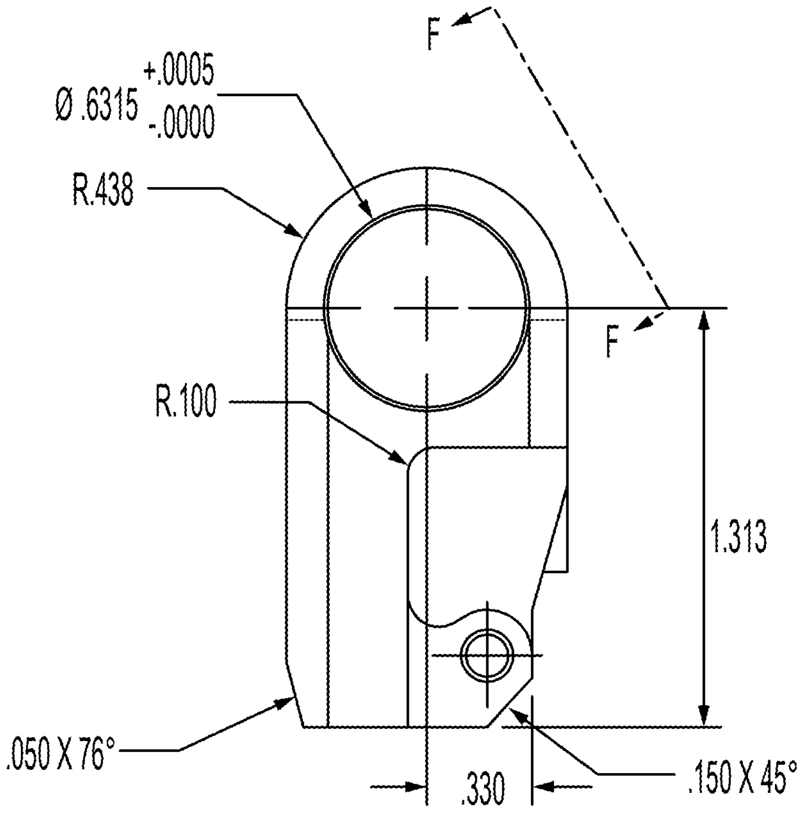
Figure 13E:
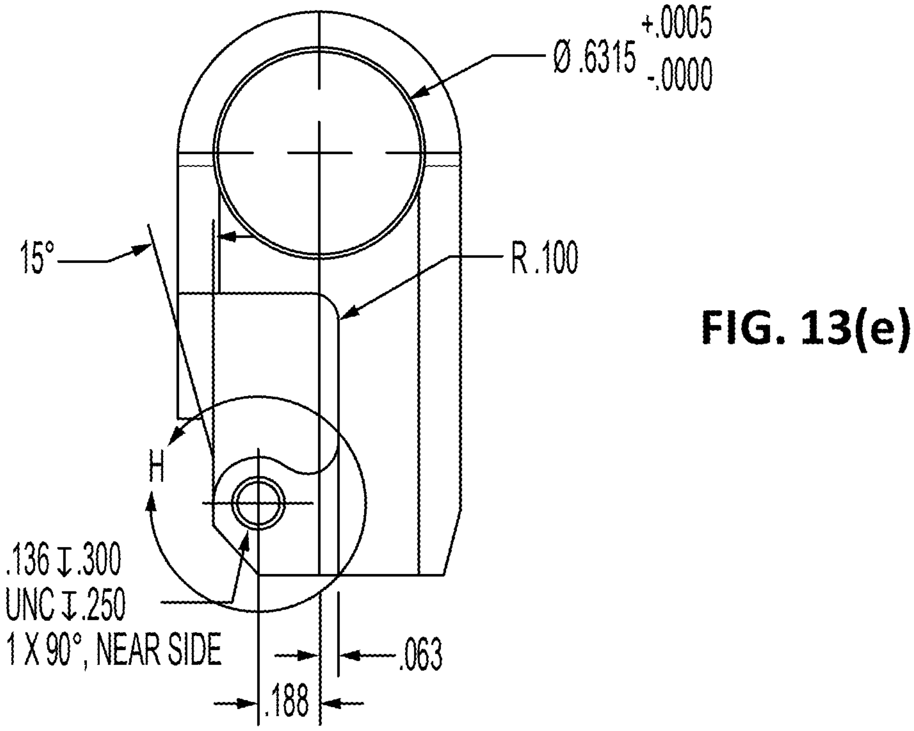
Figure 13F:
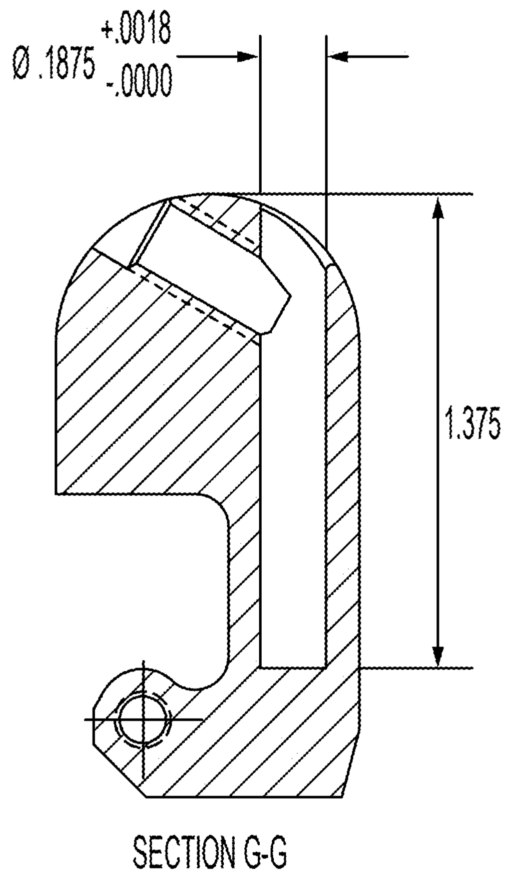
Figure 13G:
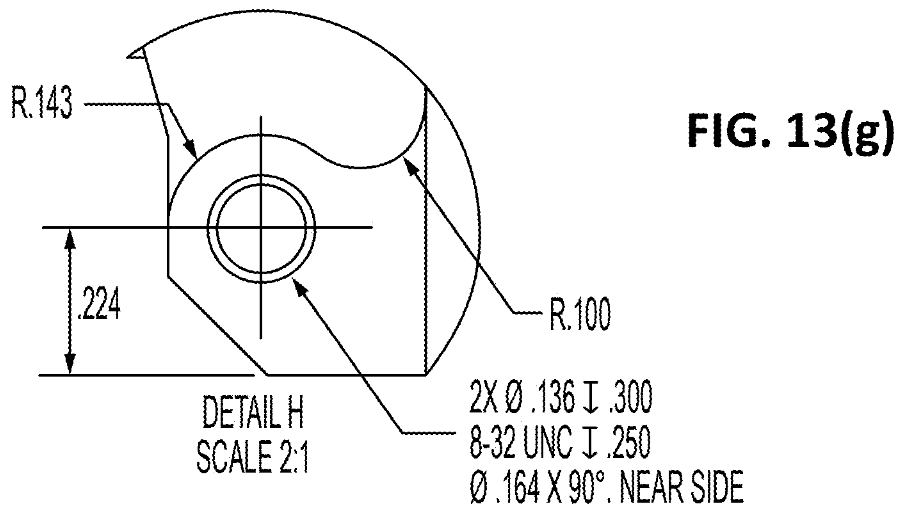

In at least some of the illustrated examples herein, all spring forces counteracting string pitch tension are self-contained within tremolo assembly, save for the connection of distal ends of the springs to an instrument body or intermediate component thereto in some embodiments. In at least some examples, an adjustment mechanism extends from the tremolo tremolo frame 100, internal to the body of the musical instrument, comprising an arrangement of springs 500 and a tensioner 525 (see, e.g., FIG. 4(*b*), FIG. 12(*a*), FIG. 12(*b*)). This arrangement allows for user-configurable adjustments in real-time, without the need to disassemble the tremolo or detach the tremolo from the body of the instrument.

This tensioner arrangement allows for relative harmonic dynamic pitch control invention embodiment to be removed and installed without affecting string action, including string height relative to the fretboard and string intonation.

In an alternate embodiment, the tensioner 525 may be employed to determine and/or to adjust the tension of the springs 500.

In at least some aspects of the present concepts, a variable distance (e.g., adjustable or user-configurable) attachment point relative to the rotational pivot or axis of rotation allows for further flexibility in arrangement of and/or the location and/or the forces generated by the springs, magnets and/or devices or components providing force to counteract spring tension. For example, the springs 500 may be located at a distance closer to or greater from the axis of rotation, thus decreasing or increasing the leverage applied to the rotatable string contact surface(s) (e.g., 205, 210, 215, 220, 225, 230) in order to counter string pitch tension (see, e.g., FIGS. 3(*a*)-3(*c*)). Doing so allows for compensation relative to the tension forces of different diameter string sets or different string pitch tunings.

In at least some aspects of the present concepts, the magnets and/or springs (500, 550) may be disposed symmetrically or asymmetrically relative to the string tension forces.

In a non-limiting example, various types of springs may be added to counteract string tension, including but not limited to any one or more of, or any combination of, torsional spring(s), compression, extension springs(s), rotor springs(s), linear springs(s) and/or strip springs(s), whether disposed internally and/or externally to the example integrated tremolo cam and tremolo lever, to one or more of the example integrated tremolo cam and tremolo lever portions, or to the tremolo cam or to the tremolo lever, or portion(s) thereof. Additionally, springs may be used in combination, including as non-limiting examples: extension spring combined with torsional, in one alternate embodiment.

Figure 18A:
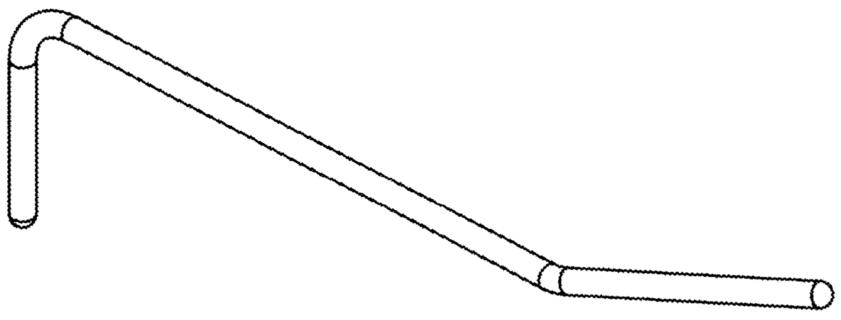
FIGS. 18(*a*)-18(*c*) are views of an example tremolo arm for a relative harmonic dynamic pitch control device in accord with at least some aspects of the present concepts where FIG. 18(*a*) is a perspective view, FIG. 18(*b*) is a top view and FIG. 18(*c*) is a side view.
Figure 18B:
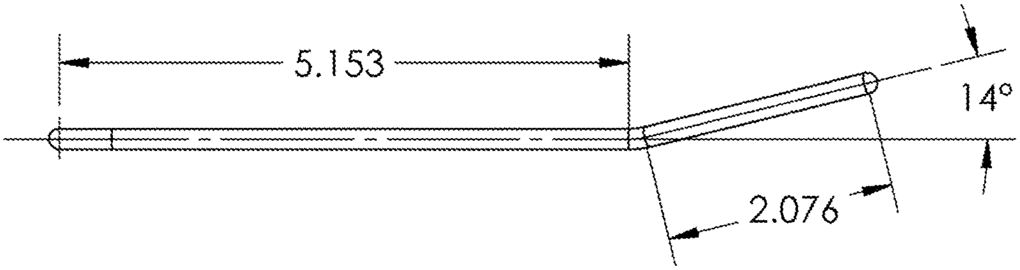
Figure 18C:
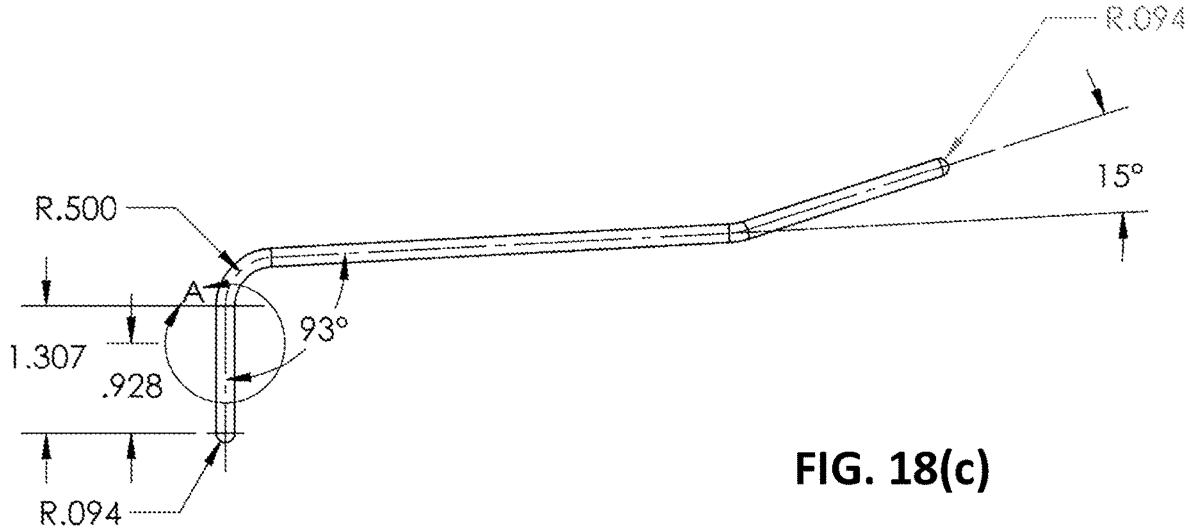
Figure 19A:
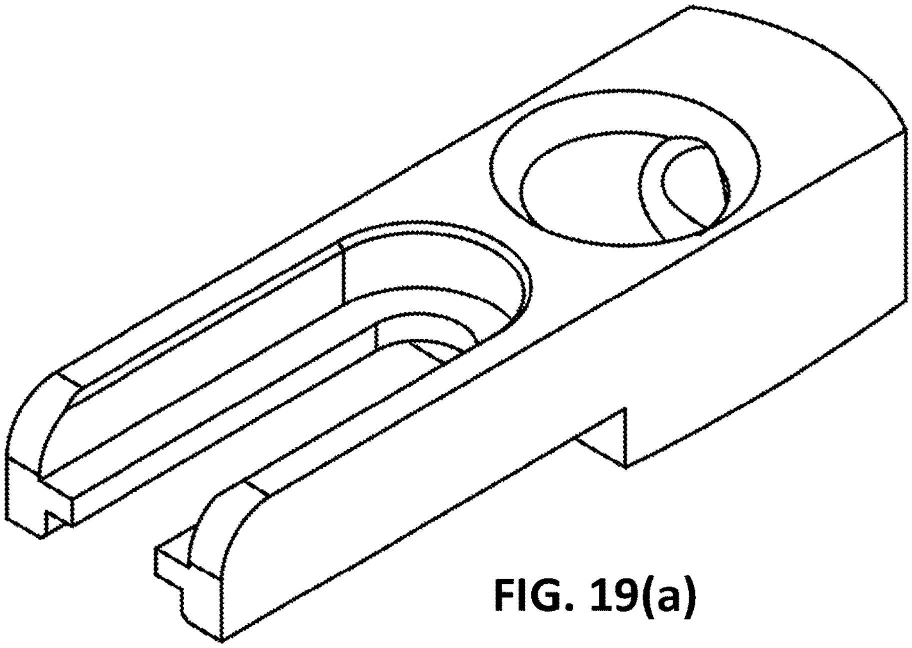
FIGS. 19(*a*)-19(*f*) are views of an example bridge slider for a relative harmonic dynamic pitch control device in accord with at least some aspects of the present concepts where FIG. 19(*a*) is a perspective view, FIG. 19(*b*) is a top view, FIG. 19(*c*) is a cross-sectional view along cross-section A-A of FIG. 19(*b*), FIG. 19(*d*) is a front view, FIG. 19(*e*) is a side view and FIG. 19(*f*) is a rear view.
Figure 19E:
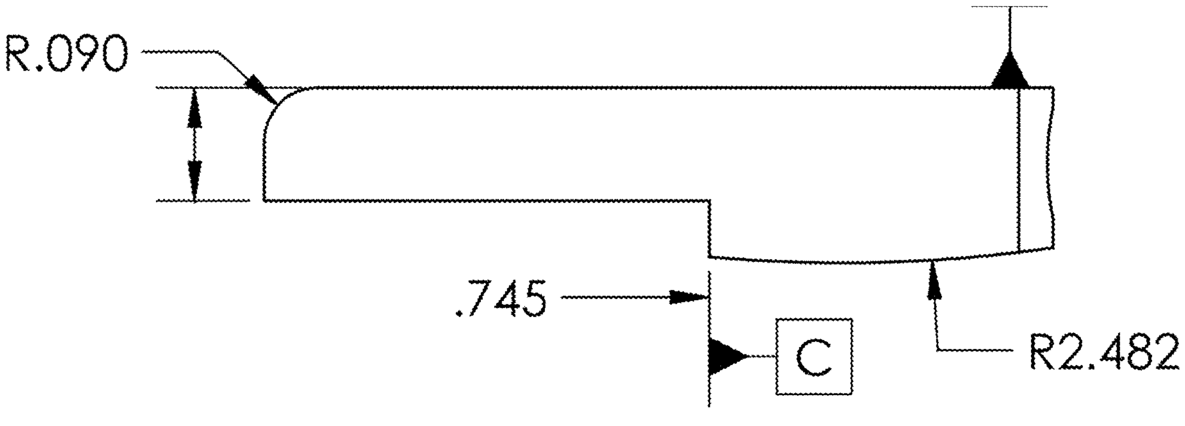
Figure 19B:
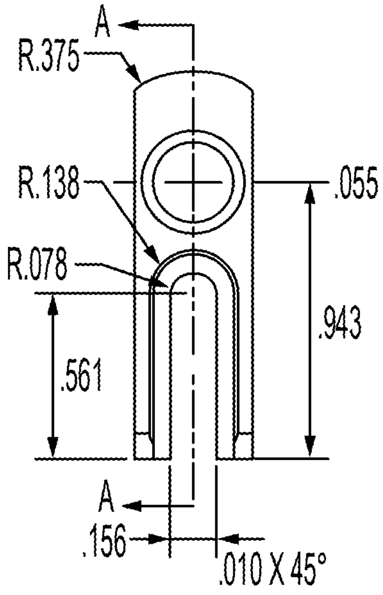
Figure 19C:
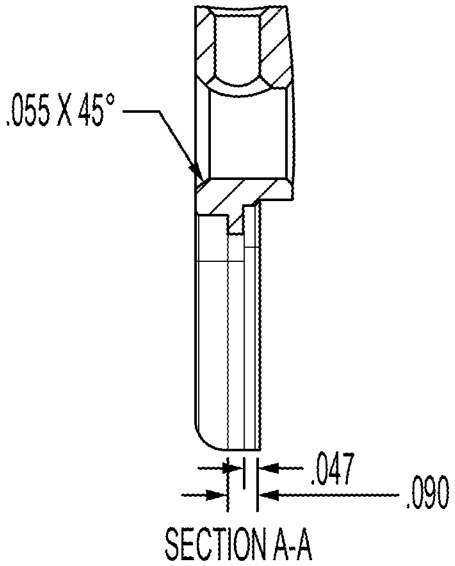
Figure 19D:
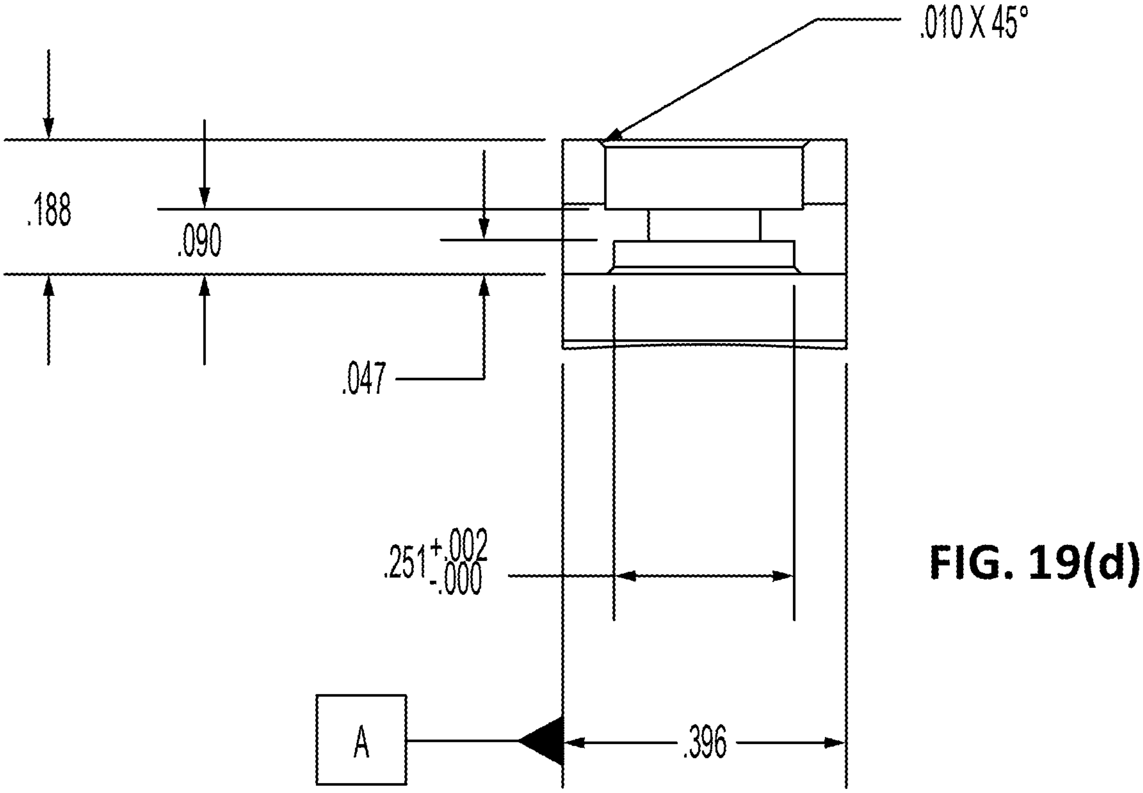
Figure 19F:
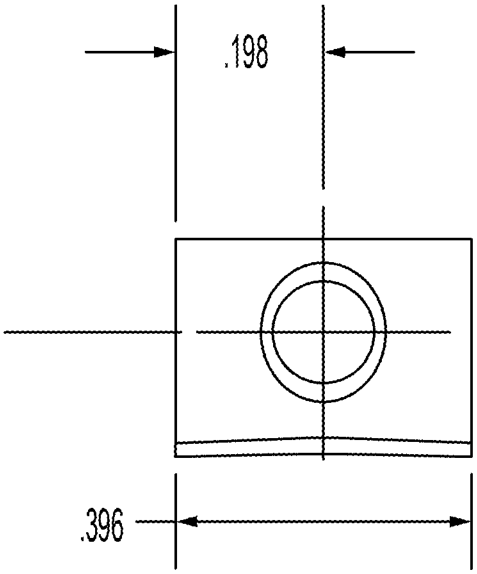
Figure 20A:
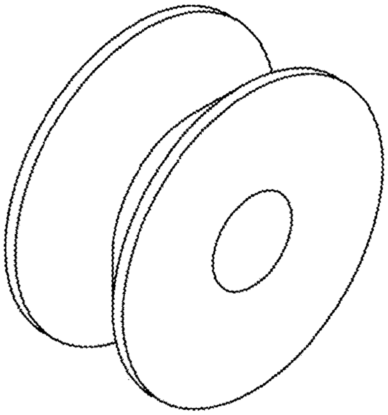
FIGS. 20(*a*)-20(*c*) are views of an example roller for a relative harmonic dynamic pitch control device in accord with at least some aspects of the present concepts where FIG. 20(*a*) is a perspective view, FIG. 20(*b*) is a side view and FIG. 20(*c*) is a front view.
Figure 20B:
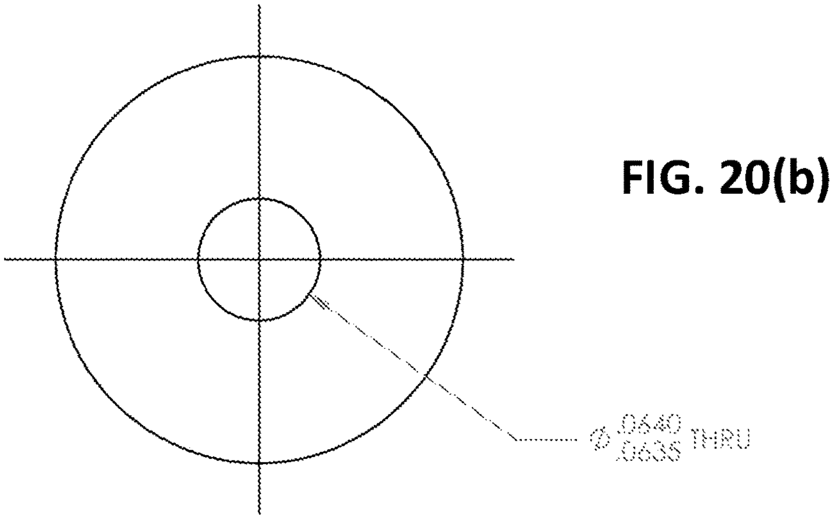
Figure 20C:
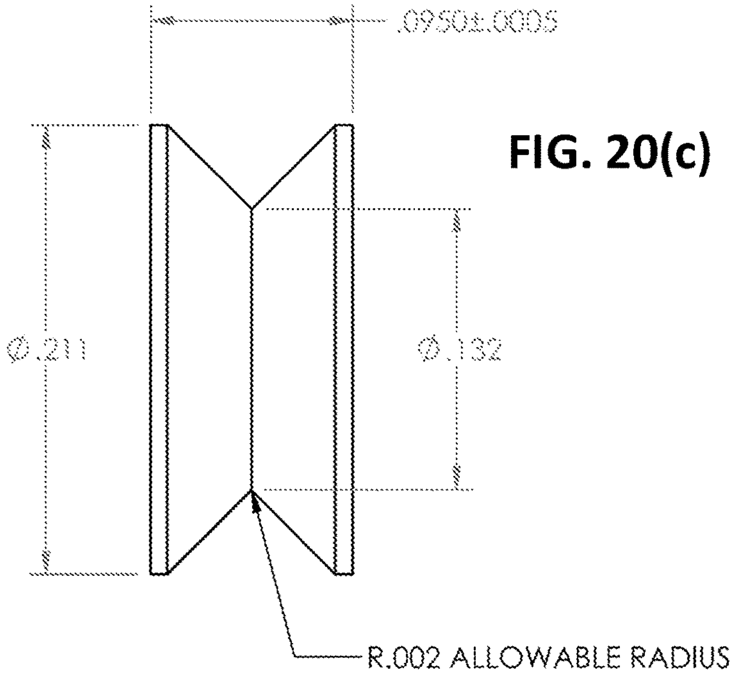
Figure 21A:
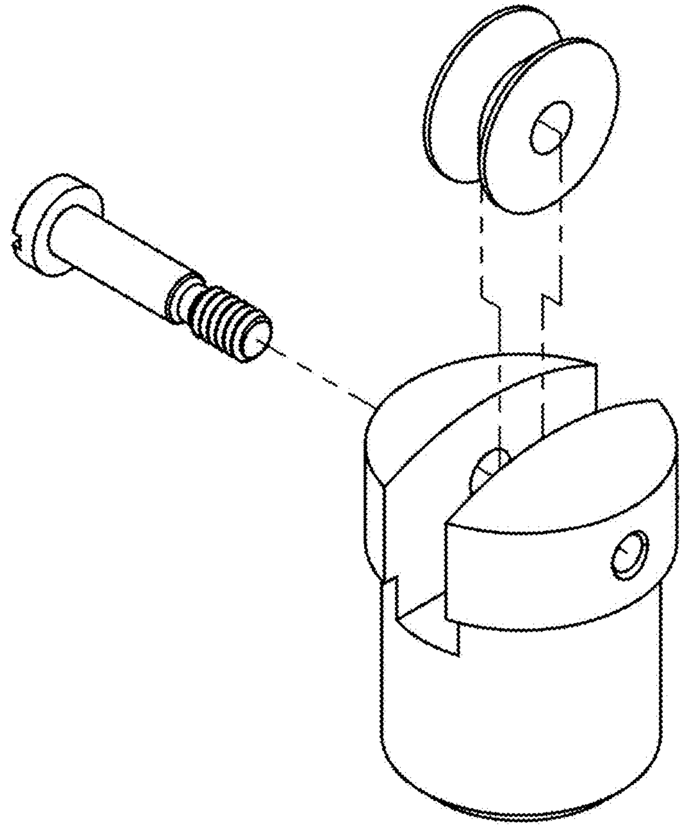
FIGS. 21(*a*)-21(*h*) are views of an example bridge saddle (i.e., bridge intonation point) for a relative harmonic dynamic pitch control device in accord with at least some aspects of the present concepts where FIG. 21(*a*) is a perspective exploded view of the roller, bridge saddle and example mechanical fastener (e.g., a string height adjustment screw or "SHAS") connecting the roller to the bridge saddle, FIG. 21(*b*) is a side view of an assembly of the roller, bridge saddle and mechanical fastener of FIG. 21(*a*), FIG. 21(*c*) is a cross-sectional view of the assembly of FIG. 21(*b*) taken along cross-section A-A, FIG. 21(*d*) is a top view of the assembly of FIG. 21(*b*), FIG. 21(*e*) is a front view of the assembly of FIG. 21(*b*), FIG. 21(*f*) is a front view of the bridge saddle of FIG. 21(*a*), FIG. 21(*g*) is a side view of the bridge saddle of FIG. 21(*f*), and FIG. 21(*g*) is a cross-sectional view of the bridge saddle of FIG. 21(*g*) taken along cross-section A-A.
Figure 21B:
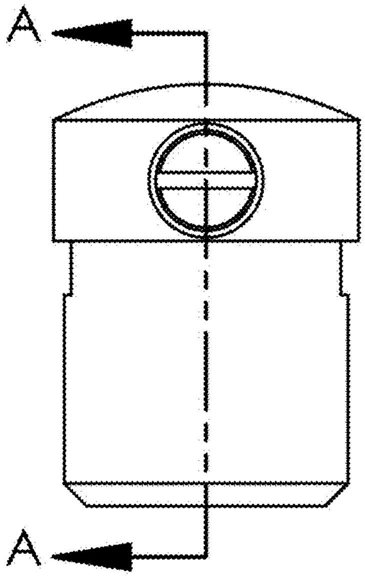
Figure 21C:
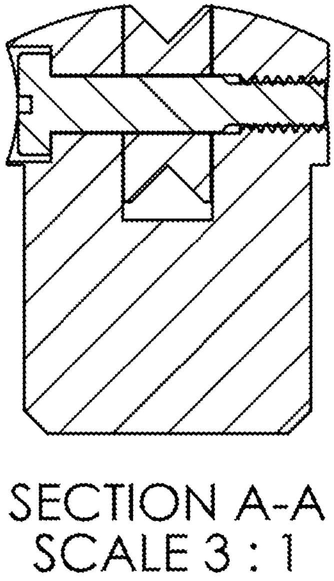
Figure 21D:
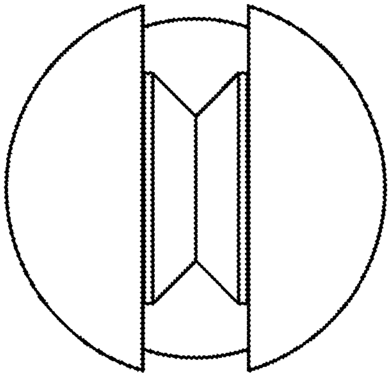
Figure 21E:
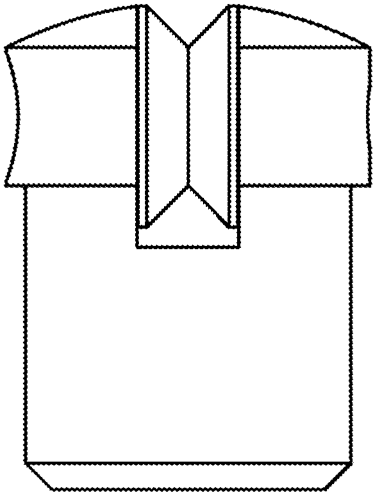
Figure 21F:
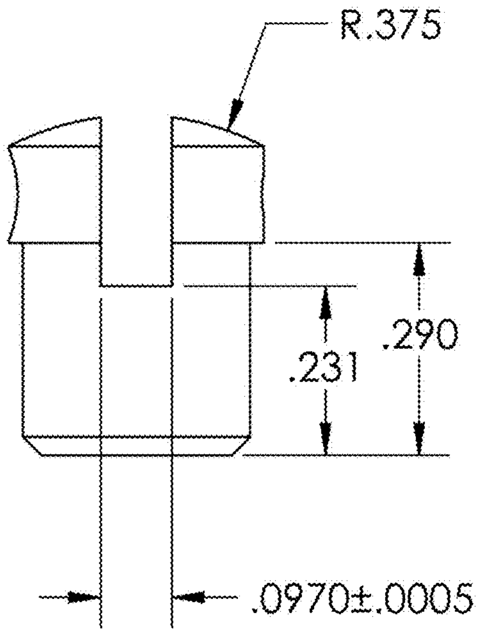
Figure 21G:
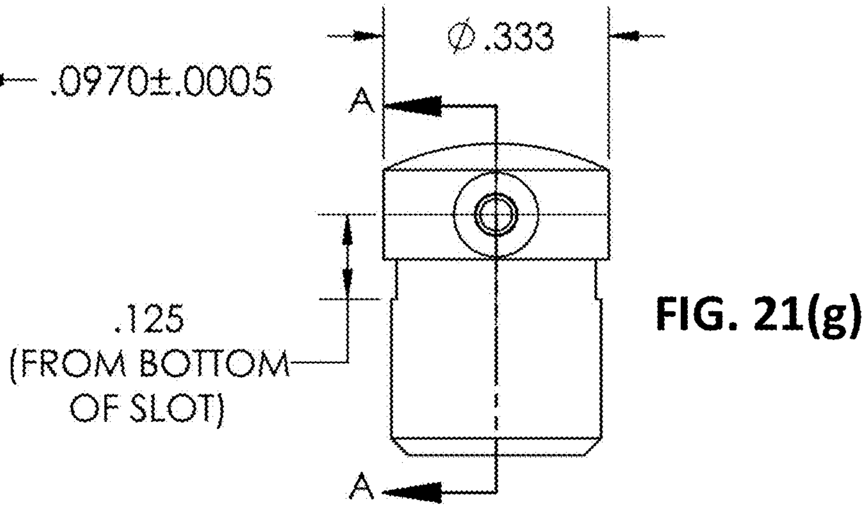
Figure 21H:
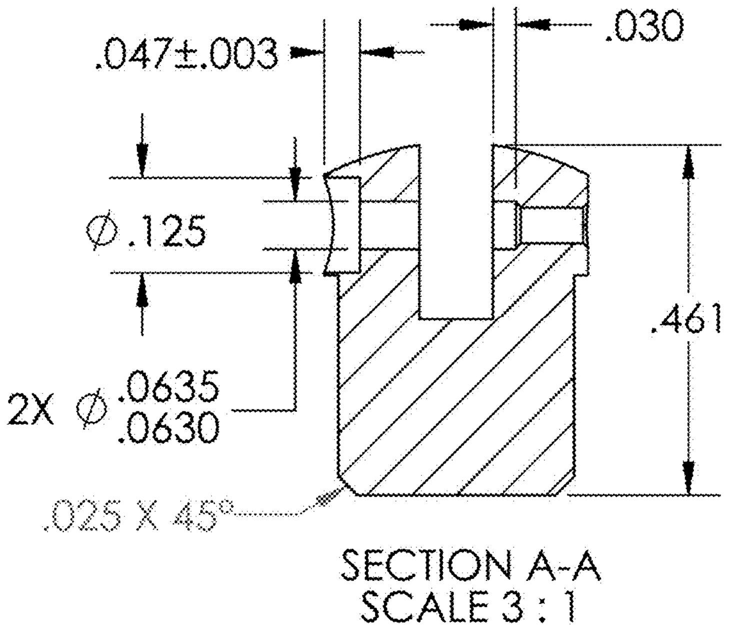
Figure 22A:
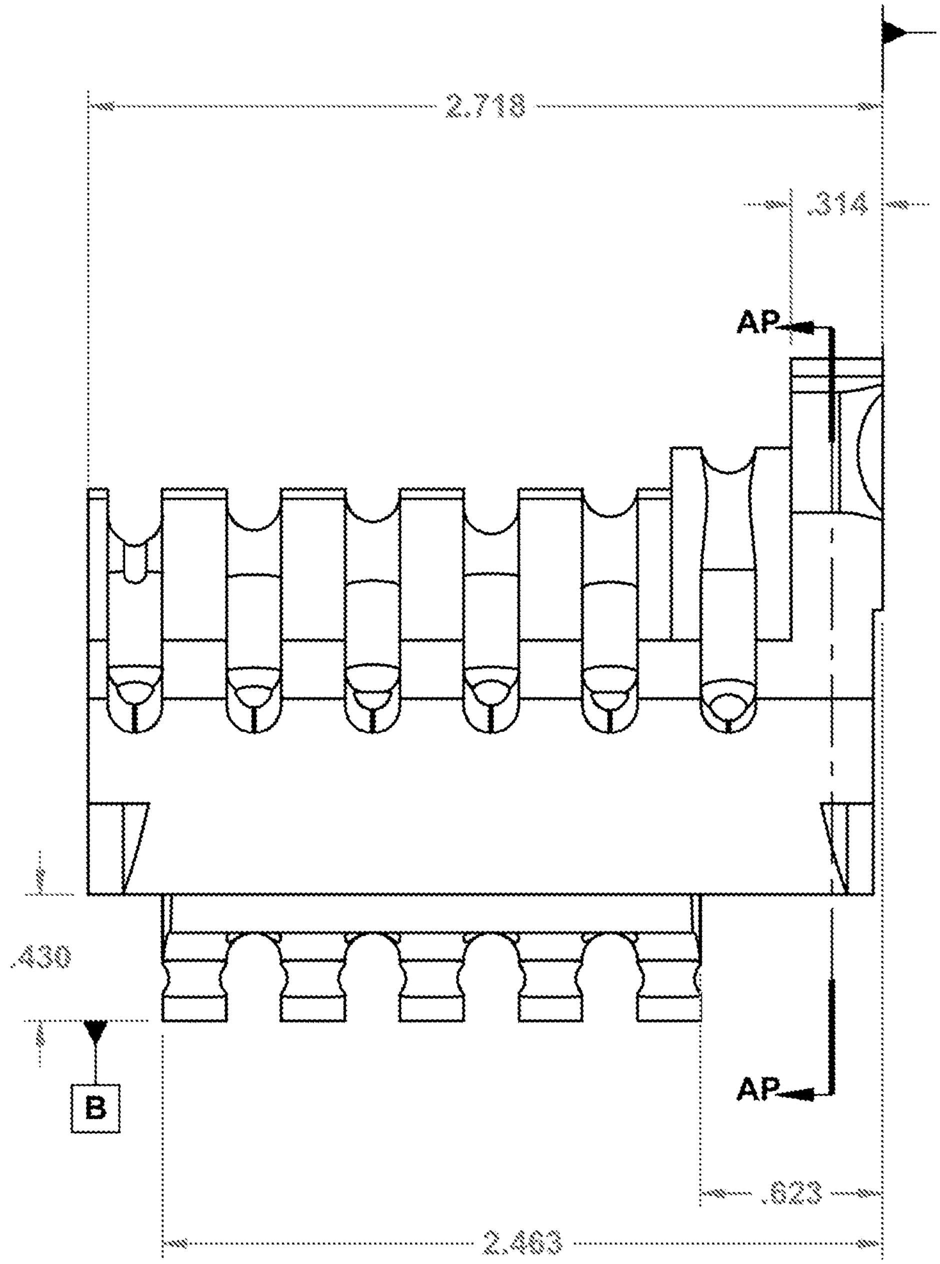
FIGS. 22(*a*)-22(*f*) are views of another example integrated tremolo cam and tremolo lever for a relative harmonic dynamic pitch control device in accord with at least some aspects of the present concepts where FIG. 22(*a*) is a rear view, FIG. 22(*b*) is a side view, FIG. 22(*c*) is a bottom view, FIG. 22(*d*) is a cross-sectional view taken along the cross-section AP-AP of FIG. 22(*a*), FIG. 22(*e*) is a front perspective view, FIG. 22(*f*) is a partial view along the direction AR-AR shown in FIG. 22(*d*).
Figure 22B:
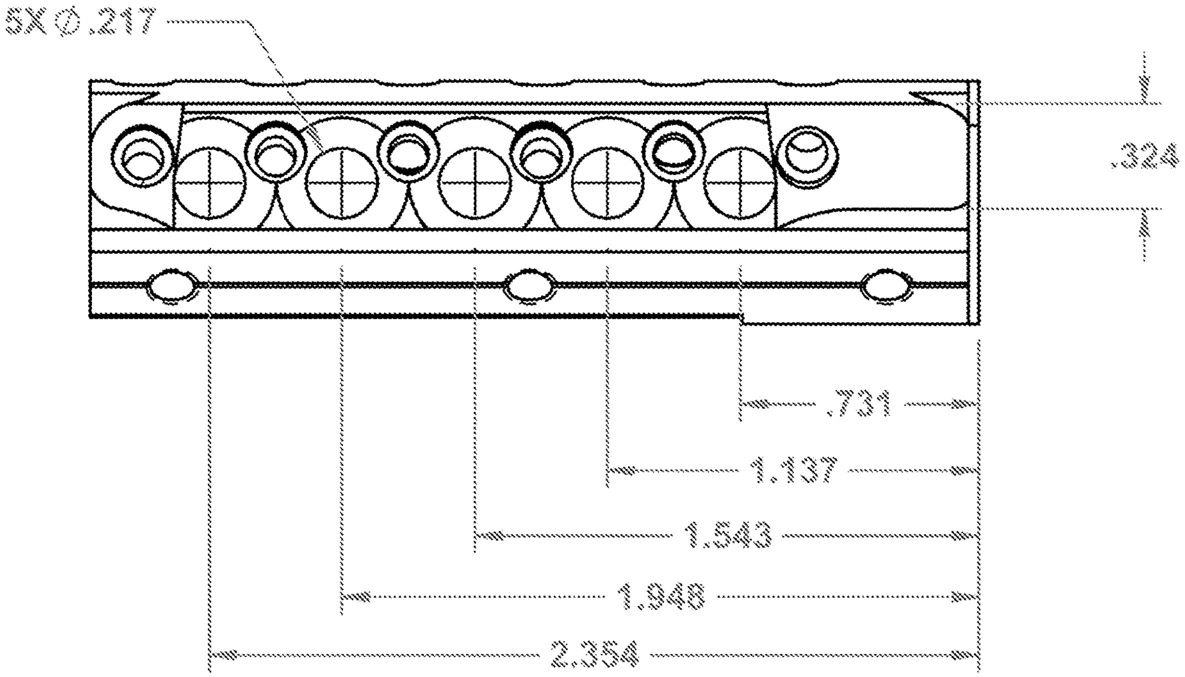
Figure 22C:
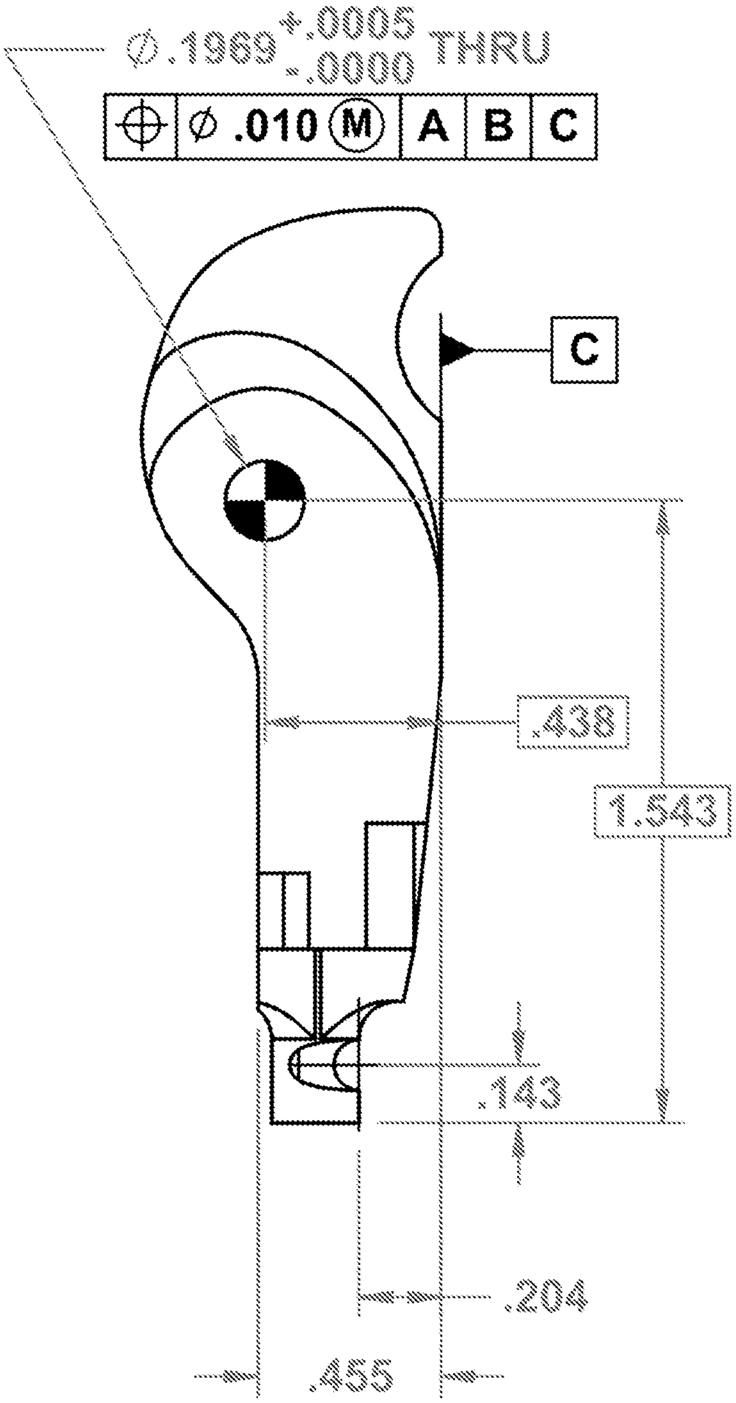
Figure 22D:
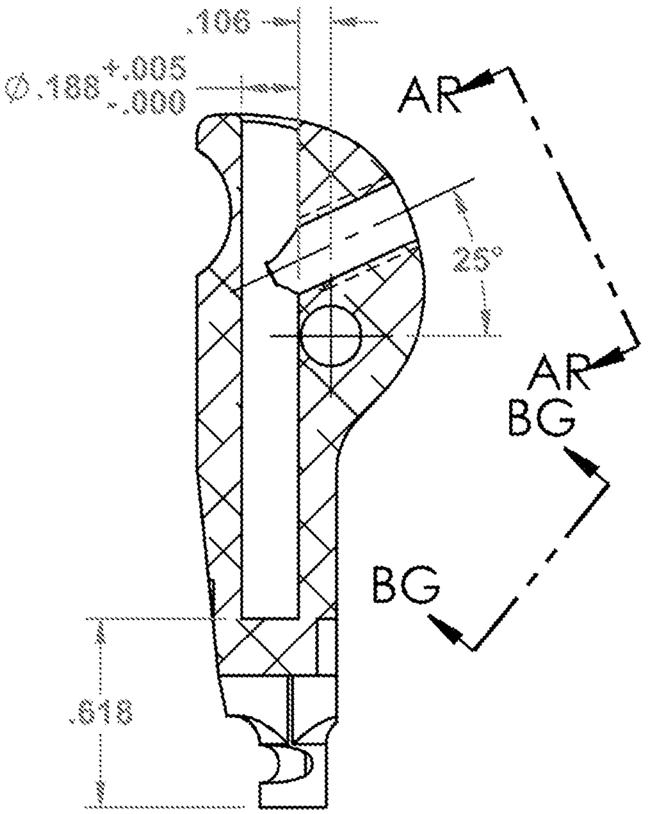
Figure 22E:
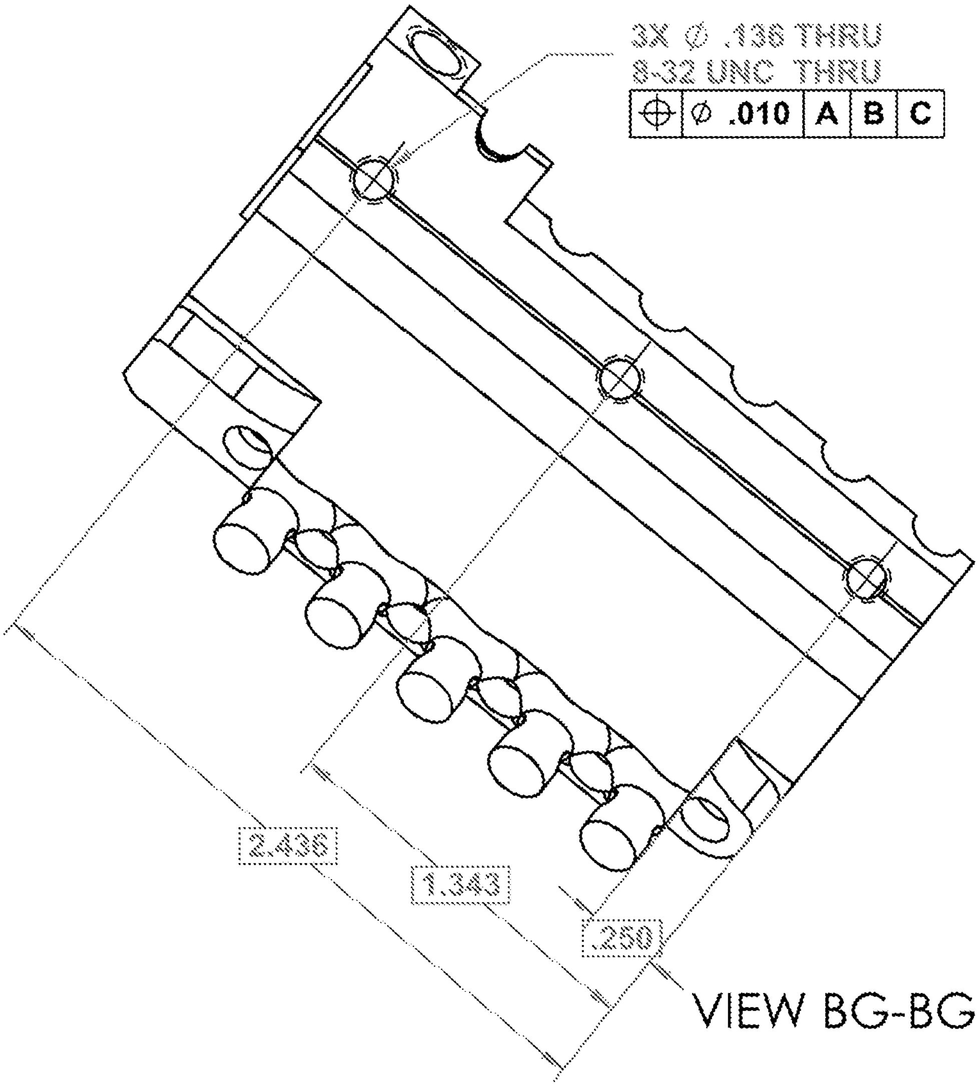
Figure 22F:
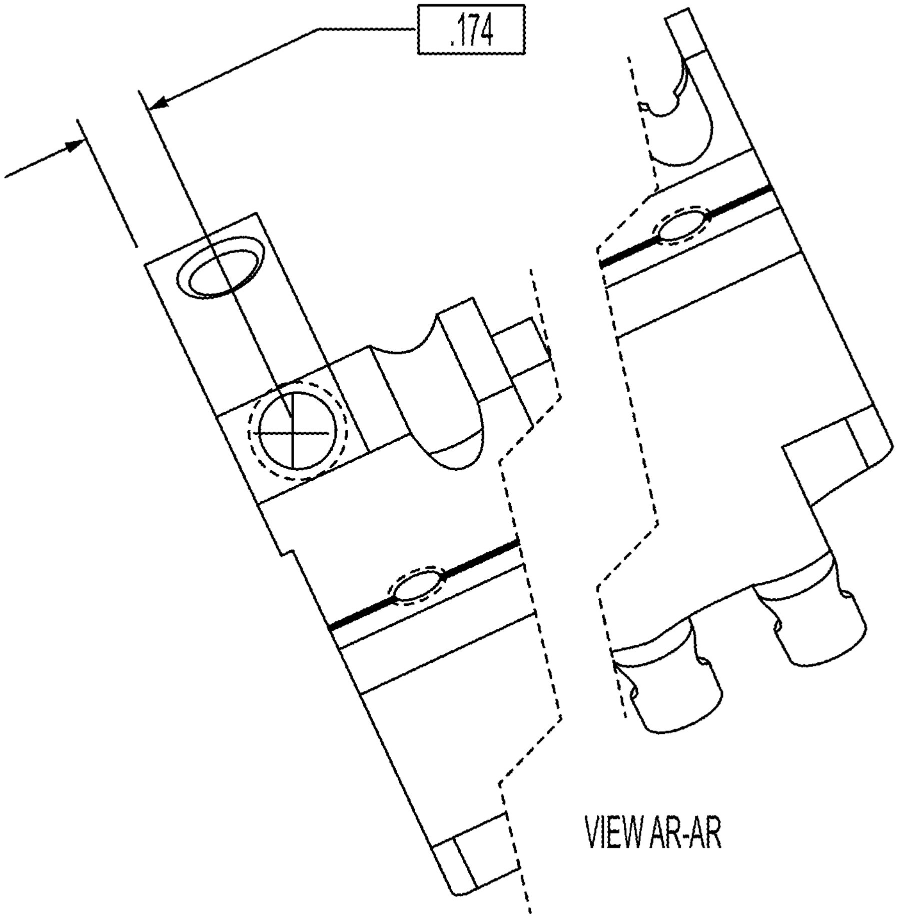
Figure 23A:
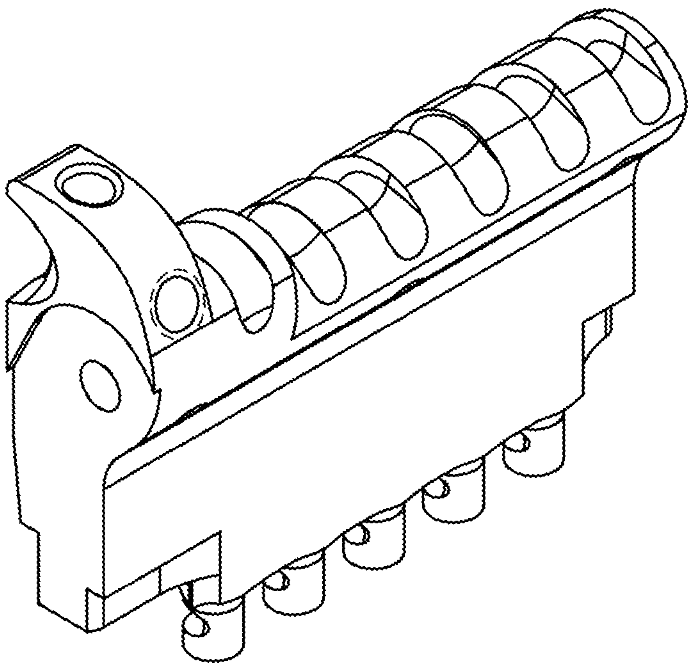
FIGS. 23(*a*)-23(*d*) are views of the example integrated tremolo cam and tremolo lever of FIGS. 22(*a*)-22(*f*), where FIG. 23(*a*) is a first perspective view, FIG. 23(*b*) is a second first perspective view, FIG. 23(*c*) is a side view and FIG. 23(*d*) is a cross-sectional view taken along the cross-section AV-AV of FIG. 23(*c*).
Figure 23B:
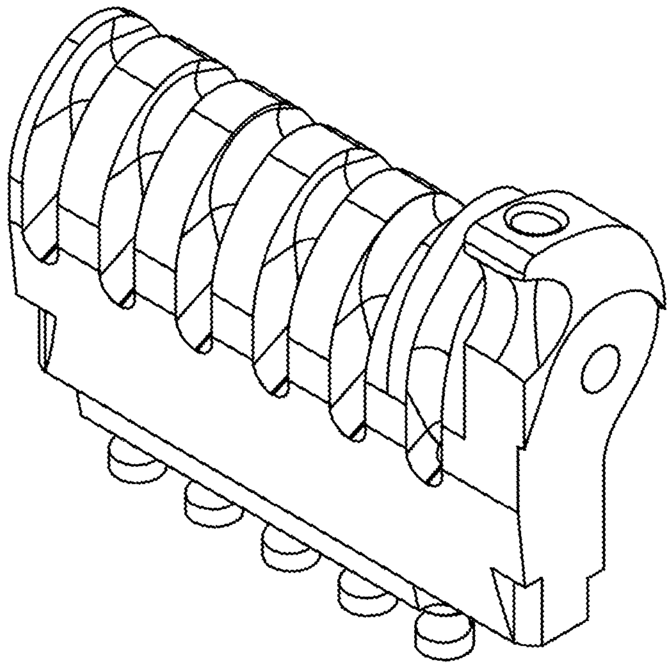
Figure 23C:
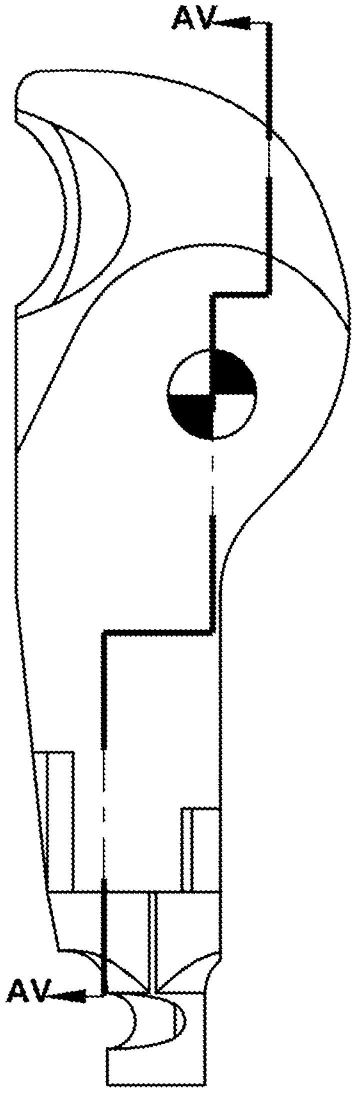
Figure 23D:
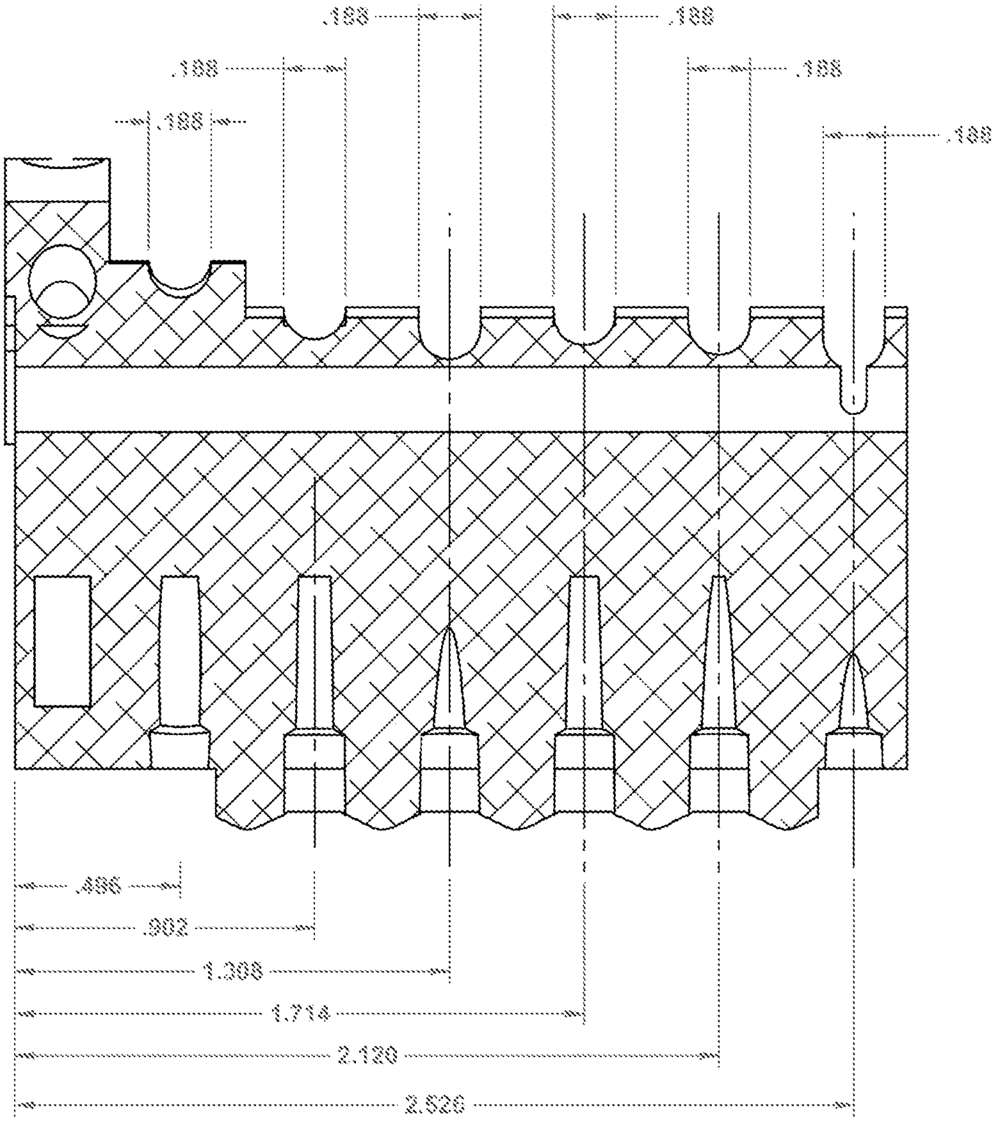
Figure 24A:
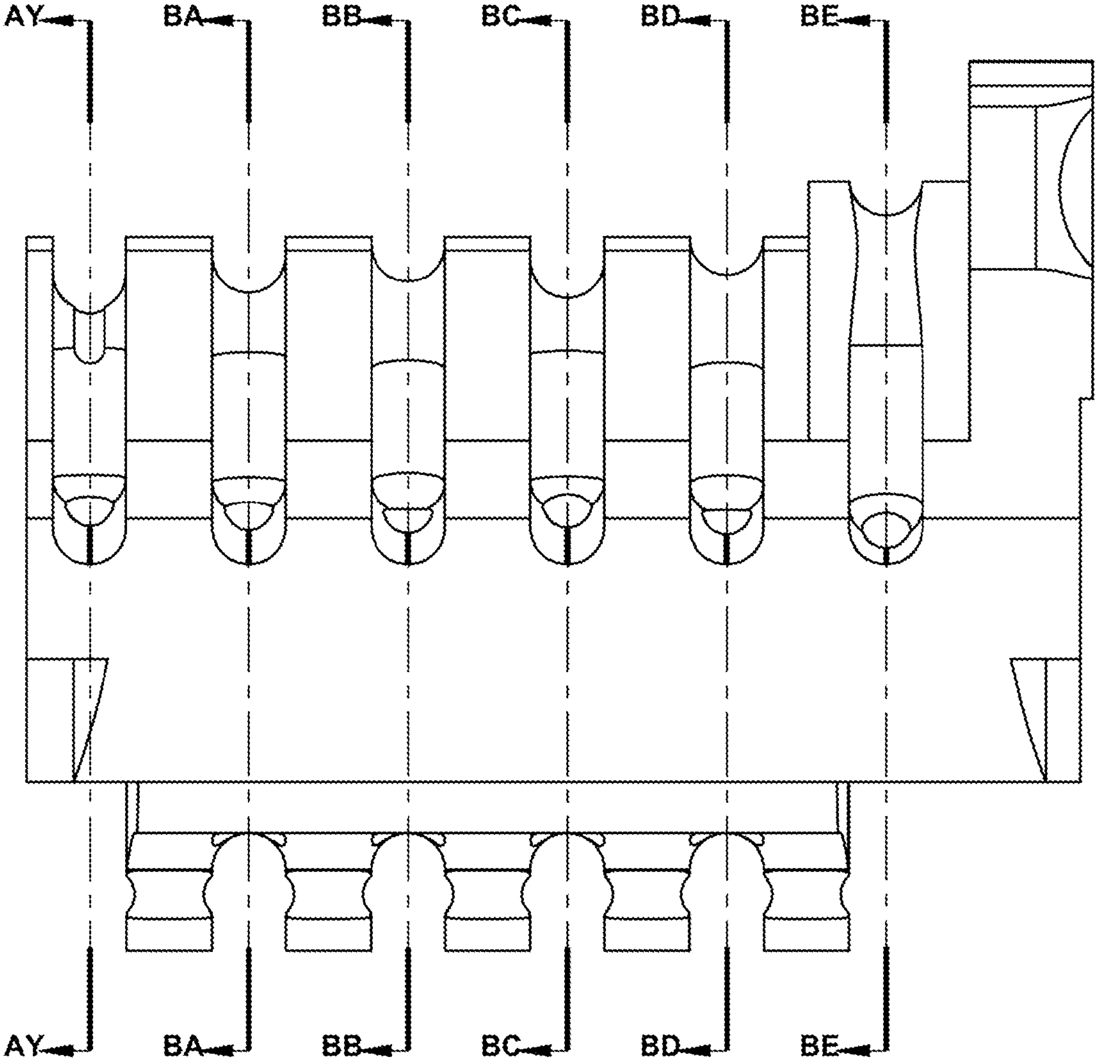
FIGS. 24(*a*)-24(*g*) are views of the example integrated tremolo cam and tremolo lever of FIGS. 22(*a*)-22(*f*), wherein FIG. 24(*a*) is a rear view and FIGS. 24(*b*)-24(*g*) are cross-sections taken along the cross-sections BD-BD, BE-BE, AY-AY, BA-BA, BB-BB and BC-BC of FIG. 24(*a*).
Figure 24B:
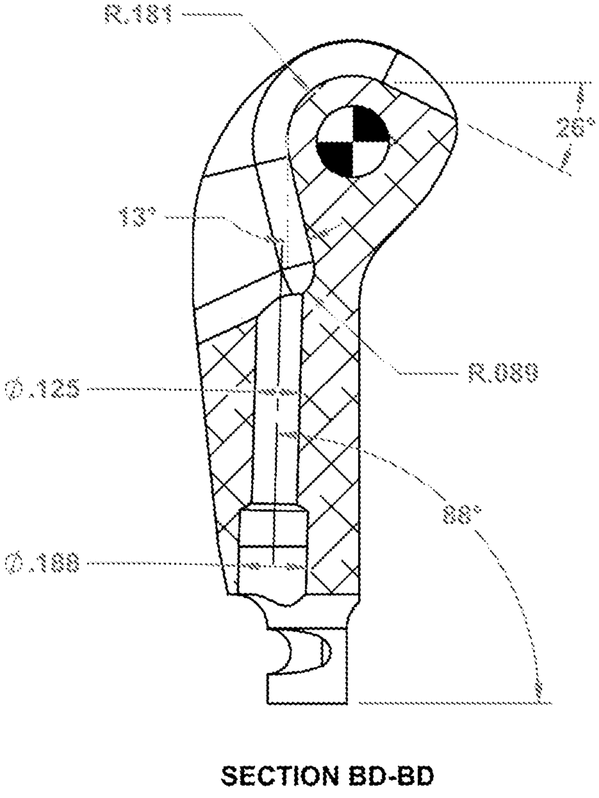
Figure 24C:
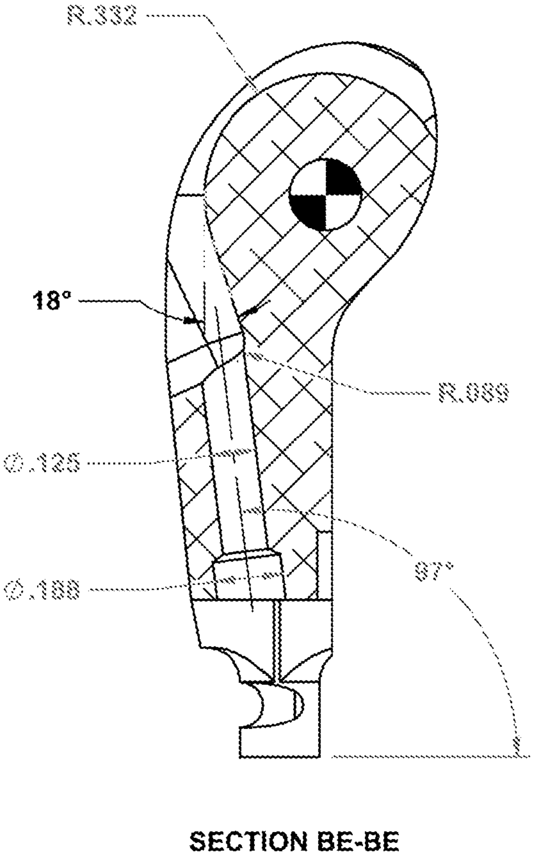
Figure 24F:
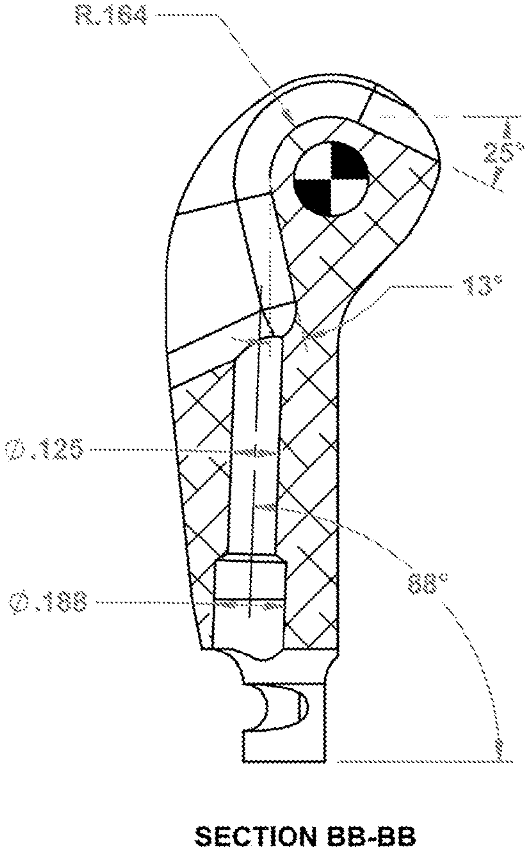
Figure 24G:
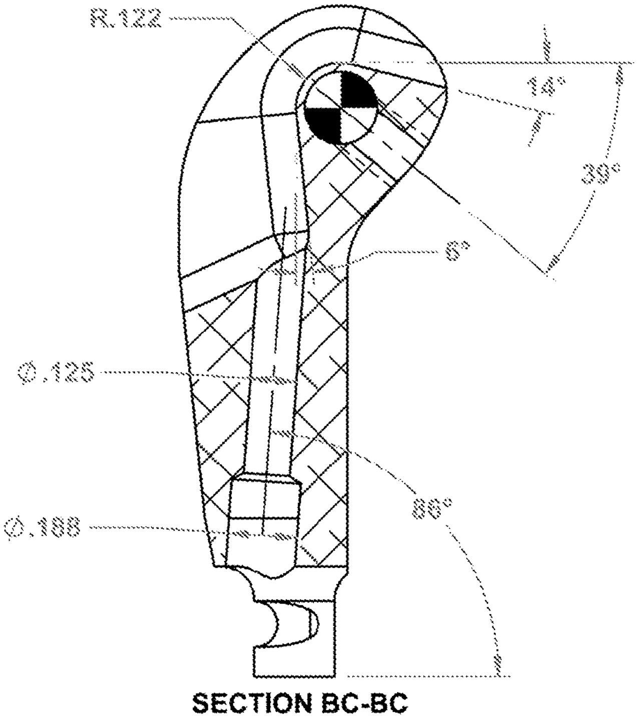
Figure 25A:
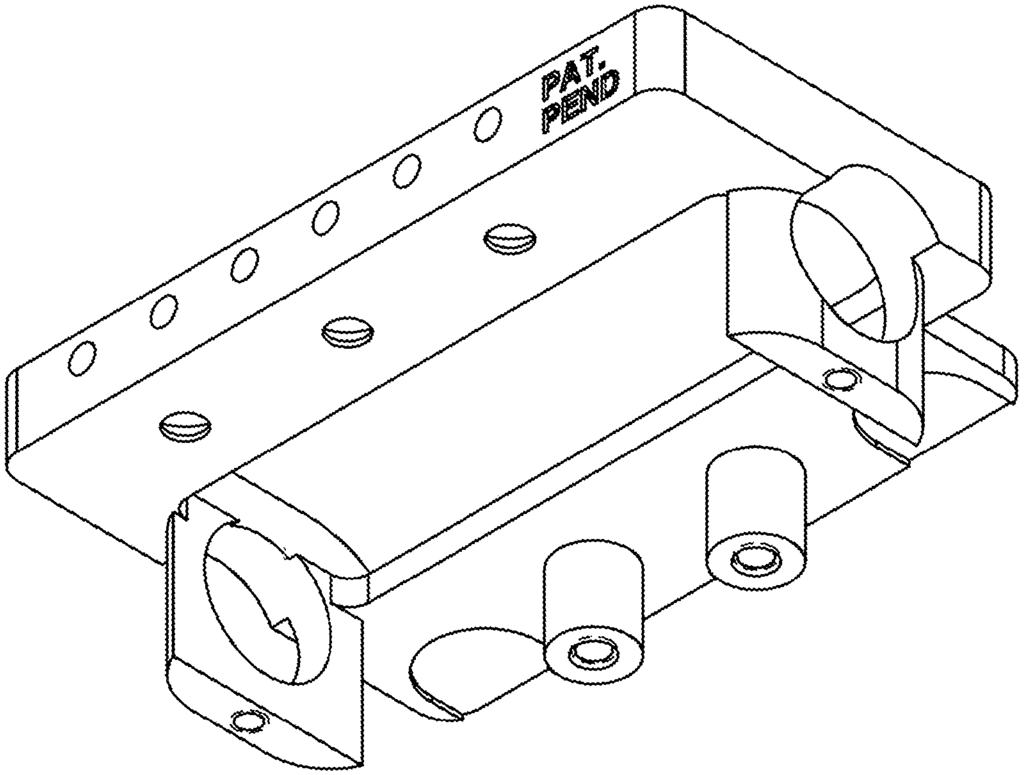
FIGS. 25(*a*)-25(*f*) are views of an example tremolo frame or mount for the example integrated tremolo cam and tremolo lever of FIGS. 22(*a*)-22(*f*) in accord with at least some aspects of the present concepts where FIG. 25(*a*) is a perspective view, FIG. 25(*b*) is a bottom view, FIG. 25(*c*) is a rear view, FIG. 25(*d*) is a cross-sectional view taken along cross-section AL-AL of FIG. 25(*b*), FIG. 25(*e*) is a first side view and FIG. 25(*f*) is a second side view.
Figure 25B:
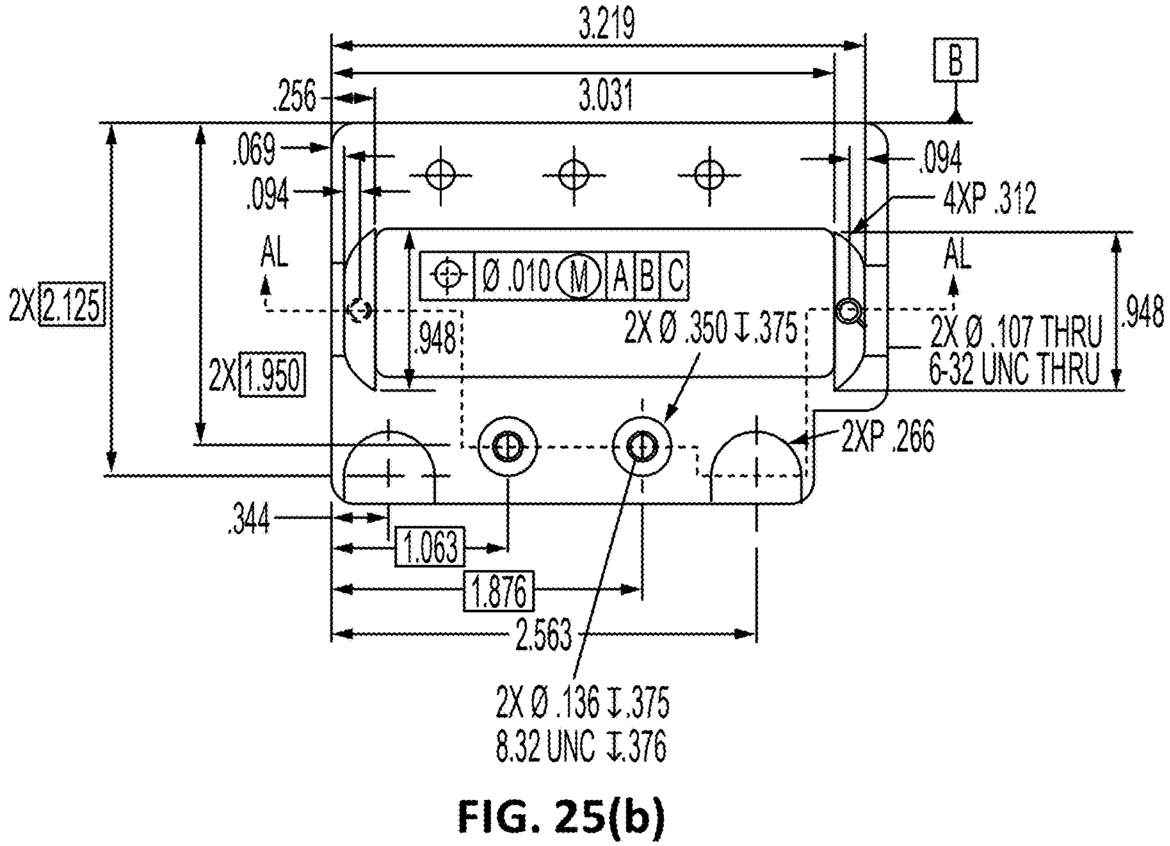
Figure 25C:
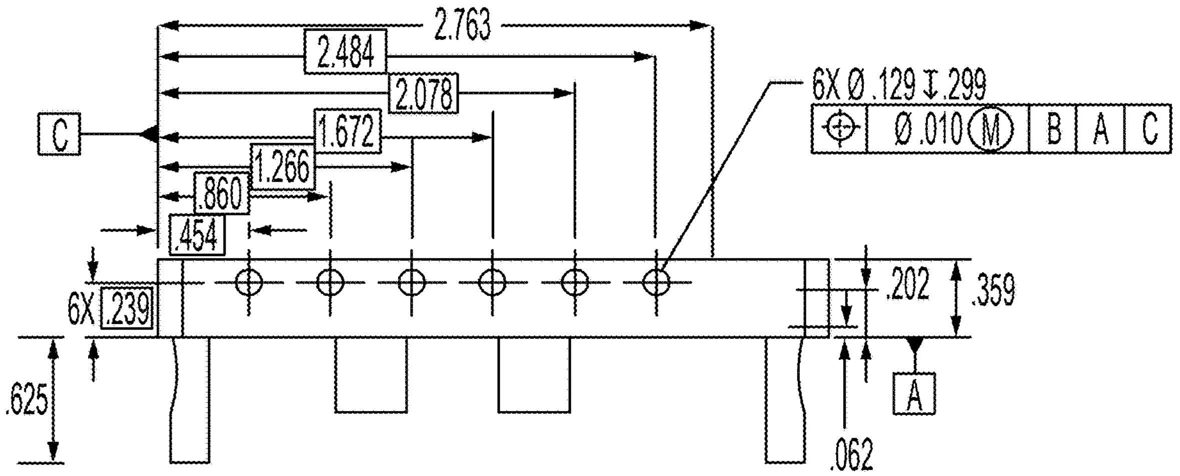
Figure 25D:
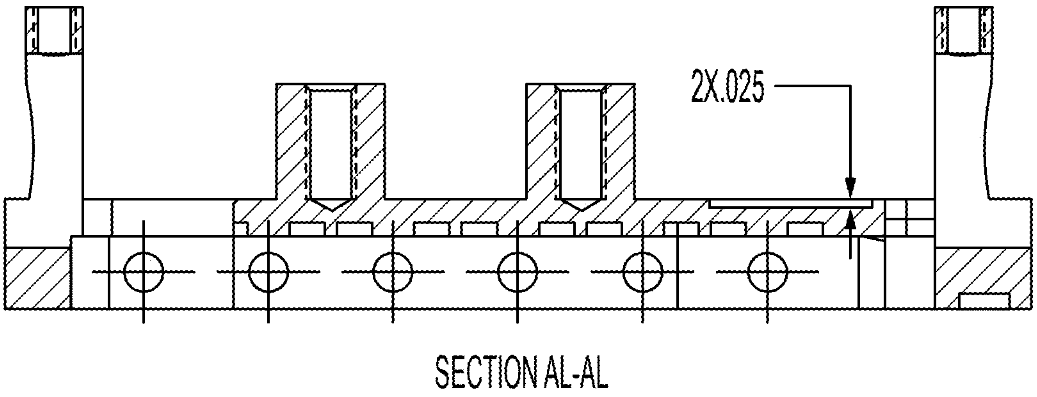
Figure 25E:
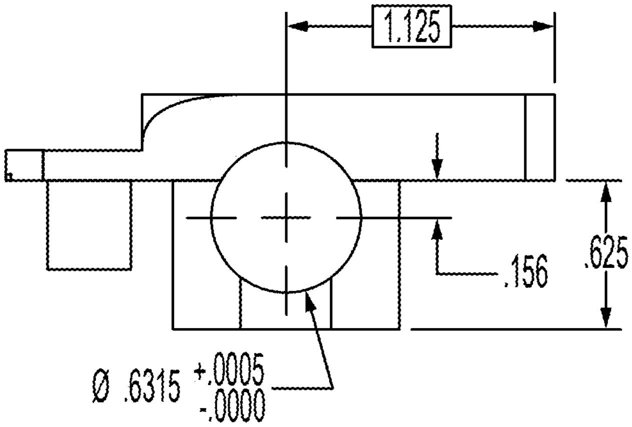
Figure 25F:
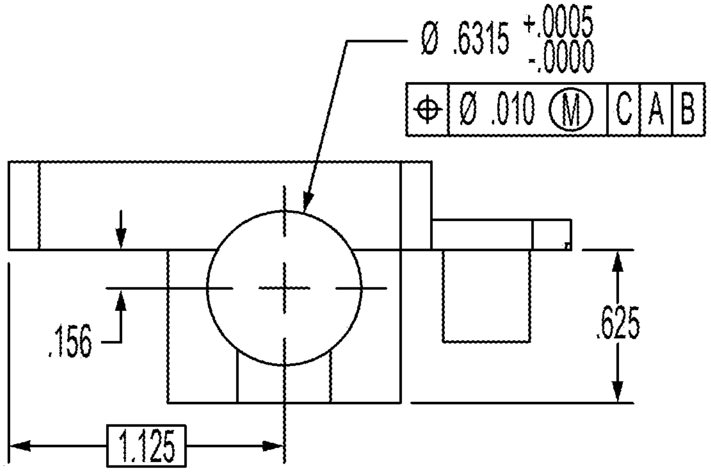
Figure 26A:
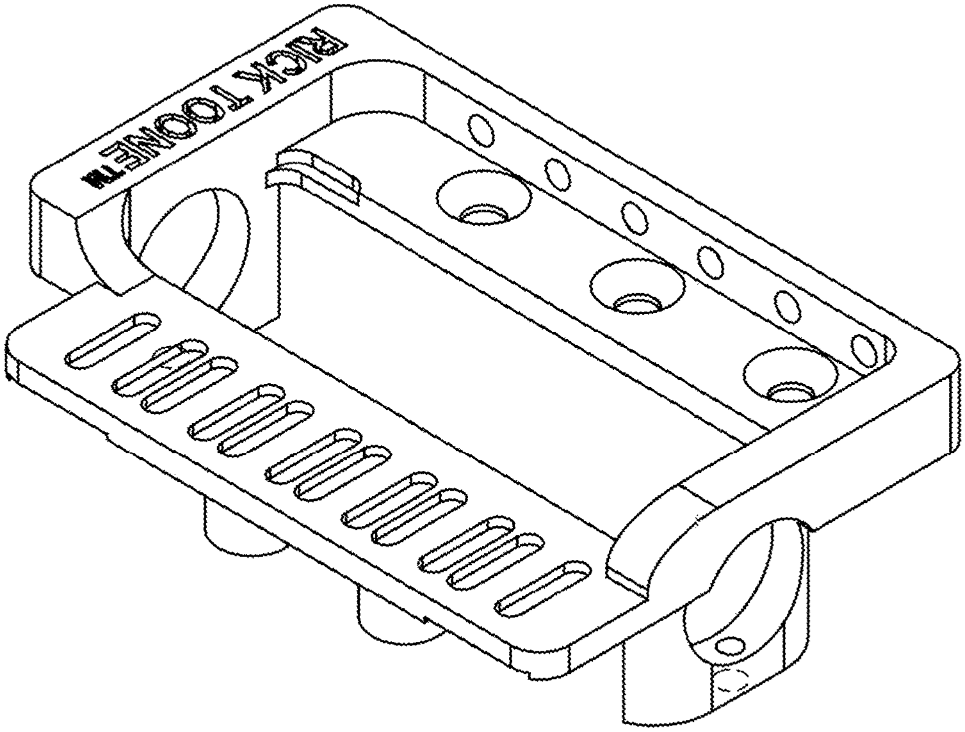
FIGS. 26(*a*)-26(*f*) are views of the example tremolo frame or mount of FIGS. 25(*a*)-25(*f*) in accord with at least some aspects of the present concepts where FIG. 26(*a*) is a perspective view, FIG. 26(*b*) is a top view, FIG. 26(*c*) is a front view, FIG. 25(*d*) is a cross-sectional view taken along cross-section D-D of FIG. 26(*b*), FIG. 26(*e*) is a detailed view of region AH of FIG. 26(*b*) and FIG. 26(*f*) is an enlarged (2:1) cross-sectional view along cross-section AK-AK of FIG. 26(*e*).
Figure 26C:
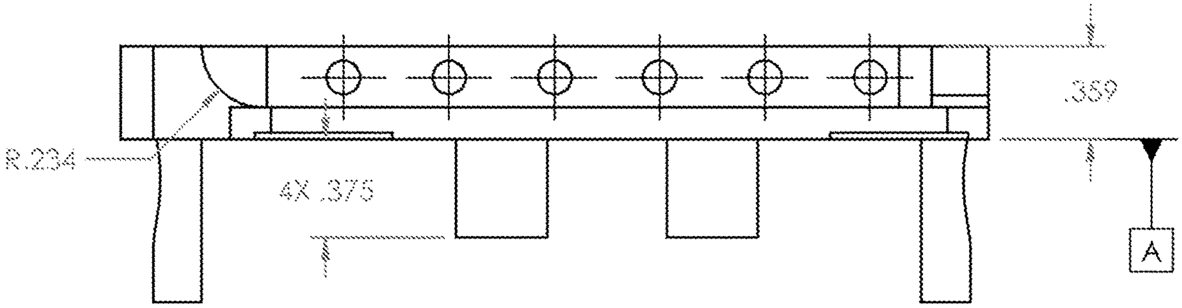
Figures 26B, 26D:
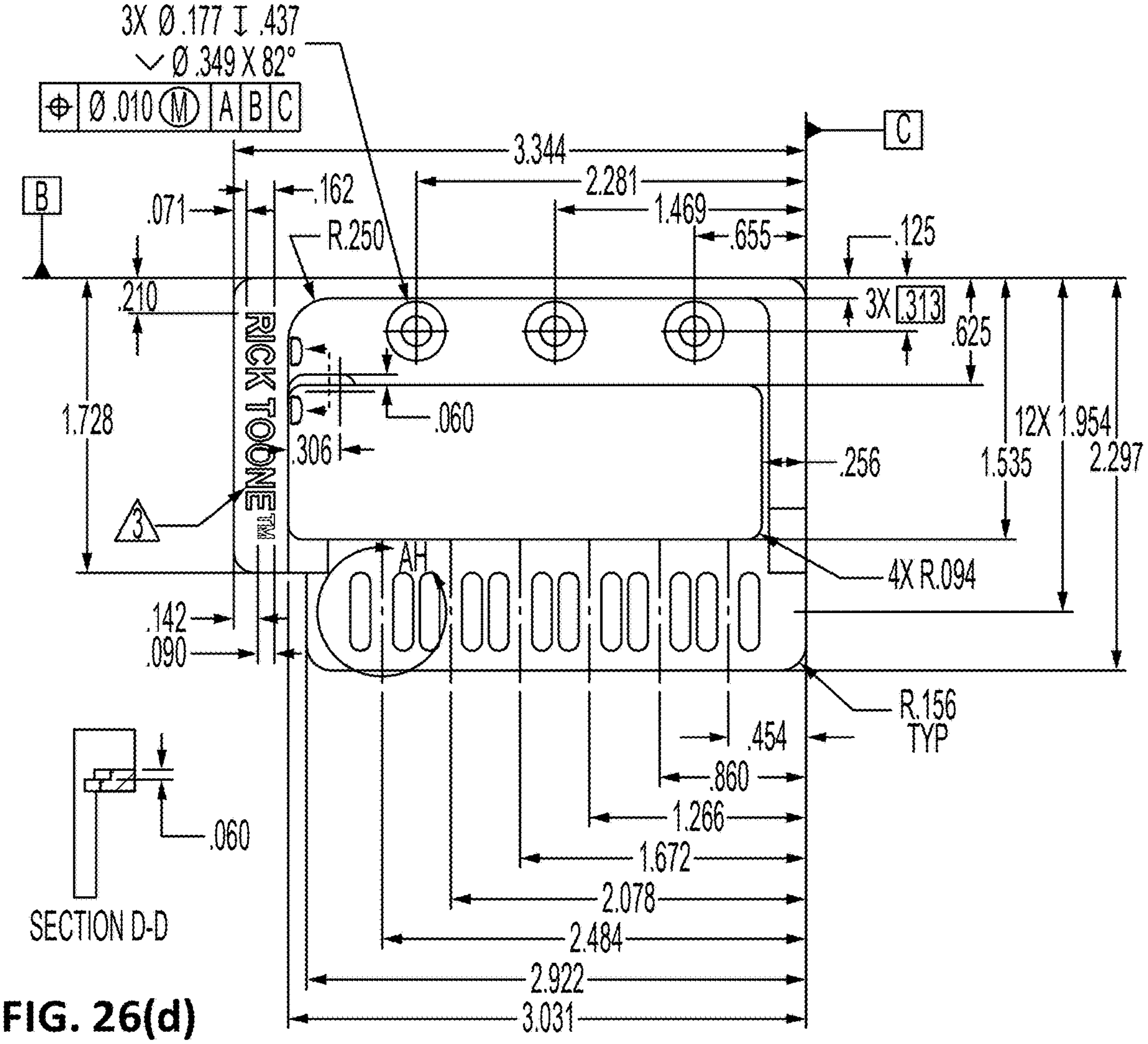
Figure 26E:
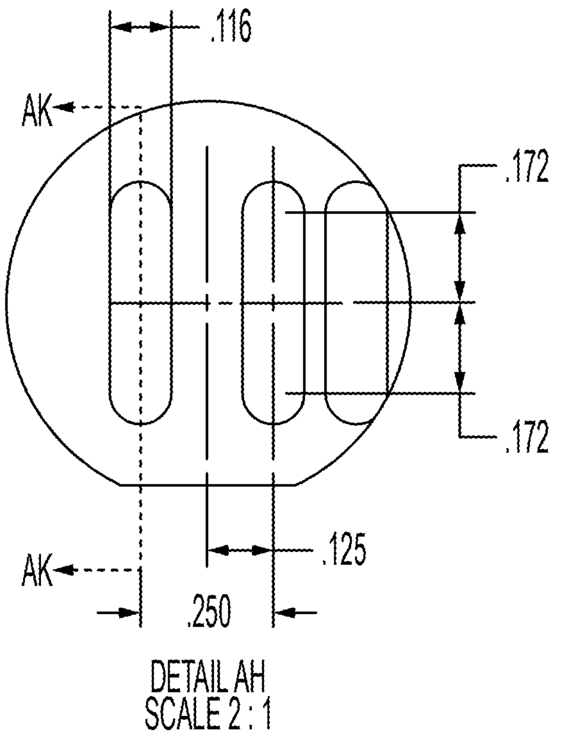
Figure 26F:
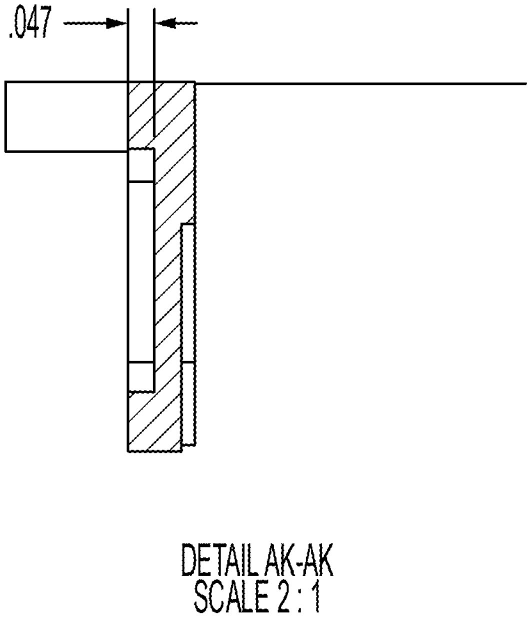
Figure 27A:
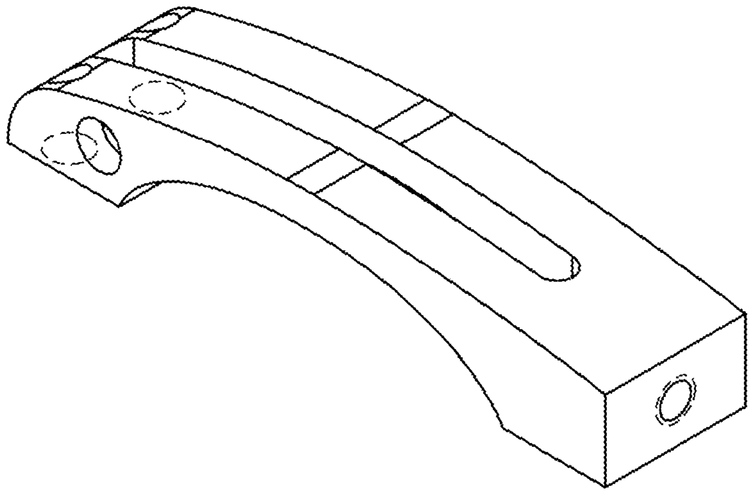
FIGS. 27(*a*)-27(*h*) are views of another example slider for a relative harmonic dynamic pitch control device in accord with at least some aspects of the present concepts where FIG. 27(*a*) is a first perspective view, FIG. 27(*b*) is a second perspective view, FIG. 27(*c*) is a top view, FIG. 27(*d*) is a first side view, FIG. 27(*e*) is a second side view, FIG. 27(*f*) is a bottom view, FIG. 27(*g*) is a rear view and FIG. 27(*h*) is a cross-sectional view along cross-section AN-AN of FIG. 27(*e*).
Figure 27B:
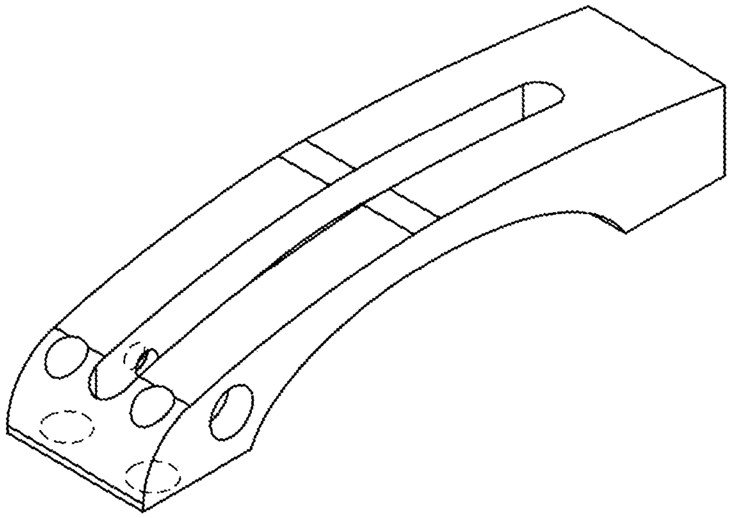
Figure 27C:
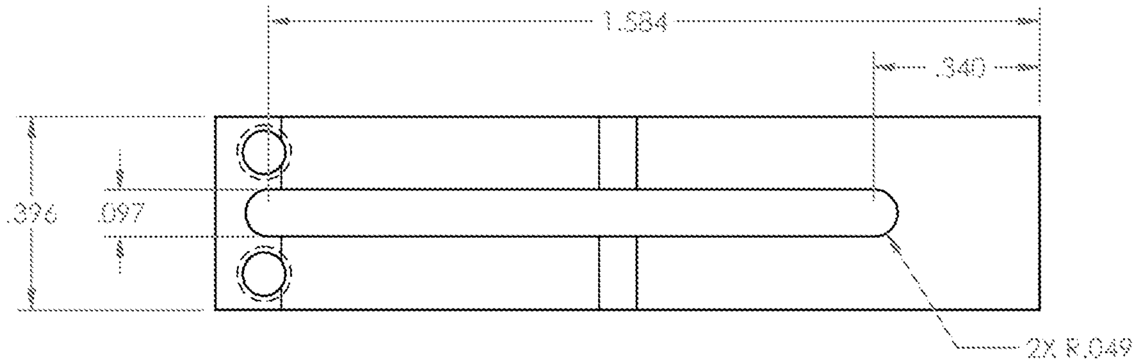
Figure 27D:
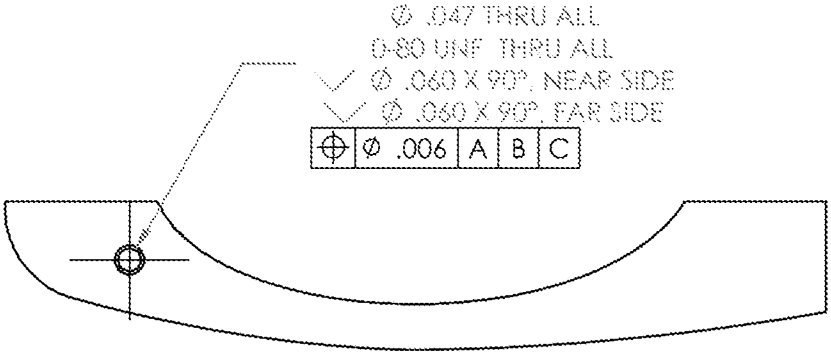
Figure 27E:
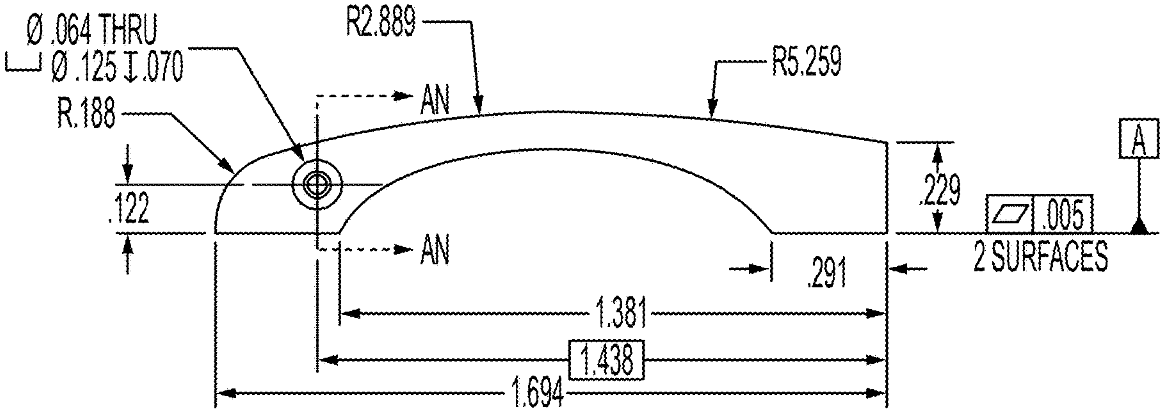
Figure 27F:
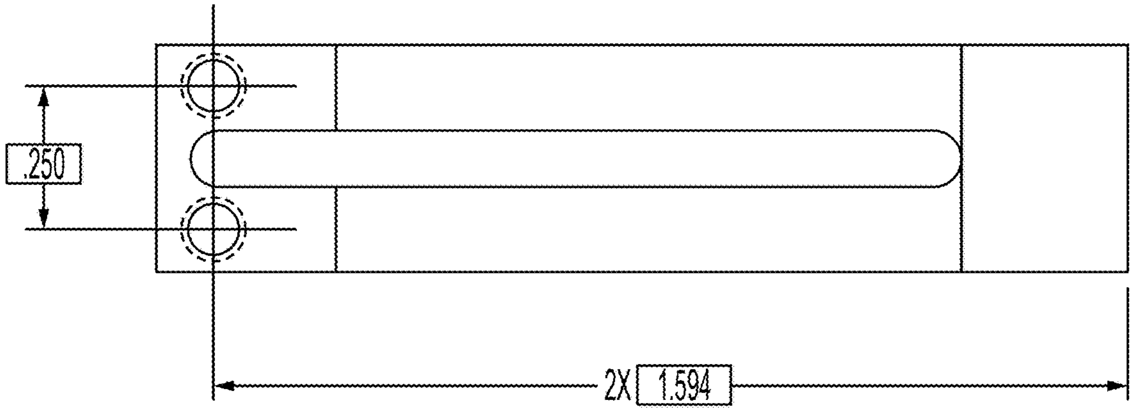
Figure 27G:
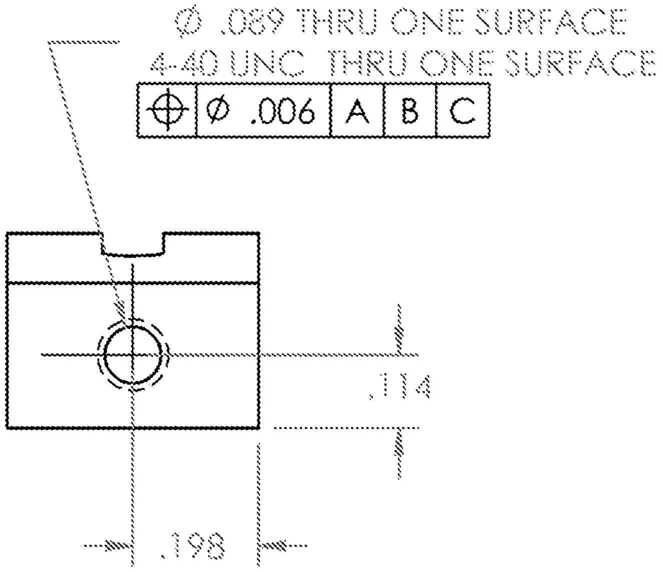
Figure 27H:
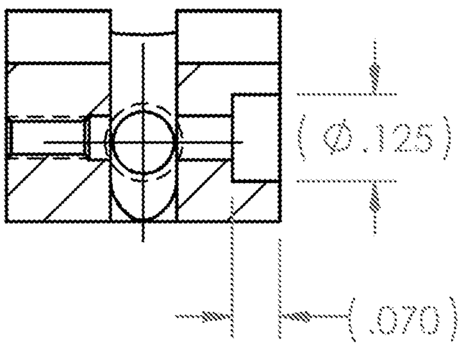
Figure 30A:
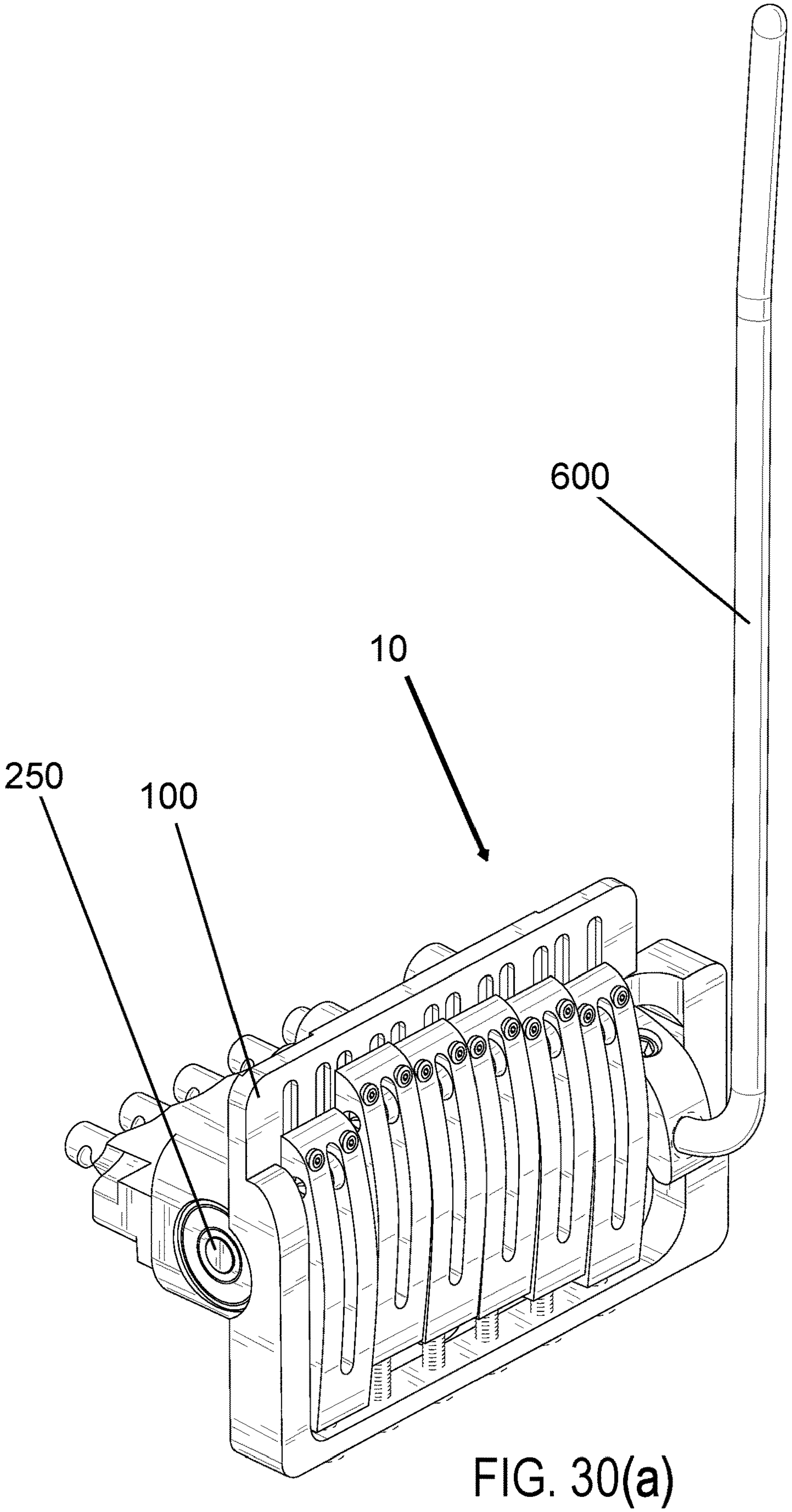
FIGS. 30(*a*)-30(*g*) are assembled views of an example relative harmonic dynamic pitch control device according to the example embodiment of FIGS. 22(*a*)-26(*f*), wherein the stringed instrument is omitted for clarity, in accord with at least some aspects of the present concepts.
Figure 30B:
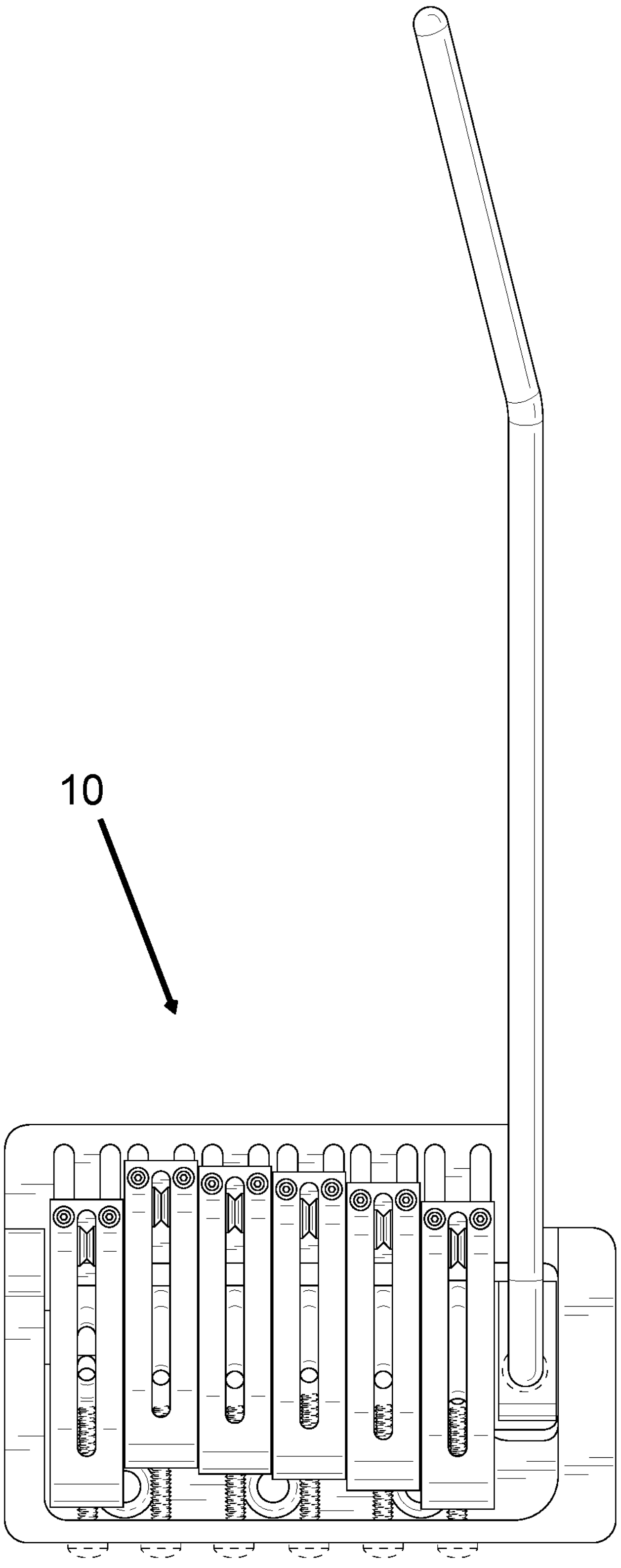
Figure 30C:
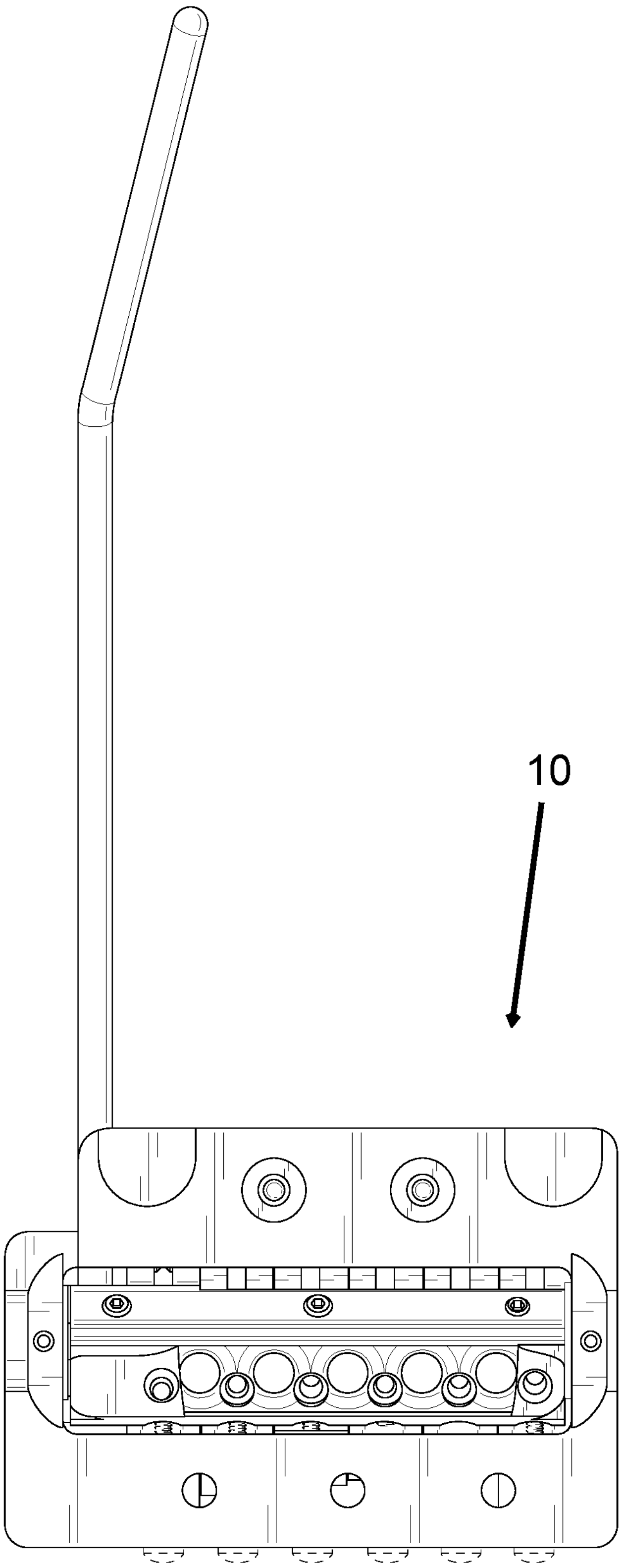
Figure 30D:
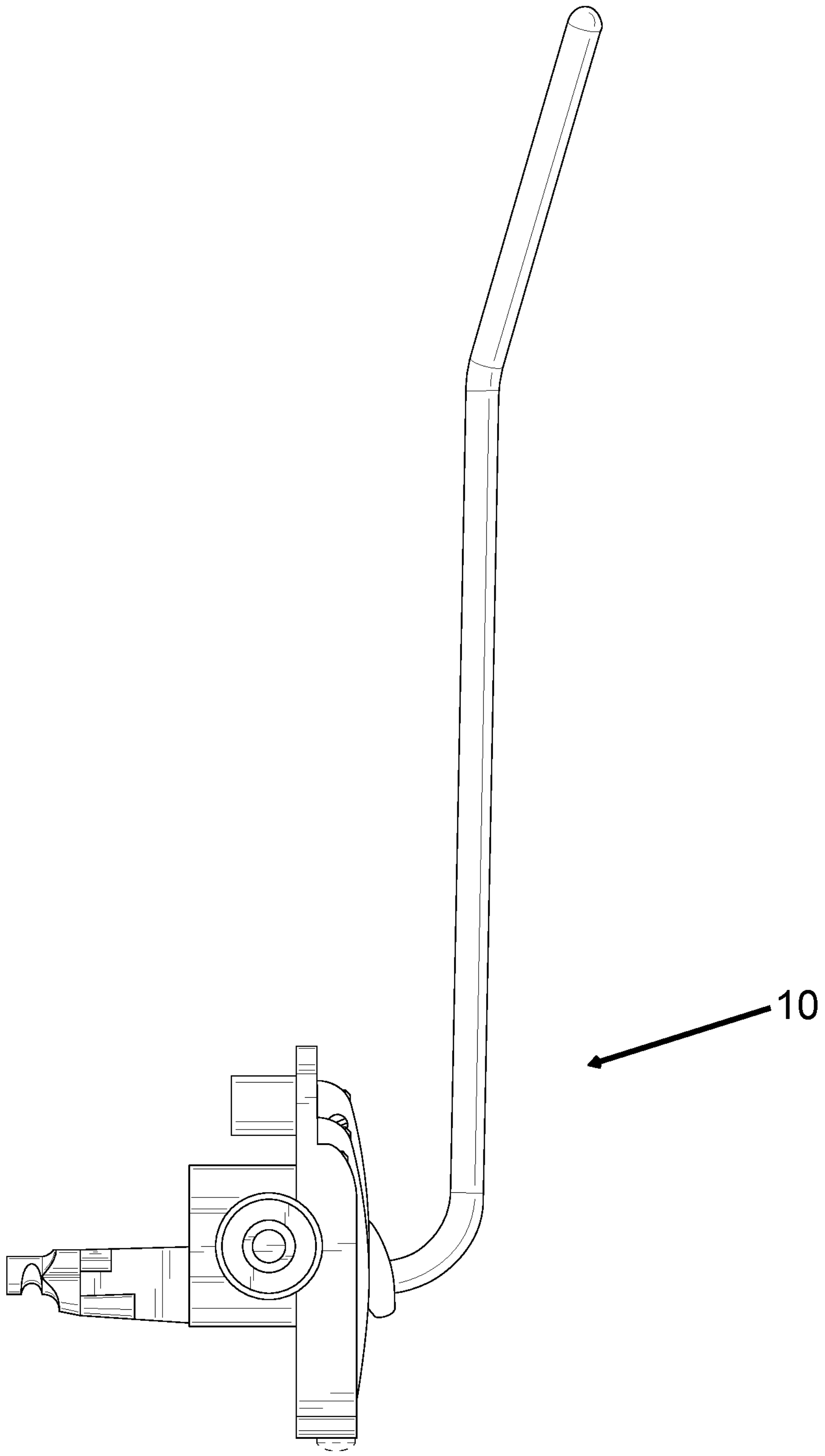
Figure 30E:
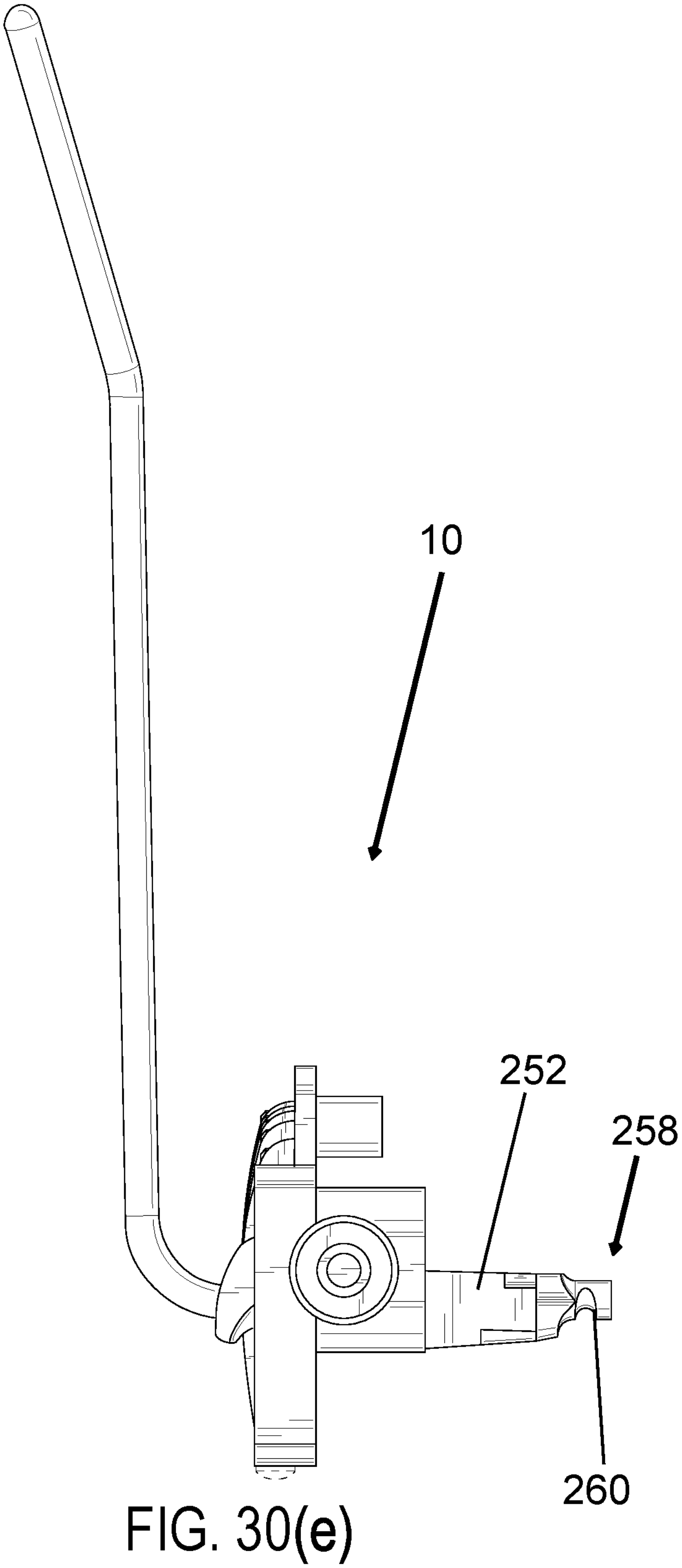
Figure 30F:
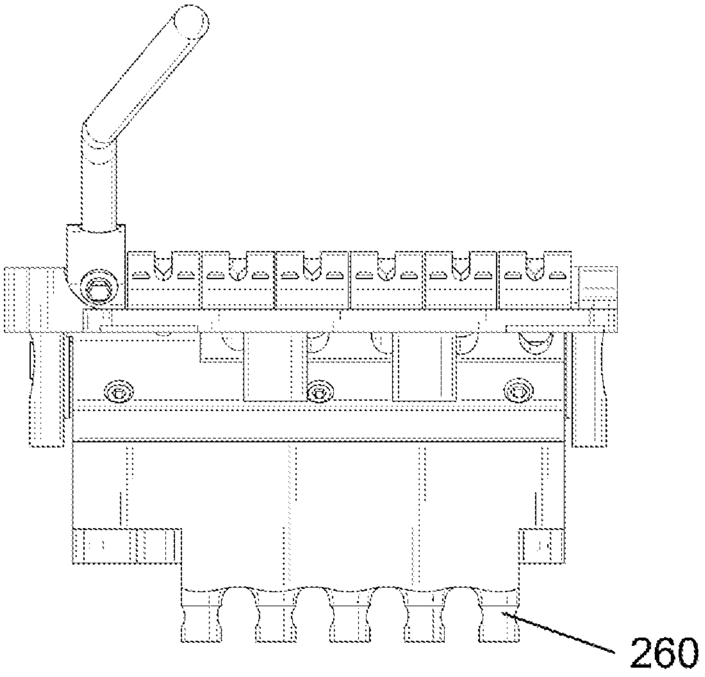
Figure 30G:
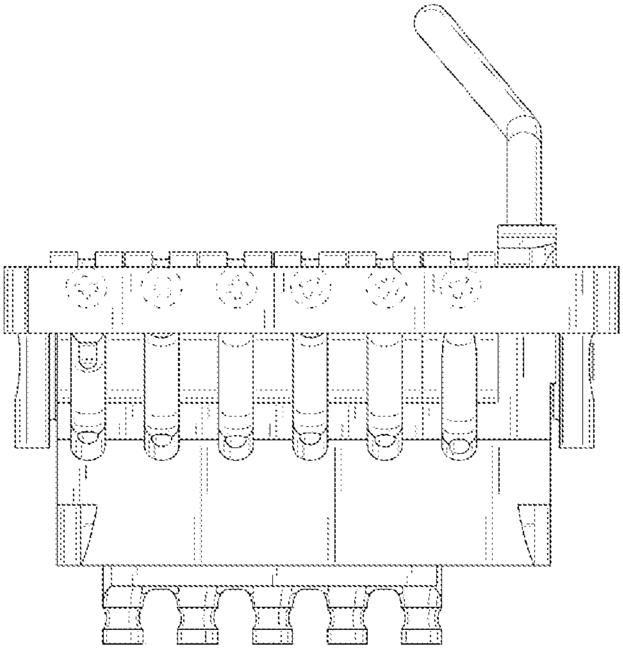

In at least some aspects of the present concepts, the arm 600 or "whammy bar" (see, e.g., FIGS. 1(*a*)-4(*b*) and FIGS. 18(*a*)-18(*c*)) can be positioned in user-configurable relationship to the integrated tremolo cam and tremolo lever 200 and the rotatable string contact surface(s) (e.g., 205, 210, 215, 220, 225, 230), thus allowing adjustable leverage. The location of the arm 600 may be: a) in front of, b) in alignment with, c) behind, d) outside the axis of rotation of the integrated tremolo cam and tremolo lever 200, each option of which provides unique leverage configurations to control the movement of the rotatable string contact surface(s).

FIGS. 30(*a*)-30(*g*) are assembled views of an example relative harmonic dynamic pitch control device according to the example embodiment of FIGS. 22(*a*)-26(*f*), wherein the stringed instrument is omitted for clarity, in accord with at least some aspects of the present concepts.

Figure 31A:
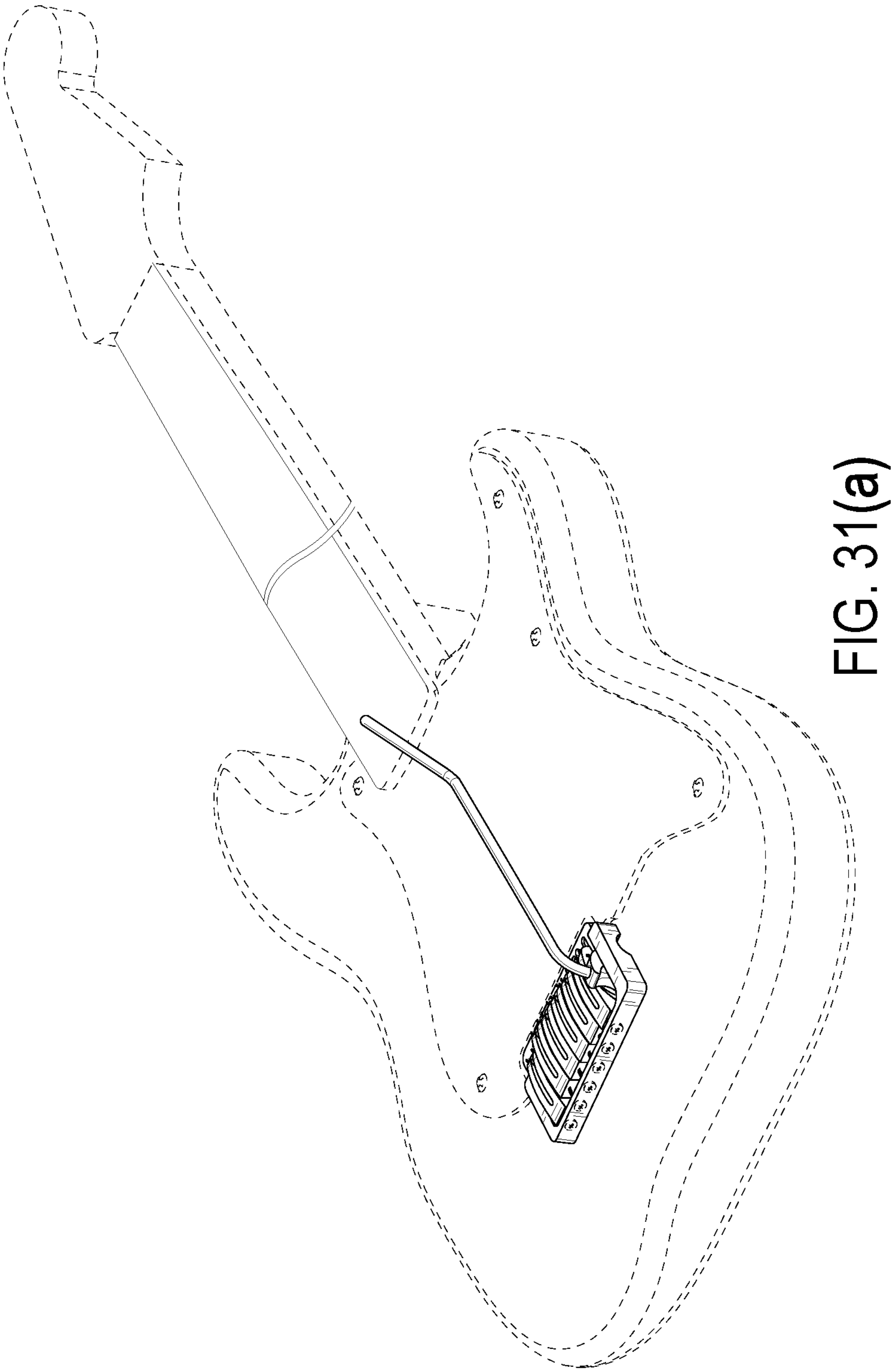
FIGS. 31(*a*)-31(*b*) are assembled views of an example relative harmonic dynamic pitch control device according to the example embodiment of FIGS. 22(*a*)-26(*f*) and FIGS. 30(*a*)-30(*g*), wherein an example stringed instrument is depicted, in accord with at least some aspects of the present concepts.
Figure 31B:
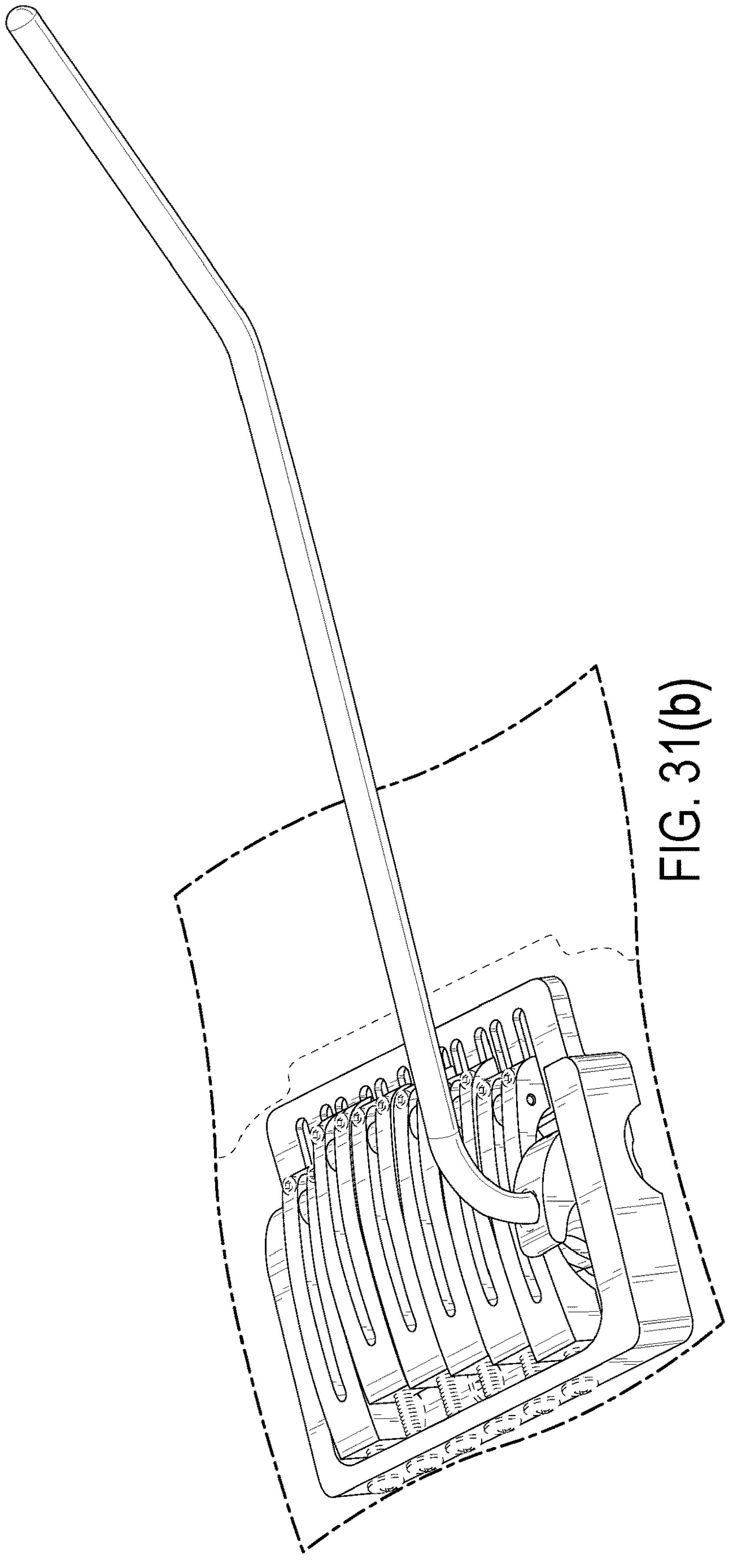

FIGS. 31(*a*)-31(*b*) are assembled views of an example relative harmonic dynamic pitch control device according to the example embodiment of FIGS. 22(*a*)-26(*f*) and FIGS. 30(*a*)-30(*g*), wherein an example stringed instrument is depicted, in accord with at least some aspects of the present concepts.

An alternate embodiment optionally adds a tuning mechanism where the string anchors at the bridge in order to relocate or augment string pitch tuning to the disclosed relative harmonic dynamic pitch control device. For example, this would be useful on a headless guitar design (i.e., a guitar that does not use tuners mounted on a headstock).

Components associated with the disclosed relative harmonic dynamic pitch control may be manufactured from any material or by any methodology sufficient to withstand string tension forces, such as aluminum or alloys, such as stainless steel.

In some aspects, attachment of the tremolo arm ("whammy bar") occurs in whole or in part outside of a radius of one or more of the tremolo cam string contact surfaces (e.g., outside of a radius of a string contact surface defined by a radius or outside of at least a portion of a curved surface of the string contact surface defined by one or more curves defined by other than a single radius). For example, in at least some aspects of the present concepts, at least a portion of the connection between a proximal end (a base) of the whammy bar and the tremolo cam is outside of a radius of all of the cam string surfaces (where the strings engage the tremolo cam). In at least some aspects of the present concepts, at least a portion of the connection between a proximal end (a base) of the whammy bar and the tremolo cam is outside of a radius of at least one of the cam string surfaces. In at least some aspects of the present concepts, at least a portion of the connection between a proximal end (a base) of the whammy bar and the tremolo cam is inside a radius of at least one of the cam string surfaces. Accordingly, at least some aspects of the present concepts include an interface between the tremolo arm and the tremolo cam that utilizes a larger diameter (larger radius) lever projection to increase the leverage enabled via the tremolo arm.

The tremolo arm connection to the tremolo lever or to the integrated tremolo cam and tremolo lever, could be a) in front of, b) in alignment with, c) behind, the axis of rotation of the respective tremolo lever or integrated tremolo cam and tremolo lever. Each of these positions provides unique leverage configurations to control the movement of the tremolo cam to achieve desired leverage and/or pitch effects.

In some examples, the rotation pivot of the tremolo lever, the tremolo cam, and/or the integrated tremolo cam and tremolo lever could be: a) an axle, b) multiple axles, c) a thru-axle, d) a pivot point or points such as a knife edge, e) a round axle, f) an asymmetrical axle. In some aspects, the location of the axle (pivot point) is adjustable, providing user-configurable pivot or rotation effects. The relative locations of the pivot points (axles) could be in alignment with each other, or not in alignment with each other, both of which configurations have unique effects. In some examples, a combination of rotation pivot designs could be used. Still further, multiple rotation pivot locations could be employed for the tremolo lever, the tremolo cam, and/or the integrated tremolo cam and tremolo lever. For example, a semi-circular slot which supports or guides an axle of the tremolo lever, the tremolo cam, and/or the integrated tremolo cam and tremolo lever, causing the tremolo lever, the tremolo cam, and/or the integrated tremolo cam and tremolo lever to rotate at differing rates relative to the starting rate of rotation.

In some examples of the present concepts, a rotational tremolo lever, the tremolo cam, and/or the integrated tremolo cam and tremolo lever string contact surface is configured to selectively include or exclude one or more strings of the stringed instrument strings from its effects. For example, in some examples of a tremolo unit in accord with at least some aspects of the present concepts, the tremolo is configured to only pitch bend one or more selected strings, while one or more other strings are bypassed and thus maintain a constant unwavering pitch.

In some aspects of the present concepts, a rotational tremolo cam or integrated tremolo cam and tremolo lever string contact surface that is comprised of an additive series of rotational effects. For example, a stackable series of rotatable surfaces of differing radii, each of which is calibrated to impart an effect on string pitch.

In some aspects of the present concepts, a rotation pivot location for a rotational tremolo cam, tremolo lever, or integrated tremolo cam and tremolo lever is advantageously adjustable along one or more axes and/or rotationally relative to the tremolo frame mount, providing options for tailoring a location of the rotational tremolo cam, tremolo lever, or integrated tremolo cam and tremolo lever to provide a desired longitudinal string pitch tension in a neutral or default position. As an example, a vertical position of an axis of rotation of the shaft for some embodiments of the integrated tremolo cam and tremolo lever (e.g., FIGS. 23(*a*)-23(*d*)) is at a different position relative to the body of the guitar (e.g., deeper inside the body of the guitar) than on other embodiments of the integrated tremolo cam and tremolo lever (e.g., FIG. 12(*a*)). Doing so can result in changes to the feel and/or performance of the stringed instrument such as, but not limited to, a lower profile design which protrudes less from the surface of the stringed instrument body.

In some aspects of the present concepts, a variable distance (e.g., adjustable, user-configurable, etc.) contact point relative to the axis of rotation (e.g., dowel pins, axle, shaft, etc.) of the allows for corresponding adjustments to be made in the location of the springs, magnets, or other counteracting force. For example, the springs could be located at a distance closer or greater from the axle, thus decreasing or increasing the leverage applied to the tremolo lever or the integrated tremolo cam and tremolo lever to counter the force of the longitudinal string pitch tension. Doing so allows for compensation relative to the tension forces of different diameter string sets or different string pitch tunings.

In some aspects of the present concepts, the slider is configured to enable adjustment of the string intonation point bridges while overarching the tremolo cam, the tremolo lever or the tremolo lever integrated tremolo cam and tremolo lever. As can be seen, the configuration of the sliders (and string intonation point) is different as between embodiments herein.

In some aspects of the present concepts, one of the many unique aspects comprises a protrusion from the bottom of the tremolo frame that serves as an attachment point for a bolt that anchors the unit to the body of the guitar. One function of these protrusions is to provide alignment for installation of the unit and also as a method to counteract longitudinal string force tension. Basically, these protrusions are incredibly strong buttresses which greatly reduce the amount of force the various fasteners are required to have.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims presented herein, non-limiting examples of which are presented below.

In example 1, the present concepts include a tremolo for a stringed-instrument, comprising a tremolo frame and one or more tremolo cams. In some aspects of this example, the one or more tremolo cams consist of a single tremolo cam having a curved string contact surface at a position corresponding to a string position of a selected string for a stringed instrument, the single tremolo cam being disposed at a central portion of a body of the stringed instrument and having a lateral width greater than a width of the selected string. In some aspects of this example, the one or more tremolo cams comprise, in combination, a plurality of laterally spaced-apart curved string contact surfaces at positions and at a spacing corresponding to a string positions of a plurality of strings for a stringed instrument, the one or more tremolo cams being disposed adjacent the tremolo frame, each of the plurality of string contact surfaces having a lateral width greater than a width of a corresponding stringed instrument string. The tremolo also includes a tremolo lever rotatably mounted to the tremolo frame to rotate about an axis of rotation, the tremolo lever having an upper portion and a lower portion, the upper portion being adjacent the tremolo frame and being rotatably connected thereto by direct or indirect connection to the tremolo frame, the lower portion extending downwardly away from the upper portion and away from the tremolo frame in a direction corresponding to an interior cavity of a body of a stringed instrument, the lower portion of the tremolo lever comprising, at or near a distal portion of the lower portion, one or more string retention structures configured to secure end portions of stringed instrument string(s). The upper portion of the tremolo lever further comprises a first mechanical connector to receive, or to removably receive, a mating second mechanical connector at a first end portion of an outer lever arm. Forces applied to the outer lever arm by a user in one direction causes rotation of the tremolo lever (or the example integrated tremolo cam and tremolo lever) about the axis of rotation in a first direction of rotation and displacement of the distal portion of the tremolo lever in a tremolo first direction to increase a tension in, and a pitch of, strings secured at the distal portion of the tremolo lever via the one or more string retention structures. Forces applied to the outer lever arm by a user in another direction opposite to the one direction causes rotation of the tremolo lever (or the example integrated tremolo cam and tremolo lever) about the axis of rotation in a second direction of rotation and displacement of the distal portion of the tremolo lever in a second direction opposite the first direction to decrease a tension in, and a pitch of, strings secured at the distal portion of the tremolo via the one or more string retention structures.

In example 2, the present concepts include, further to example 1, wherein the tremolo frame comprises a plurality of openings at a rear portion of the tremolo frame to receive mechanical connectors to affix the tremolo frame to an exterior of a face of body of the stringed-instrument.

In example 3, the present concepts include, further to example 1 or example 2 or any of examples 4-21, wherein the tremolo lever is rotatably mounted to the tremolo frame via a shaft.

In example 4, the present concepts include, further to any of examples 1-3 or any of examples 5-21, wherein the tremolo lever is rotatably mounted to the tremolo frame via a first end portion of the tremolo lever rotatably mounted in a first side of the tremolo frame and via a second end portion of the tremolo lever rotatably mounted in a second side of the tremolo frame opposite the first side, wherein the first end of the tremolo lever comprises a first male member or a first female member configured to rotatably engage a mating first member of the first side of the tremolo frame, and wherein the second end of the tremolo lever comprises a second male member or a second female member configured to rotatably engage a mating first member of the second side of the tremolo frame.

In example 5, the present concepts include, further to any of examples 1-4 or any of examples 6-21, wherein the one or more tremolo cams are integrated with the upper portion of the tremolo lever.

In example 6, the present concepts include, further to any of examples 1-5 or any of examples 7-21, wherein the curved surface of each string contact surface comprises a central portion defined by a radius of rotation, a first distal portion on a first side of the central portion, and a second distal portion on a second side of the central portion, each of the first distal portion and the second distal portion having a curvature or profile displacing the first distal portion and the second distal portion away from contact with a string path of a respective tensioned string contacting the central portion of the string contact surface.

In example 7, the present concepts include, further to any of examples 1-6 or any of examples 8-21, wherein the tremolo lever is configured to rotate about the axis of rotation in the first direction of rotation by an angle of about 20° or less relative to a default neutral position of the tremolo lever under string tension, and wherein the tremolo lever is configured to rotate about the axis of rotation in the second direction of rotation by an angle of about 20° or less relative to a default neutral position of the tremolo lever under string tension.

In example 8, the present concepts include, further to any of examples 1-7 or any of examples 9-21, wherein the first mechanical connector at the upper portion of the one or more tremolo cams is offset from the axis of rotation of the tremolo lever.

In example 9, the present concepts include, further to any of examples 1-8 or any of examples 10-21, wherein the tremolo lever further defines, at or near the distal portion of the tremolo lever, one or more biasing member retention structures comprising one or more male connectors, female connectors, clamping members, posts, holes, openings, or through holes.

In example 10, the present concepts include, further to any of examples 1-9 or any of examples 11-21, wherein the one or more tremolo cams and/or the tremolo lever comprise a plurality of removably attachable interlocking segments.

In example 11, the present concepts include, further to any of examples 1-10 or any of examples 12-21, wherein the tremolo frame comprises, at a front portion thereof, a depending member extending in a direction generally perpendicular to the axis of rotation and away from the tremolo frame to place the depending member in opposition to the lower portion of the tremolo lever when the lower portion of the tremolo lever is displaced to the first position at the first angle relative to the axis of rotation, and wherein the depending member comprises one or more rare earth magnets of a first polarity disposed therein or attached thereto and wherein the lower portion of the tremolo lever comprises one or more rare earth magnets of a second polarity disposed therein or attached thereto disposed in a position to magnetically interact with the one or more rare earth magnets of the tremolo frame depending member to provide a force assisting movement of the lower portion of the tremolo lever in the first direction toward the depending member as the lower portion of the tremolo lever approaches the first position.

In example 12, the present concepts include, further to any of examples 1-11 or any of examples 13-21, wherein the tremolo frame comprises, at a front portion thereof, a depending member extending in a direction generally perpendicular to the axis of rotation and away from the tremolo frame to place the depending member in opposition to the lower portion of the tremolo lever when the lower portion of the tremolo lever is displaced to the first position at the first angle relative to the axis of rotation, and wherein one of the depending member or the lower portion of the tremolo lever comprises one or more rare earth magnets of a first polarity disposed therein or attached thereto and wherein the other of the depending member or the lower portion of the tremolo lever comprises one or more ferromagnetic elements disposed therein or attached thereto disposed in a position to magnetically interact with the one or more rare earth magnets of the depending member or the lower portion of the tremolo lever to provide a force assisting movement of the lower portion of the tremolo lever in the first direction toward the depending member as the lower portion of the tremolo lever approaches the first position.

In example 13, the present concepts include, further to any of examples 1-12 or any of examples 13-21, wherein the radius of rotation of the curved surfaces of the string contact surfaces are, for High E, B, G, D, A, and Low E, in a ratio of about 1/12:1/22:1/33:1/24:1/29:1/42, respectively.

In example 14, the present concepts include, further to any of examples 1-13 or any of examples 15-21, wherein the plurality of laterally spaced-apart curved string contact surfaces of the one or more tremolo cams comprise a roller.

In example 15, the present concepts include, further to any of examples 1-14 or any of examples 16-21, wherein one or more of the plurality of string contact surfaces defines a variable curvature for which a radius of curvature varies along at least a portion of a length of a central portion of the curved surface.

In example 16, the present concepts include, further to any of examples 1-15 or any of examples 16-21, wherein the tremolo lever further defines, at a lower portion thereof, one or more biasing member retention structures.

In example 17, the present concepts include, further to any of examples 1-16 or any of examples 18-21, wherein the one or more biasing member retention structures comprise one or more posts, one or more posts having a through-hole to receive an end portion of a biasing member retention structure, one or more holes formed in the lower portion of the tremolo lever, one or more male connection members, or one or more female connection members.

In example 18, the present concepts include, further to any of examples 1-17 or any of examples 19-21, wherein the one or more biasing member retention structures are configured to receive and retain an end portion of one or more biasing members comprising one or more tension springs.

In example 19, the present concepts include, further to any of examples 1-18 or any of examples 20-21, wherein the tremolo lever, or optionally the tremolo cam(s) where the tremolo lever is integrated with or attached to the tremolo cam(s), is mounted about a rotatable shaft having a first end rotatably mounted in a first side of the tremolo frame and having a second end rotatably mounted in a second side of the tremolo frame opposite the first side.

In example 20, the present concepts include, further to any of examples 1 or 3-19, wherein the tremolo lever, or optionally the tremolo cam(s) where the tremolo lever is integrated with or attached to the tremolo cam(s), comprises a first post on a first end configured to rotatably mount within a first bearing surface at a first side of the tremolo frame and comprises a second post on a second end configured to rotatably mount within a second bearing surface at a second side of the tremolo frame.

In example 21, the present concepts include, further to any of examples 1 or 3-20, wherein the tremolo lever, or optionally the tremolo cam(s) where the tremolo lever is integrated with or attached to the tremolo cam(s), comprises a first male member on a first end configured to rotatably mount within a first female member at a first side of the tremolo frame and comprises a second male member on a second end configured to rotatably mount within a second female member at a second side of the tremolo frame.

In example 22, a stringed-instrument, comprises a neck (and optionally a head), a body defining an interior cavity and a tremolo comprising a tremolo frame, a tremolo lever, and one or more tremolo cams. In some aspects of this example, the one or more tremolo cams consist of a single tremolo cam having a curved string contact surface at a position corresponding to a string position of a selected string for a stringed instrument, the single tremolo cam being disposed at a central portion of the body of the stringed instrument and having a lateral width greater than a width of the selected string. In some aspects of this example, the one or more tremolo cams comprise, in combination, a plurality of laterally spaced-apart curved string contact surfaces at positions and at a spacing corresponding to a string positions of a plurality of strings for the stringed instrument, the one or more tremolo cams being disposed at a central portion of the body, each of the plurality of string contact surfaces having a lateral width greater than a width of a corresponding stringed instrument string. The tremolo lever is rotatably mounted to the tremolo frame to rotate about an axis of rotation, the tremolo lever having an upper portion and a lower portion, the upper portion being adjacent the tremolo frame and being rotatably connected thereto by direct or indirect connection to the tremolo frame, the lower portion extending downwardly away from the upper portion and into the interior cavity defined within the body of the stringed instrument, the lower portion of the tremolo lever comprising, at or near a distal portion of the lower portion, one or more string retention structures configured to secure end portions of stringed instrument strings. The upper portion of the tremolo lever further comprises a first mechanical connector to receive, or to removably receive, a mating second mechanical connector at a first end portion of an outer lever arm. Forces applied to the outer lever arm by a user in one direction causes rotation of the tremolo lever (or the example integrated tremolo cam and tremolo lever) about the axis of rotation in a first direction of rotation and displacement of the distal portion of the tremolo lever in a tremolo first direction to increase a tension in, and a pitch of, strings secured at the distal portion of the tremolo lever by an amount corresponding to a displacement of the distal portion in the first direction. Forces applied to the outer lever arm by a user in another direction opposite to the one direction causes rotation of the tremolo lever (or the example integrated tremolo cam and tremolo lever) about the axis of rotation in a second direction of rotation and displacement of the distal portion of the tremolo lever in a second direction opposite the first direction to decrease a tension in, and a pitch of, strings secured at the distal portion of the tremolo by an amount corresponding to a displacement of the distal portion in the second direction.

In example 31, further to example 30, the tremolo cam further comprises a mechanical connector to removably receive an outer lever arm manipulatable to rotate the tremolo cam about the axis of rotation to dynamically change a tension in, and a pitch of, each of the strings born within the plurality of spaced-apart contact surfaces. In some examples, inclusive of example 22 and examples 24-47, the stringed instrument optionally omits the head (e.g., a "headless guitar", etc.).

In example 23, further to example 22 or any of examples 24-47, wherein the tremolo frame is fixed to the body of the stringed instrument and remains stationary during movement of the tremolo lever.

In example 24, further to any of examples 22-23 or any of examples 25-47, wherein the first angle of rotation is an angle of 20° or less in the first direction about the axis of rotation relative to a default neutral position of the tremolo lever under string tension and wherein the second angle is an angle of 20° or less in the second direction of rotation relative to the default neutral position of the tremolo lever under string tension.

In example 25, further to any of examples 22-24 or any of examples 26-47, wherein the tremolo lever is rotatably mounted to the tremolo frame via a shaft, or wherein the tremolo lever is rotatably mounted to the tremolo frame via a first end portion of the tremolo lever rotatably mounted in a first side of the tremolo frame and via a second end portion of the tremolo lever rotatably mounted in a second side of the tremolo frame opposite the first side, the first end of the tremolo lever comprising a first male member or a first female member configured to rotatably engage a mating first member of the first side of the tremolo frame and the second end of the tremolo lever comprising a second male member or a second female member configured to rotatably engage a mating first member of the second side of the tremolo frame.

In example 26, further to any of examples 22-25 or any of examples 27-47, wherein the one or more tremolo cams are integrated with the upper portion of the tremolo lever or wherein the one or more tremolo cams comprise stationary bearing surfaces or rollers independent of the tremolo lever.

In example 27, further to any of examples 22-26 or any of examples 28-47, wherein the one or more tremolo cams and/or the tremolo lever comprise a plurality of removably attachable interlocking segments.

In example 28, further to any of examples 22-27 or any of examples 29-47, wherein the tremolo frame comprises, at a front portion thereof, a depending member extending in a direction generally perpendicular to the axis of rotation and into the interior cavity defined within the body of the stringed instrument to place the depending member in opposition to the lower portion of the tremolo lever when the lower portion of the tremolo lever is displaced in the first direction and wherein the depending member comprises one or more rare earth magnets of a first polarity disposed therein or attached thereto and wherein the lower portion of the tremolo lever comprises one or more rare earth magnets of a second polarity disposed therein or attached thereto disposed in a position to magnetically interact with the one or more rare earth magnets of the tremolo frame depending member to provide a force assisting movement of the lower portion of the tremolo lever in the first direction toward the depending member as the lower portion of the tremolo lever is displaced in the first direction.

In example 29, further to any of examples 22-28 or any of examples 30-47, wherein the tremolo frame comprises, at a front portion thereof, a depending member extending in a direction generally perpendicular to the axis of rotation and into the interior cavity defined within the body of the stringed instrument to place the depending member in opposition to the lower portion of the tremolo lever when the lower portion of the tremolo lever is displaced in the first direction and wherein one of the depending member or the lower portion of the tremolo lever comprises one or more rare earth magnets of a first polarity disposed therein or attached thereto and wherein the other of the depending member or the lower portion of the tremolo lever comprises one or more ferromagnetic elements disposed therein or attached thereto disposed in a position to magnetically interact with the one or more rare earth magnets of the depending member or the lower portion of the tremolo lever to provide a force assisting movement of the lower portion of the tremolo lever in the first direction toward the depending member as the lower portion of the tremolo lever is displaced in the first direction.

In example 30, further to any of examples 22-29 or any of examples 31-47, wherein the radius of rotation of the curved surfaces of the string contact surfaces are, for High E, B, G, D, A, and Low E, in a ratio of about 1/12:1/22:1/33:1/24:1/29:1/42, respectively.

In example 31, further to any of examples 22-30 or any of examples 32-47, wherein the tremolo lever further defines, at a lower portion thereof, one or more biasing member retention structures.

In example 32, further to any of examples 22-31 or any of examples 33-47, the plurality of laterally spaced-apart curved string contact surfaces of the one or more tremolo cams comprise a roller.

In example 33, further to any of examples 22-32 or any of examples 34-47, wherein one or more of the plurality of string contact surfaces defines a variable curvature for which a radius of curvature varies along at least a portion of a length of a central portion of the curved surface.

In example 34, further to any of examples 22-33 or any of examples 35-47, a plurality of strings, each of the plurality of strings being connected at a first end to connection members at the head of the stringed instrument and being connected at a second end to the one or more string retention structures configured to secure end portions of stringed instrument strings, and/or a plurality of biasing members connected, at a first end, to a sidewall of the interior cavity of the body of the stringed instrument and connected, at a second end, to the one or more biasing member retention structures.

In example 35, further to any of examples 22-34 or any of examples 36-47, wherein the one or more biasing member retention structures comprise one or more posts, one or more posts having a through-hole to receive an end portion of a biasing member retention structure, one or more holes formed in the lower portion of the tremolo lever, one or more male connection members, or one or more female connection members.

In example 36, further to any of examples 22-35 or any of examples 37-47, wherein the one or more biasing member retention structures are configured to receive and retain an end portion of one or more biasing members comprising one or more tension springs.

In example 37, further to any of examples 22-36 or any of examples 38-47, wherein the tremolo lever, or optionally the tremolo cam(s) where the tremolo lever is integrated with or attached to the tremolo cam(s), is mounted about a rotatable shaft having a first end rotatably mounted in a first side of the tremolo frame and having a second end rotatably mounted in a second side of the tremolo frame opposite the first side.

In example 38, further to any of examples 22-37 or any of examples 39-47, wherein the tremolo lever, or optionally the tremolo cam(s) where the tremolo lever is integrated with or attached to the tremolo cam(s), comprises a first post on a first end configured to rotatably mount within a first bearing surface at a first side of the tremolo frame and comprises a second post on a second end configured to rotatably mount within a second bearing surface at a second side of the tremolo frame.

In example 39, further to any of examples 22-38 or any of examples 40-47, wherein the tremolo lever, or optionally the tremolo cam(s) where the tremolo lever is integrated with or attached to the tremolo cam(s), comprises a first male member on a first end configured to rotatably mount within a first female member at a first side of the tremolo frame and comprises a second male member on a second end configured to rotatably mount within a second female member at a second side of the tremolo frame.

In example 42, further to any of examples 22-41 or any of examples 43-47, wherein the one or more biasing members comprise one or more tension springs.

In example 43, further to any of examples 22-42 or any of examples 44-47, the tremolo cam comprises a plurality of removably attachable components, each of the plurality of removably attachable components comprising at least one of the plurality of string contact surfaces.

In example 44, further to any of examples 22-43 or any of examples 45-47, the tremolo cam or the tremolo lever, or both the tremolo cam and the tremolo lever comprises a plurality of removably attachable components.

In example 45, further to any of examples 22-44 or examples 46-47, further comprising at least one string, the at least one string being connected, at a first end, at a predetermined portion of the head, and being disposed to traverse the neck and a portion of the body to align within a predetermined string contact surface and to connect, at a distal end, to a lower portion of the tremolo lever.

In example 46, further to any of examples 22-44 or example 47, further comprising a plurality of strings, each of the plurality of strings being connected, at a first end, at a predetermined portion of the head, and being disposed to traverse the neck and a portion of the body to align within a respective one of the plurality of string contact surfaces and to connect, at a distal end, to a lower portion of the tremolo lever.

In example 47, further to example 46, wherein the plurality of strings comprises two strings, three strings, four strings, five strings, six strings, seven strings, eight strings, nine strings, or ten strings.

In example 48, a tremolo for a stringed-instrument, comprising a tremolo frame and one or more tremolo cams. In some aspects of this example, the one or more tremolo cams consist of a single tremolo cam having a curved string contact surface at a position corresponding to a string position of a selected string for a stringed instrument, the single tremolo cam being disposed on an end portion (e.g., toward a distal end of a body of the stringed instrument at a side opposite a neck of the stringed instrument) of a front face of a body of the stringed instrument or at a distal end (e.g., an outer edge of the body of the stringed instrument, such as where the end pin is typically found) of the body of the stringed instrument and having a lateral width greater than a width of the selected string. In some aspects of this example, the one or more tremolo cams comprise, in combination, a plurality of laterally spaced-apart curved string contact surfaces at positions and at a spacing corresponding to a string positions of a plurality of strings for a stringed instrument, the one or more tremolo cams being disposed (e.g., adjacent or within the tremolo frame) on an end portion (e.g., toward a distal end of a body of the stringed instrument at a side opposite a neck of the stringed instrument) of a front face of a body of the stringed instrument or at a distal end (e.g., an outer edge of the body of the stringed instrument, such as where the end pin is typically found) of the body of the stringed instrument, each of the plurality of string contact surfaces having a lateral width greater than a width of a corresponding stringed instrument string. The tremolo also includes a tremolo lever rotatably mounted to the tremolo frame to rotate about an axis of rotation, the tremolo lever having an upper portion and a lower portion, the upper portion being adjacent the tremolo frame and being rotatably connected thereto by direct or indirect connection to the tremolo frame, the lower portion extending downwardly away from the upper portion and away from the tremolo frame in a direction corresponding to a rear surface (opposite the face or front) of the body of the stringed instrument, the lower portion of the tremolo lever comprising, at or near a distal portion of the lower portion, one or more string retention structures configured to secure end portions of stringed instrument string(s). The upper portion of the tremolo lever further comprises a first mechanical connector to receive, or to removably receive, a mating second mechanical connector at a first end portion of an outer lever arm. Forces applied to the outer lever arm by a user in one direction causes rotation of the tremolo lever (or the example integrated tremolo cam and tremolo lever) about the axis of rotation in a first direction of rotation and displacement of the distal portion of the tremolo lever in a tremolo first direction to increase a tension in, and a pitch of, strings secured at the distal portion of the tremolo lever via the one or more string retention structures. Forces applied to the outer lever arm by a user in another direction opposite to the one direction causes rotation of the tremolo lever (or the example integrated tremolo cam and tremolo lever) about the axis of rotation in a second direction of rotation and displacement of the distal portion of the tremolo lever in a second direction opposite the first direction to decrease a tension in, and a pitch of, strings secured at the distal portion of the tremolo via the one or more string retention structures. Optionally, the tremolo lever may be configured to rotate in only one direction to only cause an increase in, or a decrease in, pitch by manipulation of the tremolo lever.

In example 49, a stringed-instrument comprises a neck, a body and a tremolo disposed on the body. The tremolo comprises a tremolo frame, a tremolo lever, and one or more tremolo cams. In some aspects of this example, the one or more tremolo cams consist of a single tremolo cam having a curved string contact surface at a position corresponding to a string position of a selected string for a stringed instrument, the single tremolo cam being disposed on an end portion (e.g., toward a distal end of a body of the stringed instrument at a side opposite a neck of the stringed instrument) of a front face of a body of the stringed instrument or at a distal end (e.g., an outer edge of the body of the stringed instrument, such as where the end pin is typically found) of the body of the stringed instrument and having a lateral width greater than a width of the selected string. In some aspects of this example, the one or more tremolo cams comprise, in combination, a plurality of laterally spaced-apart curved string contact surfaces at positions and at a spacing corresponding to a string positions of a plurality of strings for the stringed instrument, the one or more tremolo cams being disposed on an end portion (e.g., toward a distal end of a body of the stringed instrument at a side opposite a neck of the stringed instrument) of a front face of a body of the stringed instrument or at a distal end (e.g., an outer edge of the body of the stringed instrument, such as where the end pin is typically found) of the body of the stringed instrument, each of the plurality of string contact surfaces having a lateral width greater than a width of a corresponding stringed instrument string. The tremolo lever is rotatably mounted to the tremolo frame to rotate about an axis of rotation, the tremolo lever having an upper portion and a lower portion, the upper portion being adjacent the tremolo frame and being rotatably connected thereto by direct or indirect connection to the tremolo frame, the lower portion extending downwardly away from the upper portion and into the interior cavity defined within the body of the stringed instrument, the lower portion of the tremolo lever comprising, at or near a distal portion of the lower portion, one or more string retention structures configured to secure end portions of stringed instrument strings. The upper portion of the tremolo lever further comprises a first mechanical connector to receive, or to removably receive, a mating second mechanical connector at a first end portion of an outer lever arm. Forces applied to the outer lever arm by a user in one direction causes rotation of the tremolo lever (or the example integrated tremolo cam and tremolo lever) about the axis of rotation in a first direction of rotation and displacement of the distal portion of the tremolo lever in a tremolo first direction to increase a tension in, and a pitch of, strings secured at the distal portion of the tremolo lever by an amount corresponding to a displacement of the distal portion in the first direction. Forces applied to the outer lever arm by a user in another direction opposite to the one direction causes rotation of the tremolo lever (or the example integrated tremolo cam and tremolo lever) about the axis of rotation in a second direction of rotation and displacement of the distal portion of the tremolo lever in a second direction opposite the first direction to decrease a tension in, and a pitch of, strings secured at the distal portion of the tremolo by an amount corresponding to a displacement of the distal portion in the second direction.

In example 50, further to example 49, the tremolo cam further comprises a mechanical connector to removably receive an outer lever arm manipulatable to rotate the tremolo cam about the axis of rotation to dynamically change a tension in, and a pitch of, each of the strings born within the plurality of spaced-apart contact surfaces.

In some aspects of the present concepts, in lieu of mechanical connectors such as bolts or screws inserted through holes in the tremolo frame and body of the stringed instrument to fasten/clamp the tremolo frame to the body, a wedge or other support internal to the body of the stringed instrument is used to interface with the tremolo frame and bias a portion of the tremolo frame extending into the body of the stringed instrument (e.g., around at least a portion of a circumference of an opening in the body). For instance, a support internal to the body of the stringed instrument (e.g., within a cavity formed in the body of the stringed instrument) applies pressure to a portion of tremolo frame to bias the tremolo frame into a stable, stationary state, thus providing a “blind” fastener that is invisible at the outer surface of the guitar.

In some aspects, the present concepts further include a method for dynamic pitch control using a tremolo lever that extends into a cavity formed in a body of a stringed instrument, wherein, for an outer lever arm attached directly or indirectly to the tremolo lever and being disposed external to the body of the stringed instrument, movement of the outer lever arm in a first direction of rotation for the outer lever arm (e.g., away from the body of the stringed instrument) rotates the tremolo lever about an axis of rotation of the tremolo lever to displace the distal portion of the tremolo lever in a first direction for the tremolo lever to increase a tension in, and a pitch of, strings secured at a distal portion of the tremolo lever internal to the cavity formed in the body of the stringed instrument and/or wherein movement of the outer lever arm in a second direction of rotation for the outer lever arm (e.g., toward from the body of the stringed instrument) to rotate the tremolo lever about an axis of rotation of the tremolo lever to displace the distal portion of the tremolo lever in a second direction for the tremolo lever to decrease a tension in, and a pitch of, strings secured at a distal portion of the tremolo lever internal to the cavity formed in the body of the stringed instrument.

What is claimed:

1. A tremolo for a stringed-instrument, comprising:

a tremolo frame;

one or more tremolo cams, the one or more tremolo cams comprising, in combination, a plurality of laterally spaced-apart curved string contact surfaces at positions and at a spacing corresponding to a string positions of a plurality of strings for a stringed instrument, the one or more tremolo cams being disposed at a central portion of a body of the stringed instrument, each of the plurality of string contact surfaces having a lateral width greater than a width of a corresponding stringed instrument string; and a tremolo lever, the tremolo lever being rotatably mounted to the tremolo frame to rotate about an axis of rotation, the tremolo lever having an upper portion and a lower portion, the upper portion being adjacent the tremolo frame and being rotatably connected thereto by direct or indirect connection to the tremolo frame, the lower portion extending downwardly away from the upper portion and away from the tremolo frame in a direction corresponding to an interior cavity of a body of a stringed instrument, the lower portion of the tremolo lever comprising, at or near a distal portion of the lower portion, one or more string retention structures configured to secure end portions of stringed instrument strings, wherein the upper portion of the tremolo lever further comprises a first mechanical connector to receive, or to removably receive, a mating second mechanical connector at a first end portion of an outer lever arm, wherein forces applied to the outer lever arm by a user in one direction causes rotation of the tremolo lever about the axis of rotation in a first direction of rotation and displacement of the distal portion of the tremolo lever in a tremolo first direction to increase a tension in, and a pitch of, strings secured at the distal portion of the tremolo lever via the one or more string retention structures, and wherein forces applied to the outer lever arm by a user in another direction opposite to the one direction causes rotation of the tremolo lever about the axis of rotation in a second direction of rotation and displacement of the distal portion of the tremolo lever in a second direction, opposite the first direction, to decrease a tension in, and a pitch of, strings secured at the distal portion of the tremolo lever via the one or more string retention structures.

2. The tremolo for the stringed-instrument according to claim 1, wherein the tremolo frame comprises a plurality of openings at a rear portion of the tremolo frame to receive mechanical connectors to affix the tremolo frame to an exterior of a face of body of the stringed-instrument.

3. The tremolo for the stringed-instrument according to claim 1, wherein the tremolo lever is rotatably mounted to the tremolo frame via a shaft.

4. The tremolo for the stringed-instrument according to claim 1, wherein the tremolo lever is rotatably mounted to the tremolo frame via a first end portion of the tremolo lever rotatably mounted in a first side of the tremolo frame and via a second end portion of the tremolo lever rotatably mounted in a second side of the tremolo frame opposite the first side, wherein the first end of the tremolo lever comprises a first male member or a first female member configured to rotatably engage a mating first member of the first side of the tremolo frame, and wherein the second end of the tremolo lever comprises a second male member or a second female member configured to rotatably engage a mating first member of the second side of the tremolo frame.

5. The tremolo for the stringed-instrument according to claim 1, wherein the one or more tremolo cams are integrated with the upper portion of the tremolo lever.

6. The tremolo for the stringed-instrument according to claim 1, wherein the curved surface of each string contact surface comprises a central portion defined by a radius of rotation, a first distal portion on a first side of the central portion, and a second distal portion on a second side of the central portion, each of the first distal portion and the second distal portion having a curvature or profile displacing the first distal portion and the second distal portion away from contact with a string path of a respective tensioned string contacting the central portion of the string contact surface.

7. The tremolo for the stringed-instrument according to claim 1, wherein the tremolo lever is configured to rotate about the axis of rotation in the first direction of rotation by an angle of about 20° or less relative to a default neutral position of the tremolo lever under string tension, and wherein the tremolo lever is configured to rotate about the axis of rotation in the second direction of rotation by an angle of about 20° or less relative to a default neutral position of the tremolo lever under string tension.

8. The tremolo for the stringed-instrument according to claim 1, wherein the first mechanical connector at the upper portion of the one or more tremolo cams is offset from the axis of rotation of the tremolo lever.

9. The tremolo for the stringed-instrument according to claim 1, wherein the tremolo lever further defines, at or near the distal portion of the tremolo lever, one or more biasing member retention structures comprising one or more male connectors, female connectors, clamping members, posts, holes, openings, or through holes.

10. The tremolo for the stringed-instrument according to claim 1, wherein the one or more tremolo cams and/or the tremolo lever comprise a plurality of removably attachable interlocking segments.

11. The tremolo for the stringed-instrument according to claim 1, wherein the tremolo frame comprises, at a front portion thereof, a depending member extending in a direction generally perpendicular to the axis of rotation and away from the tremolo frame to place the depending member in opposition to the lower portion of the tremolo lever when the lower portion of the tremolo lever is displaced to the first position at the first angle relative to the axis of rotation, and wherein the depending member comprises one or more rare earth magnets of a first polarity disposed therein or attached thereto and wherein the lower portion of the tremolo lever comprises one or more rare earth magnets of a second polarity disposed therein or attached thereto disposed in a position to magnetically interact with the one or more rare earth magnets of the tremolo frame depending member to provide a force assisting movement of the lower portion of the tremolo lever in the first direction toward the depending member as the lower portion of the tremolo lever approaches the first position, or wherein one of the depending member or the lower portion of the tremolo lever comprises one or more rare earth magnets of a first polarity disposed therein or attached thereto and wherein the other of the depending member or the lower portion of the tremolo lever comprises one or more ferromagnetic elements disposed therein or attached thereto disposed in a position to magnetically interact with the one or more rare earth magnets of the depending member or the lower portion of the tremolo lever to provide a force assisting movement of the lower portion of the tremolo lever in the first direction toward the depending member as the lower portion of the tremolo lever approaches the first position.

12. The tremolo for the stringed-instrument according to claim 5, wherein the radius of rotation of the curved surfaces of the string contact surfaces are, for High E, B, G, D, A, and Low E, in a ratio of about 1/12:1/22:1/33:1/24:1/29:1/42, respectively.

13. A stringed instrument, comprising:

a neck;

a body, the body defining an interior cavity; and a tremolo comprising a tremolo frame, a tremolo lever, and one or more tremolo cams, wherein the one or more tremolo cams comprise, in combination, a plurality of laterally spaced-apart curved string contact surfaces at positions and at a spacing corresponding to a string positions of a plurality of strings for the stringed instrument, the one or more tremolo cams being disposed at a central portion of the body, each of the plurality of string contact surfaces having a lateral width greater than a width of a corresponding stringed instrument string, wherein the tremolo lever is rotatably mounted to the tremolo frame to rotate about an axis of rotation, the tremolo lever having an upper portion and a lower portion, the upper portion being adjacent the tremolo frame and being rotatably connected thereto by direct or indirect connection to the tremolo frame, the lower portion extending downwardly away from the upper portion and into the interior cavity defined within the body of the stringed instrument, the lower portion of the tremolo lever comprising, at or near a distal portion of the lower portion, one or more string retention structures configured to secure end portions of stringed instrument strings, wherein the upper portion of the tremolo lever further comprises a first mechanical connector to receive, or to removably receive, a mating second mechanical connector at a first end portion of an outer lever arm, wherein forces applied to the lever arm by a user to rotate the tremolo lever about the axis of rotation in a first direction of rotation displaces the distal portion of the tremolo lever in a first direction to increase a tension in, and a pitch of, strings secured at the distal portion of the tremolo lever via the one or more string retention structures by an amount corresponding to a first angle of rotation in the first direction of rotation, and wherein forces applied to the lever arm by a user to rotate the tremolo lever about the axis of rotation in a second direction of rotation displaces the distal portion of the tremolo lever in a second direction to decrease a tension in, and a pitch of, strings secured at the distal portion of the tremolo lever via the one or more string retention structures by an amount corresponding to a second angle of rotation in the second direction of rotation.

14. The stringed-instrument according to claim 13, wherein the tremolo frame is fixed to the body of the stringed instrument and remains stationary during movement of the tremolo lever.

15. The stringed-instrument according to claim 14, wherein the first angle of rotation is an angle of 20° or less in the first direction about the axis of rotation relative to a default neutral position of the tremolo lever under string tension and wherein the second angle is an angle of 20° or less in the second direction of rotation relative to the default neutral position of the tremolo lever under string tension.

16. The stringed-instrument according to claim 14, wherein the tremolo lever is rotatably mounted to the tremolo frame via a shaft, or wherein the tremolo lever is rotatably mounted to the tremolo frame via a first end portion of the tremolo lever rotatably mounted in a first side of the tremolo frame and via a second end portion of the tremolo lever rotatably mounted in a second side of the tremolo frame opposite the first side, the first end of the tremolo lever comprising a first male member or a first female member configured to rotatably engage a mating first member of the first side of the tremolo frame and the second end of the tremolo lever comprising a second male member or a second female member configured to rotatably engage a mating first member of the second side of the tremolo frame.

17. The stringed-instrument according to claim 14, wherein the one or more tremolo cams are integrated with the upper portion of the tremolo lever, wherein the one or more tremolo cams comprise stationary bearing surfaces or rollers independent of the tremolo lever, or wherein the one or more tremolo cams and/or the tremolo lever comprise a plurality of removably attachable interlocking segments.

18. The stringed-instrument according to claim 14, wherein the tremolo frame comprises, at a front portion thereof, a depending member extending in a direction generally perpendicular to the axis of rotation and into the interior cavity defined within the body of the stringed instrument to place the depending member in opposition to the lower portion of the tremolo lever when the lower portion of the tremolo lever is displaced in the first direction, and wherein the depending member comprises one or more rare earth magnets of a first polarity disposed therein or attached thereto and wherein the lower portion of the tremolo lever comprises one or more rare earth magnets of a second polarity disposed therein or attached thereto disposed in a position to magnetically interact with the one or more rare earth magnets of the tremolo frame depending member to provide a force assisting movement of the lower portion of the tremolo lever in the first direction toward the depending member as the lower portion of the tremolo lever is displaced in the first direction, or wherein one of the depending member or the lower portion of the tremolo lever comprises one or more rare earth magnets of a first polarity disposed therein or attached thereto and wherein the other of the depending member or the lower portion of the tremolo lever comprises one or more ferromagnetic elements disposed therein or attached thereto disposed in a position to magnetically interact with the one or more rare earth magnets of the depending member or the lower portion of the tremolo lever to provide a force assisting movement of the lower portion of the tremolo lever in the first direction toward the depending member as the lower portion of the tremolo lever is displaced in the first direction.

19. The stringed-instrument according to claim 14, wherein the radius of rotation of the curved surfaces of the string contact surfaces are, for High E, B, G, D, A, and Low E, in a ratio of about 1/12:1/22:1/33:1/24:1/29:1/42, respectively.

20. The stringed instrument according to claim 14, further comprising:

a plurality of strings, each of the plurality of strings being connected at a first end to connection members at a first end of the stringed instrument on the neck or on a head and being connected at a second end to the one or more string retention structures configured to secure end portions of stringed instrument strings, and/or a plurality of biasing members connected, at a first end, to a sidewall of the interior cavity of the body of the stringed instrument and connected, at a second end, to the one or more biasing member retention structures.

* * * * *